United States Patent
Kasajima

(10) Patent No.: US 7,621,185 B2
(45) Date of Patent: Nov. 24, 2009

(54) ACCELERATION SENSOR AND ELECTRONIC DEVICE COMPRISING THE SAME

(75) Inventor: Tamon Kasajima, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 67 days.

(21) Appl. No.: 11/460,120

(22) Filed: Jul. 26, 2006

(65) Prior Publication Data

US 2007/0022813 A1  Feb. 1, 2007

(30) Foreign Application Priority Data

Jul. 28, 2005  (JP) ............................. 2005-218784
Aug. 31, 2005  (JP) ............................. 2005-252085

(51) Int. Cl.
 *G01P 15/11* (2006.01)
(52) U.S. Cl. .................................................. 73/514.31
(58) Field of Classification Search .............. 73/514.31, 73/514.36, 510
 See application file for complete search history.

(56) References Cited

U.S. PATENT DOCUMENTS

| | | | | |
|---|---|---|---|---|
| 4,967,598 A * | 11/1990 | Wakatsuki et al. | ....... | 73/514.12 |
| 5,542,297 A * | 8/1996 | Mizuno et al. | ........... | 73/514.36 |
| 5,892,154 A * | 4/1999 | Negoro | .................... | 73/514.32 |
| 6,661,225 B2 | 12/2003 | Toyoda et al. | | |
| 7,185,541 B1 * | 3/2007 | Edelstein | ................. | 73/514.16 |
| 7,392,704 B2 * | 7/2008 | Shoji | ....................... | 73/514.31 |

FOREIGN PATENT DOCUMENTS

| | | |
|---|---|---|
| JP | 2-055169 U | 4/1990 |
| JP | 6-160428 A | 6/1994 |
| JP | 2732287 | 12/1997 |
| JP | 10-332733 A | 12/1998 |
| JP | 11-038035 A | 2/1999 |
| JP | 11-101816 A | 4/1999 |
| JP | 2003-215145 A | 7/2003 |
| JP | 2007-024818 A | 2/2007 |

OTHER PUBLICATIONS

English Language Abstract Corresponding to JP 2-248867 published Oct. 4, 1990.
English language Abstract and translation of JP 2007-024818 A, Feb. 1, 2007.
English language Abstract of JP 6-160428 A, Jun. 7, 1994.
English language Abstract of JP 10-332733 A, Dec. 18, 1998.
English language Abstract of JP 11-038035 A, Feb. 12, 1999.
English language Abstract of JP 11-101816 A, Apr. 13, 1999.
English language Abstract of JP 2003-215145 A, Jul. 30, 2003.

* cited by examiner

*Primary Examiner*—John E Chapman
(74) *Attorney, Agent, or Firm*—Greenblum & Bernstein, P.L.C.

(57) ABSTRACT

There is provided an acceleration sensor that is capable of detecting acceleration with high precision and capable of reducing the size and cost due to its simple structure. The acceleration sensor comprises: a pair of cantilevers arranged on a same straight line or almost in parallel in such a manner that positions of fixed ends and free ends are arranged to face in opposite directions from each other, and each of the free ends has a degree of freedom to deflect along a same direction; a pair of magnetic field generating devices mounted respectively to each of the free ends for generating magnetic fields; and a pair of magnetic field detecting devices arranged to face each of the magnetic field generating devices, respectively, for detecting directions of the magnetic fields generated by each of the magnetic field generating devices.

35 Claims, 37 Drawing Sheets

FIG. 7A
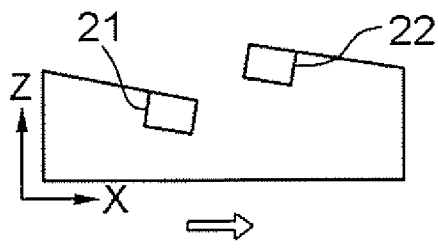
FIG. 7B
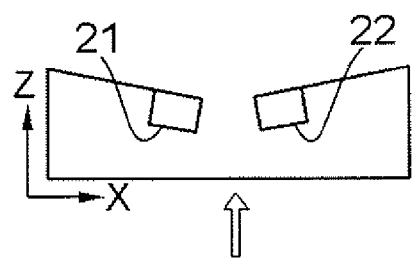
FIG. 7C
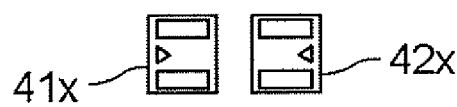
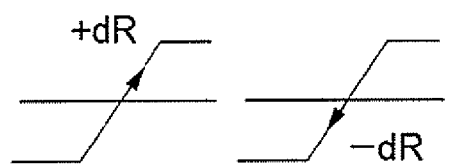
FIG. 7D
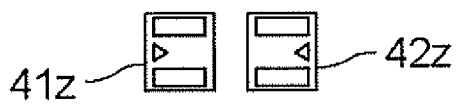
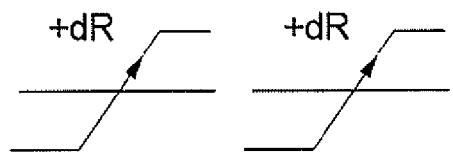
FIG. 7E
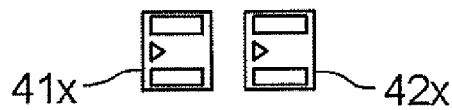
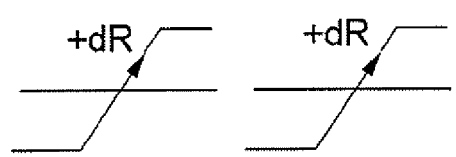
FIG. 7F
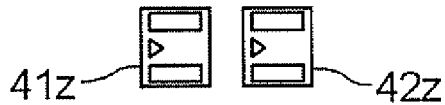

FIG. 8A
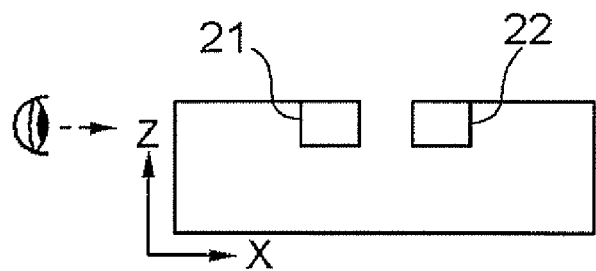
FIG. 8B
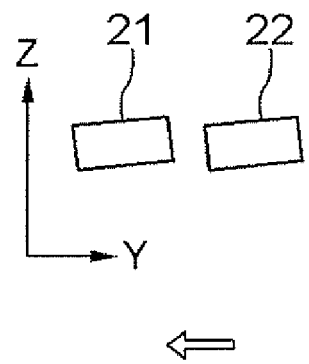
FIG. 8C
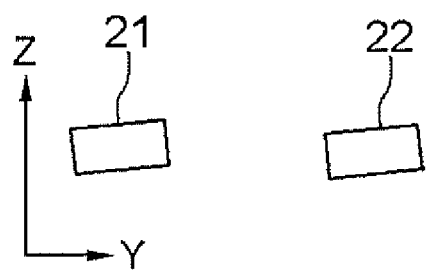
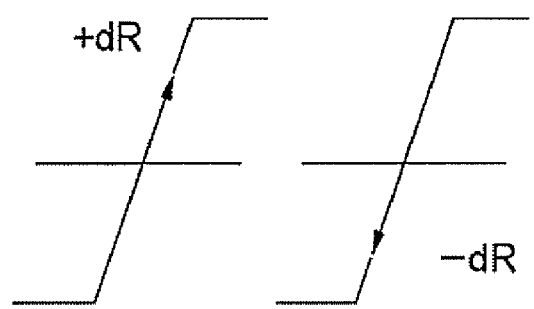

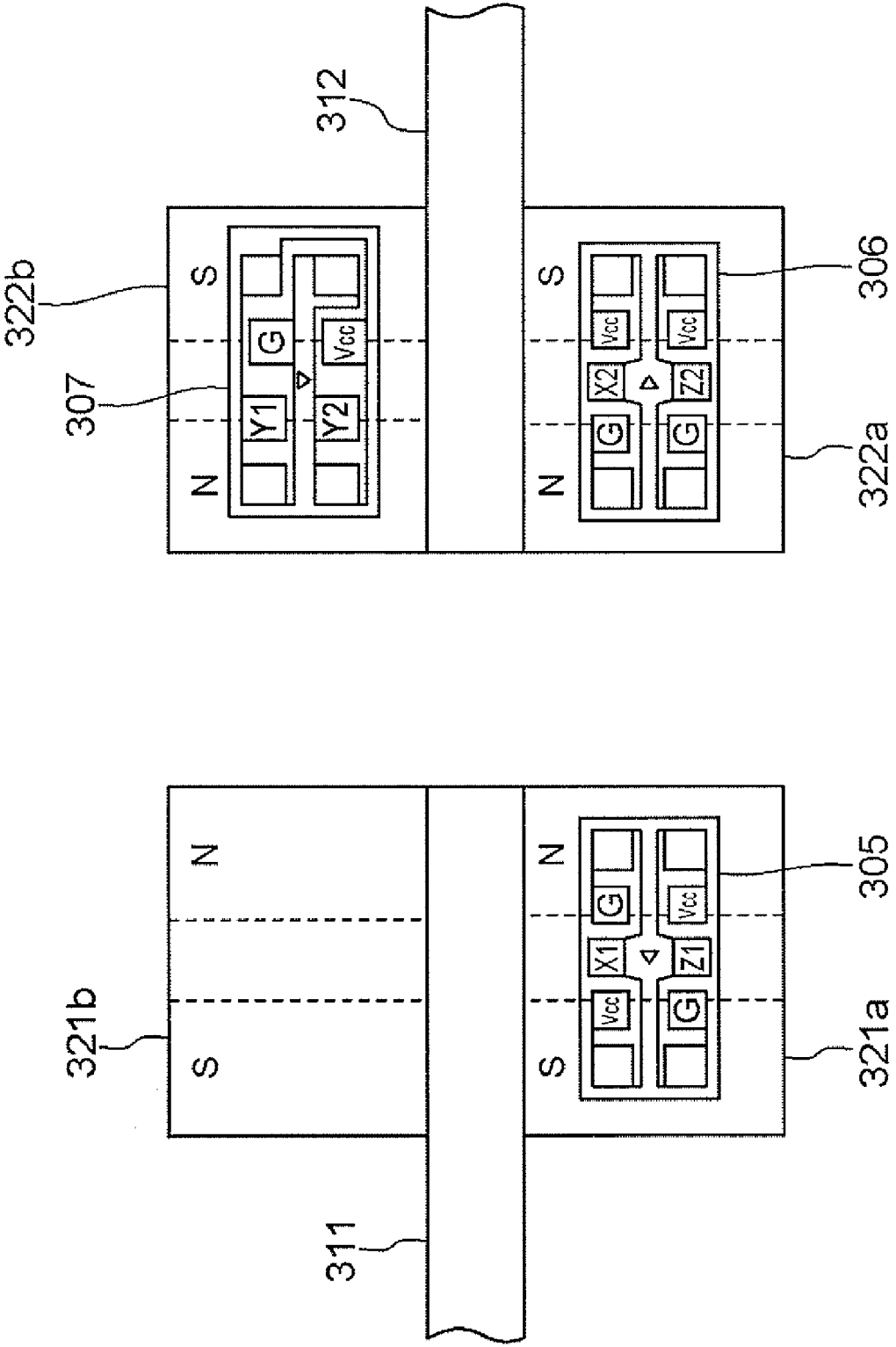

560 550
WEIGHT

ACCELERATION SENSOR AND ELECTRONIC DEVICE COMPRISING THE SAME

BACKGROUND OF THE INVENTION

1. Field of the Invention

The present invention relates to an acceleration sensor and, more particularly, to an acceleration sensor that measures acceleration based on a change in the direction of magnetic field. Furthermore, the present invention relates to an electronic device comprising the same and to an acceleration measuring method as well.

2. Description of the Related Art

For detecting action of a prescribed object, there has been conventionally investigated the use of an acceleration sensor for detecting the acceleration of such object. For example, various applications are considered possible including operation sections of industrial robots, air-bag devices of automobiles, and hard disk drives to be loaded on portable computers, etc. Specifically, for the hard disk drive, it can be used to suppress damages to data through retracting a magnetic head by instantly detecting forcible movement and fall. Furthermore, the acceleration sensor is required for detecting impact imposed on the device and inclination (angle) of the device in addition to the free fall.

As the constitution of an acceleration sensor of a conventional case, a popular method is to detect distortions generated in a structure due to acceleration as disclosed in Patent Literature 1, Japanese Registered Patent Publication No. 2732287, for example. Specifically, a weight is placed at the center (intersection point) of a cross-shaped supporting member that has a spring characteristic, and a distortion sensor element is fixed at each beam section of the supporting member. Then, deformations of each beam are detected based on the detected values of the distortion sensor elements, and there are detected the accelerations in the direction of each of the axes (X, Y, Z). For detecting the acceleration, for example, there is a method where a semiconductor piezoelectric element is used as the distortion sensor element and a bridge circuit is provided for detecting the resistance value thereof, and a method where a piezoelectric vibrator is used for detecting the transmission cycle by the distortion.

However, in the methods of the above-described conventional case, it is necessary to provide electrodes on the cross-shaped supporting member (spring) itself or the vicinity thereof to be used for capturing signals for detecting the distortion. Thus, the structure may be complicated by the wirings. Further, the distortion sensor elements are mounted to the supporting member so that the size thereof cannot be reduced. Furthermore, it has been an issue that displacement of the spring is obstructed so that it becomes difficult to detect acceleration with high precision since the distortion sensor element is mounted or built in the spring part of the supporting member internally.

SUMMARY OF THE INVENTION

The object of the present invention therefore is to improve the inconveniences of the above-described conventional case and, more particularly, to provide an acceleration sensor that is capable of detecting the acceleration with high precision as well as capable of reducing the size and cost by the simple structure.

The acceleration sensor as one of the present invention therefore comprises: a pair of cantilevers arranged on a same straight line or almost in parallel in such a manner that positions of fixed ends and free ends are arranged to face in opposite directions from each other, and each of the free ends has a degree of freedom to deflect along a same direction; a pair of magnetic field generating devices mounted respectively to each of the free ends for generating magnetic fields; and a pair of magnetic field detecting devices arranged to face each of the magnetic field generating devices, respectively, for detecting directions of the magnetic fields generated by each of the magnetic field generating devices.

In that state, the magnetic field generating devices in a pair are provided, respectively, for measuring acceleration in a longitudinal direction and for measuring acceleration in a direction orthogonal to the longitudinal direction of the cantilevers along a plane where a locus is formed when the cantilevers deflect. Further, the directions of the magnetic fields generated by the magnetic field generating devices are set in a direction orthogonal to the longitudinal direction of the cantilevers along the plane where the locus is formed when the cantilevers deflect. The above-described acceleration sensor is provided to an electronic device such as a hard disk drive, for example. In that state, it is desirable to arrange the longitudinal direction of the pair of the cantilevers that constitute the acceleration sensor along the horizontal face of the electronic device when in use.

With the present invention described above, first, when there is acceleration generated in a prescribed direction, there is generated a revolving force at each free end by a moment. Thus, each of the cantilevers deflects, respectively. Then, the magnetic field generating devices mounted at each free end come to incline so that the directions of the magnetic fields generated thereby also change. In that state, each free end deflects differently in prescribed two axial directions. In the electronic device comprising the acceleration sensor, assuming that the horizontal face is the X-Y plane formed by the X-axis and Y-axis and the vertical direction thereof is the Z-axis direction in the state where the electronic device is in use, the pair of cantilevers deflect in the opposite directions from each other for the acceleration in the X-axis direction (or in the y-axis direction), whereas the cantilevers deflect in the same direction for the acceleration in the Z-axis direction. By detecting such deflection state of the pair of cantilevers as the change in the directions of the magnetic fields from the magnetic field generating devices through each of the magnetic field detecting devices, accelerations in directions of at least two axes can be detected. As described, it is a simple structure so that the acceleration sensor can be formed in a small size and at a low cost. By providing the magnetic field detecting devices for detecting the respective accelerations in the biaxial direction, i.e. in the longitudinal direction (X-axis or Y-axis) of the cantilevers, and in the direction orthogonal (Z-axis direction) to the longitudinal direction of the cantilevers along the plane where a locus is formed when the cantilevers deflect, the accelerations can be detected more easily with still higher precision.

In addition to the above-described structure, the pair of cantilevers have a degree of freedom in a twisting direction of the levers; and another magnetic field detecting device, which detects a direction of a magnetic field that changes when the cantilevers are twisted, is provided by opposing at least one of the magnetic field generating devices.

Further, the pair of cantilevers are plate-type levers having a plane that is orthogonal to the plane where the locus is formed when the cantilevers deflect.

With this, when there is acceleration in the direction of axis (for example, Y-axis) other than the above-described two axes (for example, X-axis and Z-axis), the cantilevers are twisted and the directions of the magnetic fields by the magnetic field generating devices change thereby. Through detecting the changes in the directions of the magnetic fields by another magnetic field detecting device, the acceleration in the above-described other direction (for example, Y-axis) can also be detected. Particularly, through forming the cantilevers in a plate-type, deflection and twist can be generated easily for the acceleration along the directions of each axis as described above. Therefore, the acceleration sensor capable of detecting the directions of three axes can be formed with a simple structure, which allows reduction in the size and cost.

Further, at each of the free ends, each of the magnetic field generating devices is provided by being divided into a plurality of pieces. With this, it becomes unnecessary for the magnetic field detecting sensors to be arranged densely by opposing the magnetic field generating devices. In addition, increases in the weight and cost due to expansion in the size of the magnetic field generating devices can be suppressed.

Furthermore, the pair of cantilevers are arranged on almost a same straight line; and each of the free ends is arranged on an opposite side from each other. In that state, it is desirable for each of the fixed ends of the pair of cantilevers to be fixed to a same supporting member.

With this, it is possible to arrange the pair of cantilevers with a distance therebetween. Thus, it becomes possible to suppress influences of another magnetic field generating device at the time of detecting the directions of the magnetic fields by the magnetic field detecting device. Thereby, precision of the measurement can be improved. In that case, by fixing the opposing fixed ends to the same supporting member, the space occupied by the supporting member can be saved. Therefore, the weight and size of the sensor can be reduced.

Further, the magnetic field detecting devices are magnetoresistive elements whose resistance values change in accordance with a direction of a magnetic field when the magnetic field is inputted. Furthermore, when there is no acceleration applied in any directions, the magnetoresistive elements are arranged almost vertical to the direction of the magnetic field. Thereby, changes in the directions of the magnetic fields can be easily detected as the resistance values by using the GMR elements or the like, and precision of the detection can be improved. As a result, precision of measuring the acceleration can be improved.

Furthermore, the acceleration sensor comprises: a bridge circuit constituted by using the pair of magnetoresistive elements; and a differential-voltage detecting device for detecting a differential voltage outputted from the bridge circuit. With this, a small change in the resistance value can be detected by checking the differential voltage by the bridge circuit. Therefore, it is possible to measure the acceleration still more easily with high precision.

Further, another form of the acceleration sensor according to the present invention comprises: a spring member having a degree of freedom in at least one direction; a magnetic field generating device mounted to the spring member, which is formed integrally with N-pole face and S-pole face facing in a same direction; and magnetic field detecting devices for detecting a direction of a magnetic field, at least one each of which is arranged to oppose each of the N-pole face and the S-pole face of the magnetic field generating device, wherein each of the magnetic field detecting devices is formed by a magnetoresistive element whose resistance value changes in accordance with a direction of a magnetic field, and each of the magnetic field detecting device is arranged in such a manner that detectable magnetic field directions become identical.

With the present invention describe above, first, when there is acceleration generated in a prescribed direction, the spring member deflects and the N-pole face and S-pole face of the magnetic field generating device mounted thereon incline in the same direction. This angle is outputted from the magnetoresistive elements arranged by opposing to each of the pole faces as the resistance values in accordance with the inclinations of the magnetic fields. At that time, each of the magnetoresistive elements is so arranged that the detected directions of the magnetic fields become the same. In the meantime, the polarities of the opposing magnetic field generating devices are inverse polarities, i.e. N-pole and S-pole, so that there are obtained the inverse resistance values. Thus, by calculating the difference between those resistance values, a still larger change amount (about twice) can be detected compared to the case of providing a single magnetoresistive element. As a result, sensitivity of detecting the inclination can be improved. At the same time, the structure becomes simple since the directions of fixed magnetizations of a plurality of the magnetic field detecting devices are set in the same direction. Therefore, the size of the sensor can be reduced further.

In addition to the above-described structure, there is provided a bridge circuit for detecting a differential voltage between each of the magnetoresistive elements. Further, two each of the magnetoresistive elements are provided by opposing the N-pole face and the S-pole face.

With this, the resistance values can be detected easily by the bridge circuit, and it becomes easy to measure the acceleration in the prescribed direction. Furthermore, by forming the bridge circuit using the four magnetoresistive elements whose resistance values all change by the acceleration in a prescribed direction, it is possible to detect the differential voltage of a still larger value, i.e. a large resistance value. Thus, detection of the acceleration can be performed with still higher precision.

Moreover, the four magnetoresistive elements are connected in parallel within a single chip to form the bridge circuit, and a voltage applying terminal and a differential-voltage detecting terminal are formed on the chip.

Thereby, magnetization of all the magnetoresistive elements can be fixed in the same direction as described above. Thus, the magnetoresistive elements can be formed within a single chip in a wafer process. Accordingly, elements to be used can be reduced in size so that the size of the acceleration sensor itself can be reduced.

Furthermore, as another structure of the acceleration sensor, there are provided: a pair of cantilevers arranged on a same straight line or almost in parallel in such a manner that positions of fixed ends and free ends are arranged to face in opposite directions from each other, and each of the free ends has a degree of freedom to deflect along a same direction; a pair of magnetic field generating devices mounted to each of the free ends of the pair of cantilevers, each of which is formed integrally with N-pole face and S-pole face facing in a same direction; and magnetic field detecting devices for detecting directions of magnetic fields, at least one each of which is arranged to oppose each of the N-pole face and the S-pole face of the magnetic field generating device, wherein each of the magnetic field detecting devices is formed by a magnetoresistive element whose resistance value changes in accordance with a direction of a magnetic field, and each of the magnetic field detecting device is arranged in such a manner that detectable magnetic field directions become identical.

Further, the acceleration sensor comprises: for measuring acceleration in a longitudinal direction of the cantilevers, a group of at least four magnetoresistive elements which respectively oppose N-pole faces and S-pole faces of both of the magnetic field generating devices; and for measuring acceleration in a direction orthogonal to the longitudinal direction of the cantilevers along a plane where a locus is formed when the cantilevers deflect, another group of the four magnetoresistive elements arranged in the same manner as that of the group of the magnetoresistive elements for measuring acceleration.

With the present invention described above, first, when there is acceleration generated in a prescribed direction, there is generated a revolving force at each free end by a moment. Thus, each of the cantilevers deflects, respectively. Then, the magnetic field generating devices mounted at each free end come to incline so that the directions of the magnetic fields generated thereby also change. At that time, each free end deflects differently in prescribed biaxial directions. In the electronic device comprising the acceleration sensor, it is considered that a prescribed plane forming the device is the X-Y plane of the X-axis and Y-axis and the vertical direction thereof is the Z-axis direction. When the pair of cantilevers are provided along the X-axis (or Y-axis) to deflect in the Z-axis direction, the pair of cantilevers deflect in the opposite directions from each other for the acceleration in the X-axis direction (or in the Y-axis direction), whereas the cantilevers deflect in the same direction for the acceleration in the Z-axis direction. By detecting such deflection state of the pair of cantilevers as the change in the directions of the magnetic fields generated from the magnetic field generating devices through each of the magnetic field detecting devices, accelerations in the directions of at least two axes can be detected. That is, through detecting the resistance values by the magnetoresistive elements, the acceleration sensor can be formed with a simple structure, in a small size and at a low cost. Particularly, as described above, each of the magnetoresistive elements is so arranged that the directions of the magnetic fields detected correspondingly from the N-pole face and S-pole face of the respective magnetic field generating devices become identical. Thus, sensitivity of detecting the acceleration can be improved. At the same time, the structure becomes simple since the magnetization directions of a plurality of magnetic field generating devices are fixed in the same direction. Furthermore, since the plurality of magnetic field detecting devices can be integrated within a very close range, dispersions in the resistance values between the elements constituting the bridge circuit becomes extremely small as will be described later, and the temperature properties of each element can be made uniform. As a result, voltage drift caused due to the changes in the temperature of the bridge circuit constituted in a single chip can be suppressed as much as possible, so that the temperature drift characteristic can be improved.

Furthermore, there are bridge circuits for detecting a differential voltage between each of the magnetoresistive elements, each of which is provided for each group of the magnetoresistive elements that are provided for measuring accelerations in each of the directions. At that time, the magnetoresistive elements are formed within a single chip for each of the magnetoresistive elements opposed thereto; and a voltage applying terminal and a differential-voltage detecting terminal are formed on each of the chips to be able to constitute the bridge circuit. Further, directions of each of the magnetoresistive elements formed within each chip are set in a same direction for each chip.

With this, the acceleration in the X-axis direction and Z-axis direction are detected by the magnetoresistive elements arranged in accordance with different magnetic field generating devices and, at that time, the resistance values are detected by the bridge circuit. Thereby, the acceleration can be detected more easily. Furthermore, each of the magnetoresistive elements corresponding to each of the magnetic field generating devices can be formed within a single chip. Therefore, size of the elements to be used can be reduced, thereby allowing reduction in the size of the acceleration sensor itself.

Furthermore, in the acceleration sensor having the above-described structure, the pair of cantilevers have a degree of freedom in a twisting direction of the levers; at least one each of another magnetic field detecting device for the twisting direction, which detects a direction of a magnetic field that changes when the cantilevers are twisted, is provided by opposing N-pole face and S-pole face of at least one of the magnetic field generating devices; and each of the magnetic field detecting devices for the twisting direction is formed by a magnetoresistive element whose resistance value changes in accordance with a direction of a magnetic field, and each of the magnetic field detecting device is arranged in such a manner that detectable magnetic field directions become identical.

With this, when there is acceleration in the direction of one axis (for example, Y-axis) other than the above-described two axes (for example, X-axis and Z-axis), the cantilevers are twisted and the directions of the magnetic fields by the magnetic field generating devices are also changed thereby. Thus, as described above, through detecting the changes in the direction of the magnetic field detected in another magnetic field detecting device by using the magnetoresistive elements arranged by corresponding, respectively, to the N-pole face and S-pole face of the magnetic field generating device, the acceleration in the direction of the other axis (for example, Y-axis) can be detected with still higher precision.

Moreover, like the above-described acceleration sensor, it is desirable to comprise a bridge circuit for detecting a differential voltage between each of the magnetoresistive elements for the twisting direction. Further, two each of the magnetoresistive elements for the twisting direction are provided by opposing the N-pole face and the S-pole face. With this, the sensitivity of detecting the acceleration can be more improved. Furthermore, the four magnetoresistive elements for the twisting direction are connected in parallel within a single chip to form the bridge circuit, and a voltage applying terminal and a differential-voltage detecting terminal are formed on the chip. Thereby, the size of the sensor can be reduced.

Further, the pair of cantilevers are plate-type levers having a plane that is orthogonal to a plane where a locus is formed when the cantilevers deflect. By forming the levers in a plate-type, deflection and twist can be generated easily for the accelerations along the directions of each axis as described above. Therefore, it is possible to form the acceleration sensor capable of detecting the acceleration in the directions of three axes with a simple structure. Thus, the size and cost can be reduced.

Furthermore, the magnetic field generating devices are U-shaped magnets. At that time, a ferromagnetic substance is provided to cover a part of the U-shape magnet, which is on an opposite side from faces where the N-pole and the S-pole are formed. Moreover, at each of the free ends, each of the magnetic field generating devices is provided by being divided into a plurality of pieces.

By making the magnetic field generating device into the U-shape, it is possible to increase the intensity of the magnetic field entering the magnetic field detecting device dramatically. Particularly, by combining the U-shaped magnet and the ferromagnetic substance (iron, permalloy, ferrite, etc.), it is possible to suppress leakage of the magnetic field to the directions other than the direction of the magnetic field detecting device dramatically. Thus, interference between the adjacent magnets can be suppressed. As a result, high output voltage (change of magnetoresistance) can be obtained even though the magnetic field detecting devices are arranged densely. Therefore, it becomes unnecessary to provide large or long magnets in order to obtain a strong magnetic field. In addition, the magnetic field can be divided to reduce the size further. With this, the magnetic field detecting devices can be arranged densely, and the size and cost of the sensor can be reduced.

Furthermore, there are provided: a supporting member for supporting a fixed end of at least one of the cantilevers, which is mounted to a fixing member that is a part of an acceleration sensor fixed to a target of acceleration measurement; and a movement detecting device between the supporting member and the fixing member in order to detect relative movement between the members. The movement detecting device detects a stress generated by the relative movement of the supporting member and the fixing member. Particularly, the movement detecting device is a PZT element that outputs an electric signal in accordance with a shearing force generated by the relative movement of the supporting member and the fixing member. Moreover, the supporting member is provided with a weight of a prescribed mass.

With this, first, when there is acceleration generated in a target of the acceleration measurement, the fixing member of the target of the acceleration measurement moves instantly in the acceleration direction, while the supporting member delays to follow. Thereby, relative movement is generated between the fixing member and the supporting member. By detecting the positional shift between each other using the movement detecting device provided between the fixing member and the supporting member, it becomes possible to detect that there is acceleration generated in the direction of the positional shift. For example, through the use of the PZT element or the like, which outputs an electric signal in accordance with a stress (specifically, shearing force) applied upon the movement detecting device due to the mutual positional shift, the acceleration can be detected more promptly. Furthermore, by increasing the mass of the supporting member, there generates more delay for following the movement of the target of acceleration measurement. Therefore, the acceleration can be detected with still higher sensitivity.

The above-described acceleration sensor is mounted to an electronic device such as a hard disk drive to be used to measure the acceleration generated in the electronic device. With this, it may be so constituted that the device itself can be protected from the acceleration through controlling the action of the electronic device when there is detected a prescribed acceleration. Furthermore, impact imposed upon the electronic device and the inclination and the like of the electronic device can be detected, so that it is possible to perform the processing in accordance with the detected state of the electronic device. Therefore, it is possible to form the highly reliable electronic device and, at the same time, highly functionalized electronic device can be achieved. Particularly, it is desirable to set the direction that can be detected with high sensitivity by the above-described movement detecting device as the seek direction of the magnetic head slider in the hard disk drive. By stopping the writing and reading of data when there is detected the acceleration in that direction, it is possible to suppress writing and reading errors to/from the highly dense magnetic disk.

Moreover, the above-described acceleration sensor can detect the acceleration of about 1 G-50 G. Thus, the function of detecting the free fall by the acceleration, the function of detecting the impact by the acceleration, and the function of detecting the angle by the acceleration can be achieved by a single sensor.

Furthermore, the acceleration measuring method as another form of the present invention uses a pair of cantilevers arranged on a same straight line or almost in parallel in such a manner that positions of fixed ends and free ends are arranged to face in opposite directions from each other, and each of the free ends has a degree of freedom to deflect along a same direction. The method comprises the steps of: detecting directions of magnetic fields generated from each of magnetic field generating devices mounted to each of the free ends; and measuring accelerations at least in directions of two axes based on changes in detected directions.

In that state, acceleration is measured based on a combination of the changes in each of the directions of the magnetic fields detected from each of the magnetic field generating devices. Particularly, the acceleration is measured based on a combination of the directions indicating whether each of the directions of the magnetic fields detected from each of the magnetic field generating devices is in a same direction or reverse direction.

Further, acceleration in a direction of other axis is measured based on a change in a direction of a magnetic field that is generated when the pair of cantilevers are twisted.

Furthermore, the directions of the magnetic fields are detected as resistance values by using a magnetoresistive element whose resistance value changes when a magnetic field is inputted.

With the acceleration measuring method, it is also possible to achieve the above-described object of the present invention, having the same functions and effects as those of the above-described acceleration sensor.

The present invention is constituted and functions as described above. With this, by using the pair of cantilevers and detecting the directions of the magnetic fields generated by the magnetic field generating devices provided at the free ends, accelerations in a plurality of directions can be measured with a simple structure. Therefore, it is possible to form a small-size and low-cost acceleration sensor, which is an excellent effect that is not of the conventional case.

Moreover, in the case of using the magnetic field generating devices having the N-pole and the S-pole, by detecting the resistance values in the directions of the magnetic fields generated by the N-pole and S-pole of the magnetic field generating devices that are inclined by the acceleration in the prescribed direction, a still larger change amount as the difference can be obtained compared to the case of using a single magnetoresistive element. As a result, the sensitivity of detecting the acceleration can be improved. At the same time, the structure becomes simple since the magnetization directions of a plurality of magnetoresistive elements are fixed in the same direction. Thus, the size of the sensor can be reduced further, which is an excellent effect that is not of the conventional case.

BRIEF DESCRIPTION OF THE DRAWINGS

FIG. 1 shows the structure having cantilevers as a part of an acceleration sensor, in which

FIG. 2 shows the general view of the acceleration sensor, in which

FIGS. 7A-7F are illustrations for describing proper layout of the sensors;

FIGS. 8A-8C are illustrations for describing the principle of measuring the acceleration;

FIG. 11 shows the structure of cantilevers as a part of an acceleration sensor according to a second embodiment, in which

FIG. 19 shows the structure of cantilevers as a part of an acceleration sensor according to a fourth embodiment, in which

FIG. 20 shows the general view of the acceleration sensor according to the fourth embodiment, in which

FIG. 29 is an illustration for describing a modification example of the layout of the magnetic field sensor chips with respect to the U-shaped magnets according to the fourth embodiment;

FIG. 30 shows a modification example of the structure of the cantilevers as a part of the acceleration sensor according to the fourth embodiment, in which

DETAILED DESCRIPTION OF THE PREFERRED EMBODIMENTS

The present invention is characterized in that it measures acceleration through detecting the positions of the free ends of a pair of cantilevers, which change in accordance with acceleration towards a prescribed direction, by detecting the direction of magnetic field generated by magnetic field generating devices mounted on each of the free ends. The specific constitution will be described hereinafter by referring to preferred embodiments.

First Embodiment

Figure 9B:
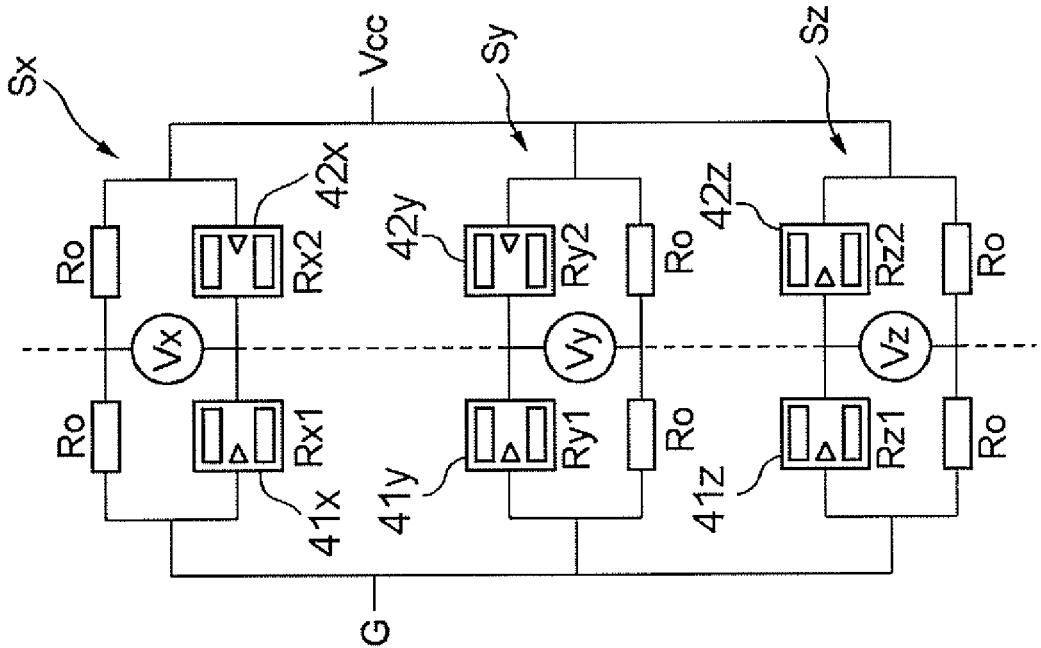
FIG. 9B shows the structure of a bridge circuit.
Figure 9A:
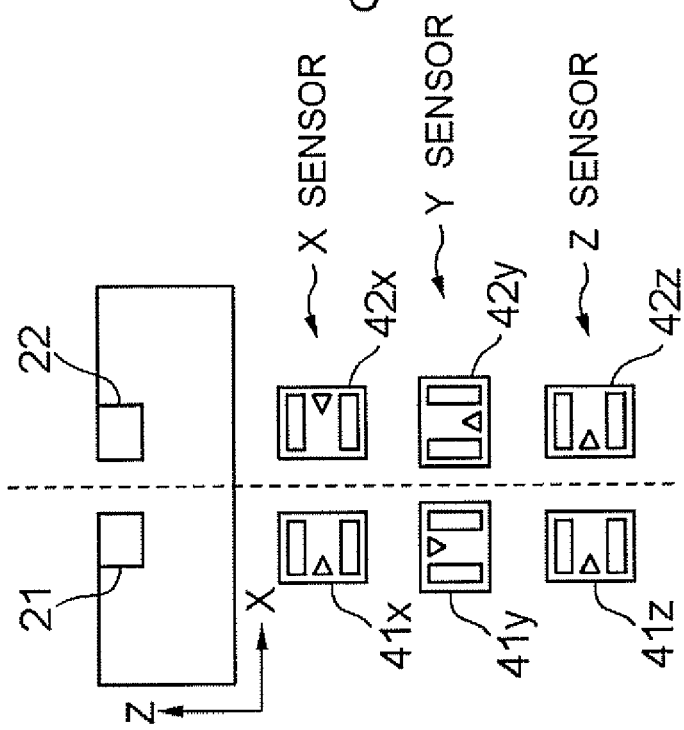
FIG. 9A is an illustration for showing the layout of each sensor.
Figure 10:
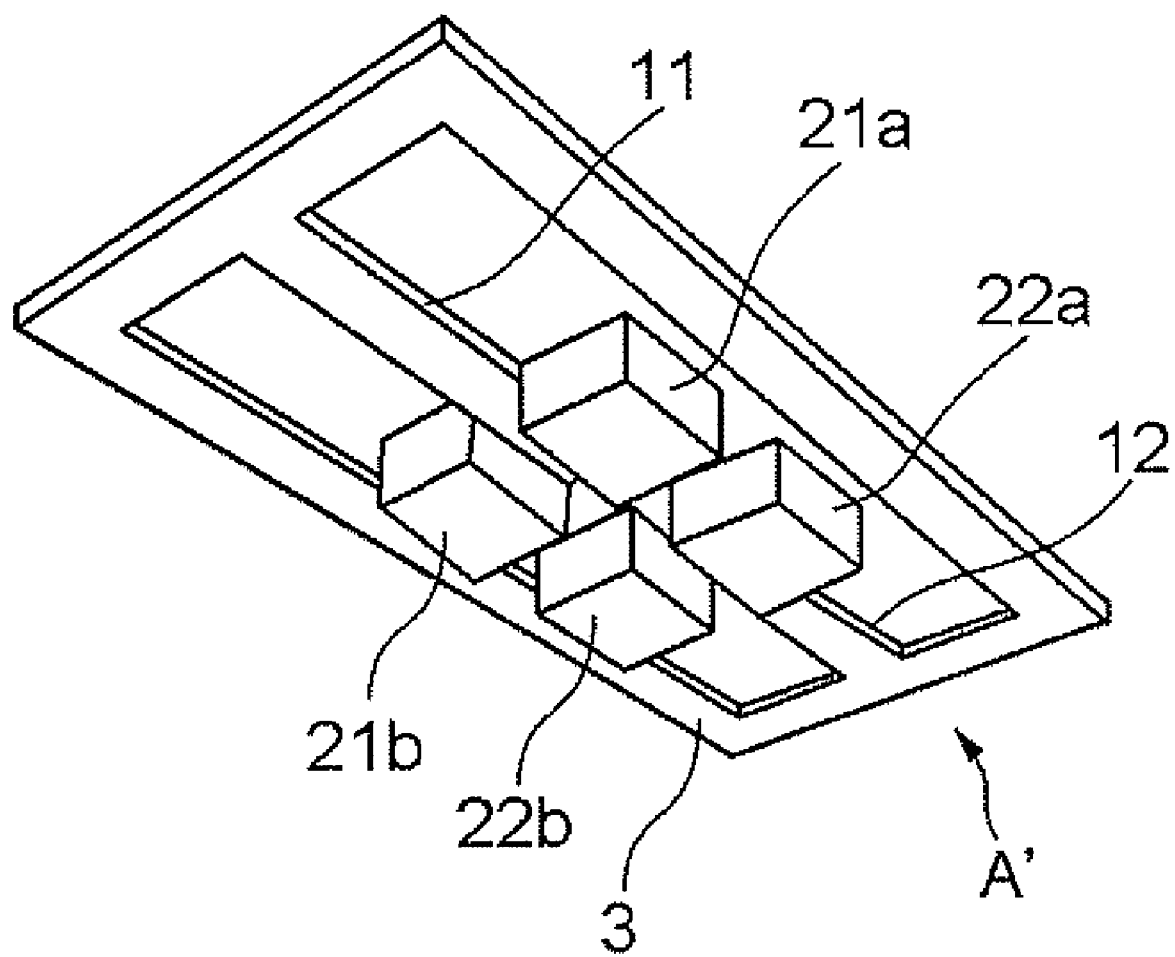
FIG. 10 is a perspective view from the bottom for showing a modification example of the cantilever that is a part of the acceleration sensor.

A first embodiment of the present invention will be described by referring to FIG. 1-FIG. 10. FIG. 1 and FIG. 2 are illustrations for showing the structure of an acceleration sensor. FIG. 2-FIG. 8 are illustrations for describing the principle and method for measuring the acceleration. FIG. 9 is a schematic diagram for showing the structure of the acceleration sensor. FIG. 10 is an illustration for showing a modification example of the structure of the acceleration sensor.

[Structure]

Figure 1A:
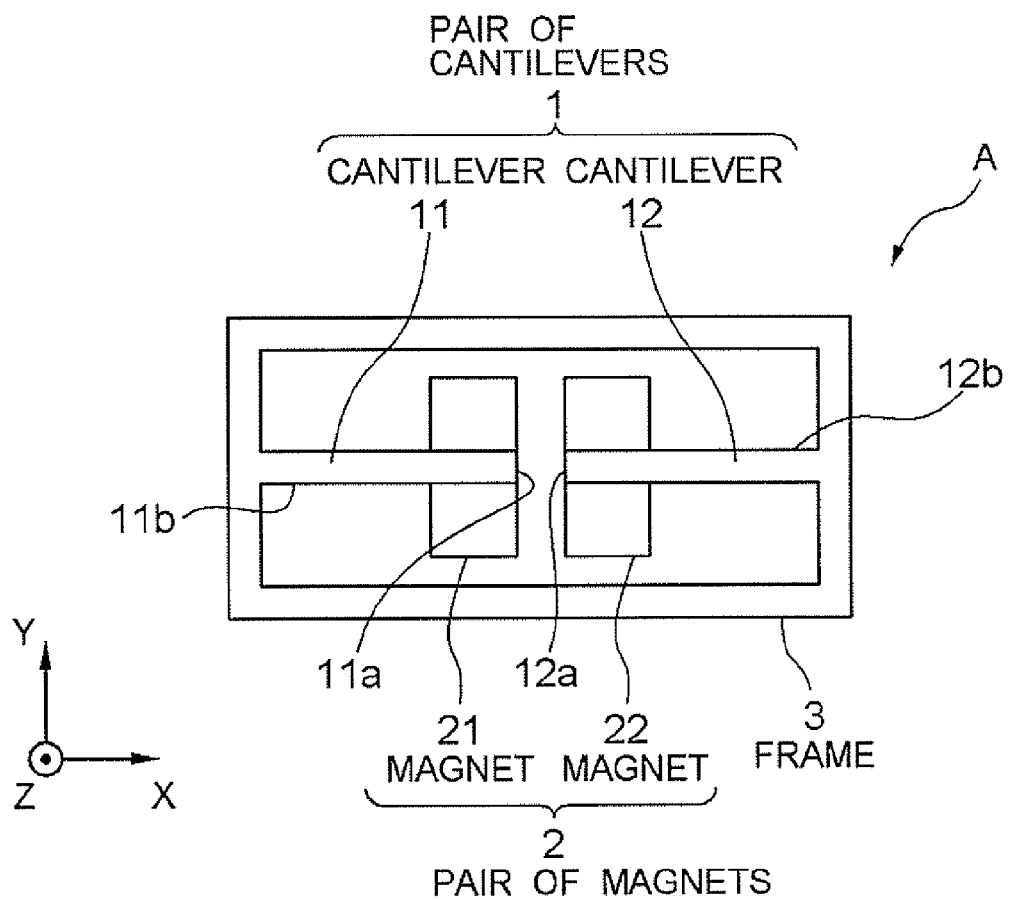
FIG. 1A is a top plan view and FIG. 1B is a perspective view from the bottom.
Figure 1B:
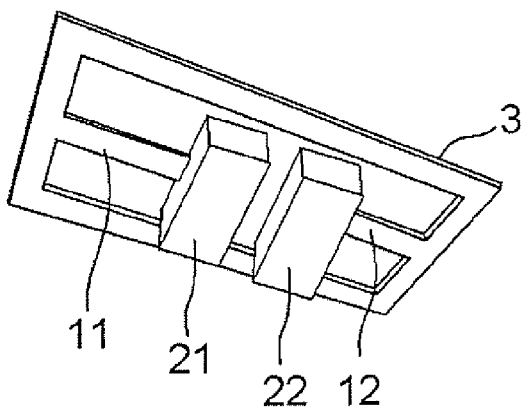
Figure 2A:
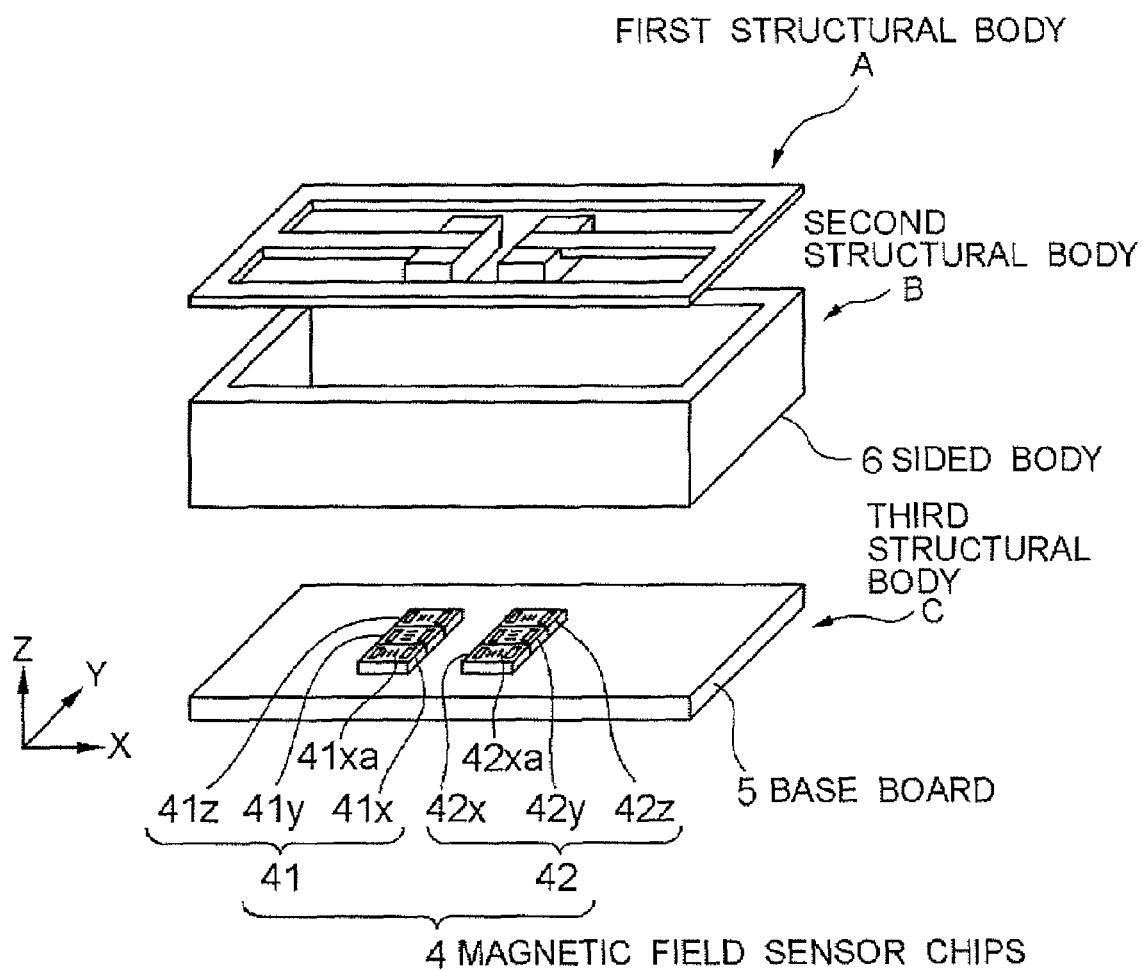
FIG. 2A is an illustration showing the disassembled state of the acceleration sensor and FIG. 2B is a simplified illustration viewed from the side.

First, there will be described the structure of the acceleration sensor according to the first embodiment by referring to FIG. 1 and FIG. 2. As shown in FIG. 2A, the acceleration sensor of this embodiment is constituted roughly with three structural bodies (A, B, C). First, the first structural body A arranged at the upper part of the acceleration sensor will be described by referring to FIG. 1. FIG. 1A is a top plan view thereof and FIG. 1B is a perspective view from the bottom.

As shown in FIG. 1A, the first structural body A comprises a roughly-rectangular frame 3 with a prescribed thickness, and fixed ends 11b, 12b of a pair of cantilevers 1 (a cantilever 11 and a cantilever 12), each extending towards the center, are mounted integrally at the centers of each short side. The pair of cantilevers 1 are formed in such a manner that each of the levers 11, 12 is positioned on the same straight line, and each of the free ends 11a, 12a is arranged to oppose each other. That is, the two levers 11 and 12 are arranged in such a manner that the fixed end and the free end thereof face towards the opposite directions from each other.

Further, each of the levers 11 and 12 is formed roughly in a plate form substantially in parallel to a plane formed by the frame 3, and is provided with a degree of freedom to be able to deflect towards the vertical direction with respect to the plane. Specifically, having the connection points between each of the levers 11, 12 and the frame 3 as the fulcrums, the free ends 11a and 12a deflect by generating an arc locus (deflection locus) on a plane that is vertical to the plane formed by the frame 3. Furthermore, each of the levers 11 and 12 has a degree of freedom also in a twisting direction. Each of the levers 11 and 12 is formed almost in the same length that is shorter than half the length of the long side of the frame 3. Thereby, the free ends 11a and 12a come to oppose each other almost at the center of the frame 3.

Furthermore, magnets 21 and 22 (magnetic field generating devices) are mounted respectively to the opposing free ends 11a, 12a of each of the levers 11, 12, thereby constituting a pair of magnets 2. Each of the magnets 21 and 22 is formed in a roughly-cuboid shape whose longitudinal direction is almost vertical to the longitudinal direction of the levers 11 and 12. As shown in FIG. 1A, the magnets are mounted at the bottom face of the free ends 11a, 12a with the N-pole on the bottom side and the S-pole on the top side (see FIG. 4A to be described later). Specifically, in the state with no acceleration applied, the direction of the magnetic field by the magnets 21, 22 is almost vertical with respect to the plate face of the plate-type cantilevers 11, 12. That is, it is in the direction orthogonal to the longitudinal direction of the cantilevers 11, 12 along the plane where the locus is generated when the cantilevers 11 and 12 deflect. The magnets 21 and 22 are permanent magnets.

As shown in FIG. 1A and FIG. 2A, the above-described first structural body A is arranged in such a manner that the plane formed by the frame 3 becomes in parallel to the X-Y plane of an electronic device (for example, a hard disk drive) to be mounted, in which the long sides of the frame 3 face in the direction along the X-axis and the short sides along the Y-axis. Thus, each of the levers 11 and 12 is arranged along the X-axis, and arranged to deflect with a degree of freedom in the Z-axis direction. The directions of the magnetic fields of the above-described magnets 21 and 22 are set to face the Z-axis direction that is orthogonal to the horizontal direction when the device (for example, a hard disk drive) to be placed is in use.

Figure 2B:
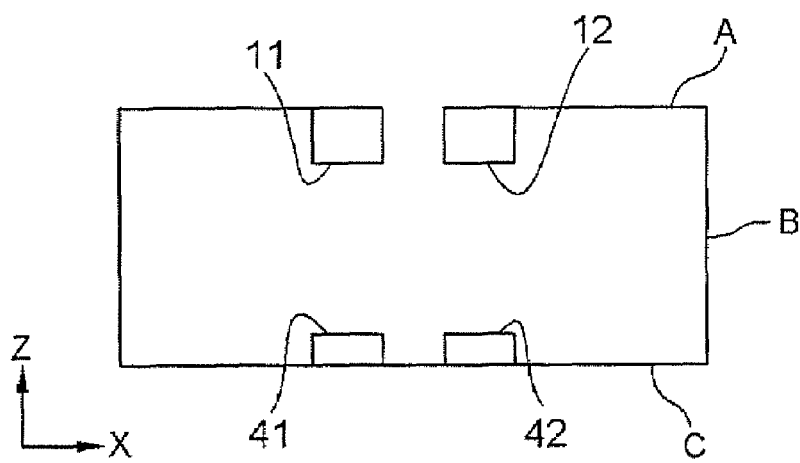

Next, the second structural body B and the third structural body C that are mounted beneath the first structural body will be described by referring to FIG. 2. FIG. 2A is an illustration for showing the disassembled state of the general structure of the acceleration sensor, and FIG. 2B is a side sectional view for showing the simplified general structure of the acceleration sensor.

First, the third structural body C comprises a base board 5 that is a roughly-rectangular plate member substantially in the same shape as that of the frame 3. Further, the second structural body B is constituted with a sided body 6 having a prescribed height to surround the periphery of the third structural body C. The sided body 6 is arranged between the third structural body C and the first structural body A so that there is a space formed between those structural bodies A and C. That is, there is formed a space which allows the pair of cantilevers 1 of the structural body A to deflect in the Z-axis direction.

Now, the third structural body C will be described in detail. A pair of magnetic field sensor chips (magnetic field detecting devices) 4 are arranged on the base board 5 for detecting the directions of the respective magnetic fields by respectively corresponding to the pair of magnets 2 mounted to the frame 3. That is, the magnetic field sensor chips 41, 42 are respectively mounted for corresponding to each of the magnets 21, 22 mounted to the respective free ends 11a, 12a of the levers 11, 12. Those magnetic field sensor chips 41, 42 are arranged to be positioned right below each of the magnets 21, 22 as shown in FIG. 2B when the acceleration sensor is mounted.

Specifically, there are three each of the magnetic field sensor chips 41 and 42, provided at each of the magnets 21, 22. That is, as shown in FIG. 2A, as the magnetic field sensor chips 41 corresponding to one of the magnets, 21, there are arranged a magnetic field sensor chip 41x for detecting the acceleration in the X-axis direction, a magnetic field sensor chip 41y for detecting the acceleration in the Y-axis direction, and a magnetic field sensor chip 41z for detecting the acceleration in the Z-axis direction. Similarly, as the magnetic field sensor chips 42 corresponding to the other magnet 22, there are arranged a magnetic field sensor chip 42x for detecting the acceleration in the X-axis direction, a magnetic field sensor chip 42y for detecting the acceleration in the Y-axis direction, and a magnetic field sensor chip 42z for detecting the acceleration in the Z-axis direction. Those magnetic field sensor chips are arranged in pairs (41x and 42x, 41y and 42y, 41z and 42z) for each axis-direction (for X-axis, for Y-axis, and for Z-axis) by corresponding to the pair of magnets 21, 22 and, as will be described later, the accelerations in directions of each axis are measured by using the detected values obtained by the pairs of magnetic field sensor chips.

Further, GMR elements (magnetoresistive elements, e.g. 41xa, 42xa), which detect the direction of the magnetic field by outputting an MR resistance value in accordance with the direction of the inputted magnetic field, are formed on the top face of the laminated layers of each of the magnetic field sensor chips 41, 42. This will be described in detail by referring to the magnetic field sensor chip indicated by reference numeral 41x. There are a plurality of GMR elements 41xa of the chip 41a formed on a straight line extending in the direction (Y-axis direction) that is vertical to the X-axis direction, in which the GMR elements 41xa are connected to each other in series. For detecting the acceleration in the X-axis direction, magnetizations of the elements 41xa are fixed in the X-axis direction. The GMR elements 42xa of the chip with reference numeral of 42 are also formed in the same structure. Furthermore, regarding the GMR elements of the magnetic field sensor chips indicated by reference numerals of 41y and 42y, there are a plurality of them formed, which are connected in series on a straight line extending in the direction (X-axis direction) that is vertical to the Y-axis direction, and magnetizations thereof are fixed in the Y-axis direction for detecting the acceleration in the Y-axis direction. In the meantime, the GMR elements of the chips with reference numerals of $41z$, $42z$ are also formed in the same structure as that of the chips $41x$, $42x$ for the X-axis. That is, there are a plurality of them formed, which are connected in series on a straight line extending in the direction (Y-axis direction) that is vertical to the X-axis direction, and magnetizations thereof are fixed in the X-axis direction. Furthermore, connecting terminals connected to both ends of the above-described GMR elements are formed at each of the magnetic field sensor chips 41, 42. Thereby, the direction of the magnetic field can be detected as the MR resistance value that corresponds to direction of the magnetic field as will be described later.

[Measuring Method]

Figure 3A:
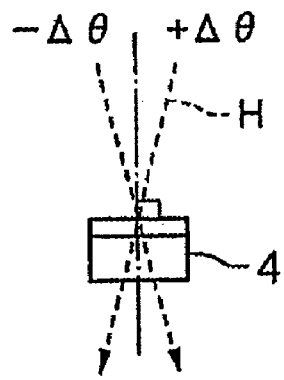
FIGS. 3A and 3B are illustrations for describing the principle of measuring the acceleration.
Figure 3B:
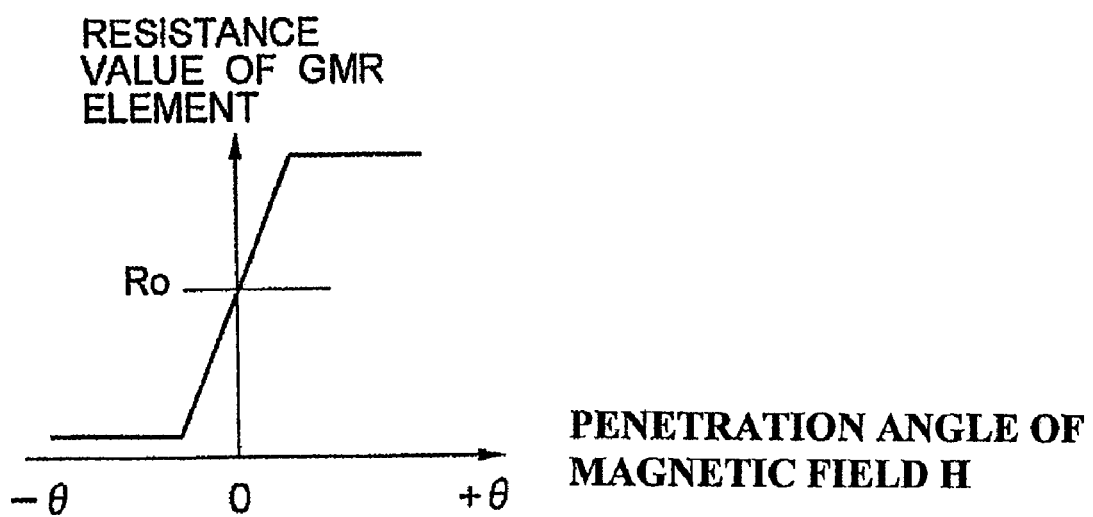

Next, there will be described the principle and method for measuring the acceleration in directions of each axis through the above-described structure by referring to FIG. 3-FIG. 6. First, there will be described the relation between the penetration angle of the magnetic field H with respect to the GMR element and the MR resistance value by referring to FIG. 3. The magnet 21 is arranged at the upper area of FIG. 3A, and it is noted that the magnetic field sensor chip 4 is arranged to be almost vertical to the direction of the magnetic field H from the magnet 21 (see alternate long and short dash line of FIG. 3A, and FIG. 4A) when there is no acceleration applied in any of directions. When the levers 11, 12 deflect along the Z-axis direction, i.e. along the plane that is orthogonal to the X-Y plane formed by the frame 3 as will be described later, the magnetic field generating face of the magnet 21 inclines. Thus, the direction of the magnetic field H generated therefrom inclines by an angle of "$-\Delta\theta$" ($\Delta$(delta): used as a symbol for expressing the amount of change) or an angle of "$+\Delta\theta$". Thereby, as shown by arrows of broken lines in FIG. 3A, the magnetic field penetrates into the GMR element with a prescribed angle. At this time, magnetizations of the GMR elements on the laminated plane of the magnetic field sensor chip 4 are fixed in one direction (for example, in the X-axis direction) as described above. Thus, when the direction of the magnetic field is changed from that direction, the MR resistance value changes as shown in FIG. 3B. That is, in this case, the resistance value in the vertical state is set as Ro and it indicates such a characteristic that the resistance value changes significantly, particularly when there is inclination of a small angle. Therefore, it is possible to detect the direction of the magnetic field H from the magnet mounted to each of the free ends $11a$, $12a$ of the cantilevers 11, 12 when deflected due to acceleration, through detection of changes in the MR resistance value of the GMR elements.

Next, specifically described is the principle of detecting the accelerations in the directions of each axis. Referring to FIG. 4 and FIG. 5, there will be described the principle when detecting the accelerations in the X-axis direction and Z-axis direction. As described above, for the magnetic field sensor chips, a pair of chips $41x$, $42x$ for the X-axis and a pair of chips $41z$, $42x$ are provided respectively, in which the magnetization of each GMR element is fixed in the same direction as the X-axis direction. Therefore, the same chip can be used for both, however, the chips $41x$, $42x$ for the X-axis and the chips $41z$, $42z$ for the Z-axis are provided, respectively, for forming bridge circuits to measure the accelerations in the directions of two axes.

The chips for the X-axis and the Z-axis are fixedly magnetized only in the X-axis direction. Thus, there is detected the acceleration only in the X-axis direction, assuming that the direction of the magnetic field by a single cantilever is detected by only one chip. However, by providing the pairs of levers 11 and 12, pairs of the magnets 21 and 22, and pairs of the magnetic field sensors 41 and 42, respectively, as in the present invention, it becomes possible to measure the accelerations in the directions of two axes, i.e. in the X-axis direction and Z-axis direction as will be described below.

Figure 4A:
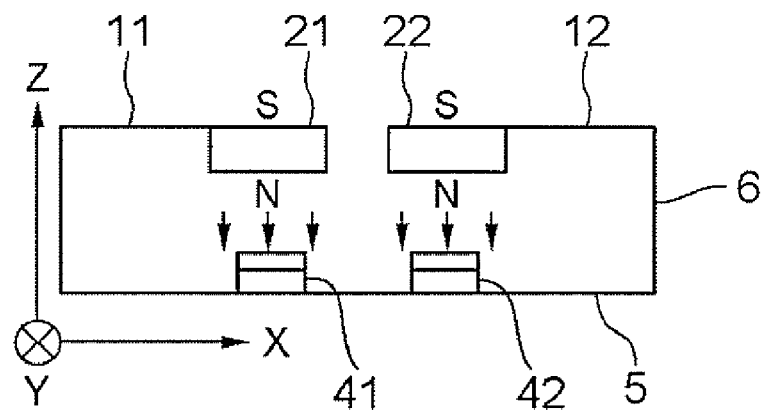
FIGS. 4A and 4B are illustrations for describing the principle of measuring the acceleration.
Figure 4B:
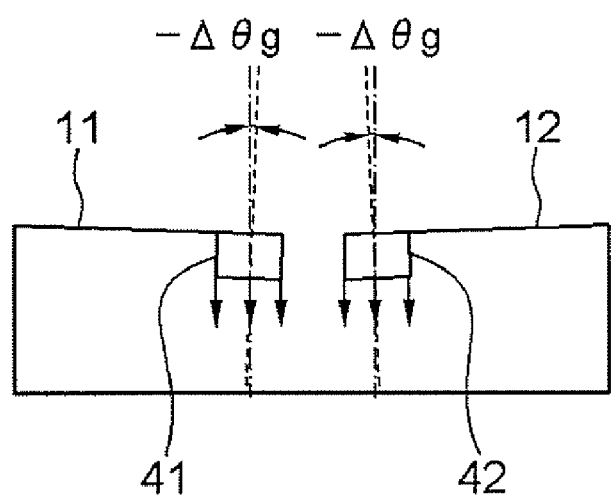

As shown in FIG. 4A, normally, the directions of the magnetic fields H from the magnets 21, 22 are set to be almost vertical to the laminated plane of the magnetic field sensor chips 41, 42. However, as shown in FIG. 4B, the free ends $11a$, $12a$ of the levers 11, 12 are always deflected towards the bottom side due to the weight of the levers 11, 12 themselves and the mass of the magnets 21, 22. In such a case, each of the free ends are inclined by "$-\Delta\theta g$" with respect to the vertical direction, so that the penetration angle to the GMR elements also become inclined by "$-\Delta\theta g$" with respect to the vertical direction. The levers 11 and 12 are provided facing towards the opposite directions from each other, so that the directions of the angles in terms of positive and negative state are also reversed. This illustration shows the state where there is the acceleration g being applied. The acceleration in the X-axis direction and the acceleration in the Z-axis direction can be expressed by the change amount of the direction of the magnetic field, i.e. by the extent of angle calculated by finding the sum and difference of the inclined angles of the magnets 21 and 22. Specifically, the angle Ax corresponding to the acceleration in the X-axis direction can be obtained by finding the difference of the penetration angles, and the angle Az corresponding to the acceleration in the Z-axis direction can be obtained by finding the sum of the penetration angles as in the followings expressions.

$$Ax = -\Delta\theta g - (-\Delta\theta g) = 0$$

$$Az = -\Delta\theta g + (-\Delta\theta g) = -2\Delta\theta g$$

Figure 5A:
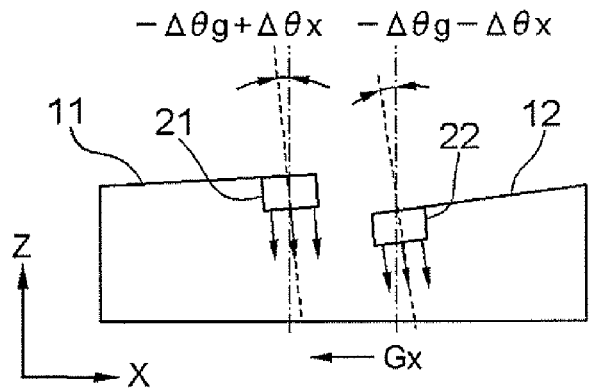
FIGS. 5A-5C are illustrations for describing the principle of measuring the acceleration.

Next, there will be described the case of accelerating in the X-axis direction by referring to FIG. 5A. As shown in this illustration, when it is accelerated in a direction of an arrow Gx, the free end (magnet 21) of one of the levers, 11, deflects in the positive direction of the Z-axis. Thus, the magnet 21 comes to incline for "$-\Delta\theta g + \Delta\theta x$" with respect to the vertical direction. Meanwhile, the free end (magnet 22) of the other lever 12 deflects in the negative direction of the Z-axis. Thus, the magnet 22 comes to incline for "$-\Delta\theta g - \Delta\theta x$" with respect to the vertical direction. For obtaining the angle Ax corresponding to the acceleration in the X-axis direction and the angle Az corresponding to the acceleration in the Z-axis direction based thereupon, there are found the following expressions.

$$Ax = (-\Delta\theta g + \Delta\theta x) - (-\Delta\theta g - \Delta\theta x) = +2\Delta\theta x$$

$$Az = (-\Delta\theta g + \Delta\theta x) + (-\Delta\theta g - \Delta\theta x) = -2\Delta\theta g$$

Figure 5B:
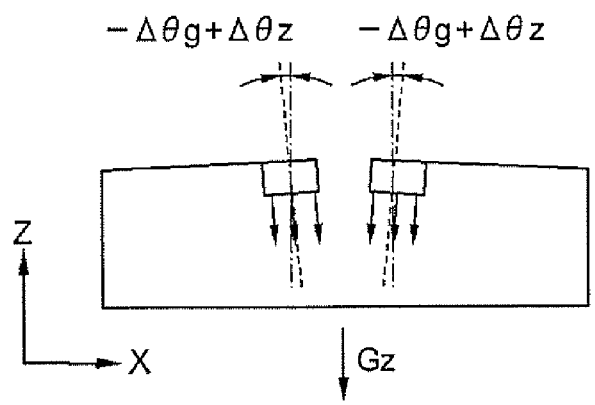

Similarly, FIG. 5B shows the case of accelerating the Z-axis direction. As shown in this illustration, when it is accelerated in a direction of an arrow Gz, both free ends (magnets 21, 22) of the pair of levers 11 and 12 deflect in the positive direction of the Z-axis. Thus, the magnets 21 and 22 come to incline for "$-\Delta\theta g + \Delta\theta z$" with respect to the vertical direction. For obtaining the angle Ax corresponding to the acceleration in the X-axis direction and the angle Az corresponding to the acceleration in the Z-axis direction based thereupon, there are found the following expressions.

$$Ax = (-\Delta\theta g + \Delta\theta z) - (-\Delta\theta g + \Delta\theta z) = 0$$

$$Az = (-\Delta\theta g + \Delta\theta z) + (-\Delta\theta g + \Delta\theta z) = -2\Delta\theta g + 2\Delta\theta z$$

Figure 5C:
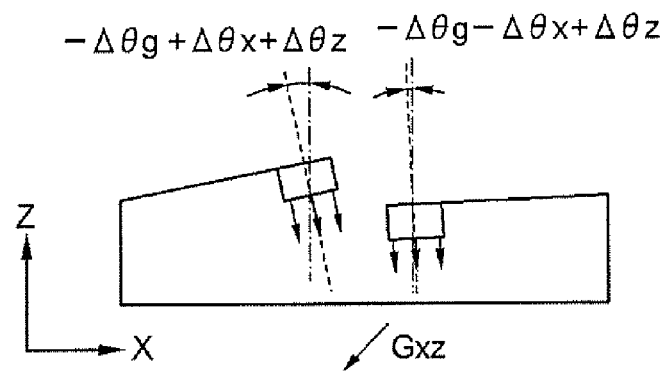

Similarly, FIG. 5C shows the case of accelerating the X-axis direction and Z-axis direction along the X-Z plane. As shown in this illustration, when it is accelerated in a direction of an arrow Gxz, the free ends (magnets 21, 22) of the pair of levers 11 and 12 deflect in the different directions from each other along the Z-axis direction since there is contained the acceleration in the X-axis direction. Thus, one of the magnets, 21, come to incline for "$-\Delta\theta g+\Delta\theta x+\Delta\theta z$" with respect to the vertical direction while the other magnet 22 comes to incline for "$-\Delta\theta g-\Delta\theta x+\Delta\theta z$" with respect to the vertical direction. For obtaining the angle Ax corresponding to the acceleration in the X-axis direction and the angle Az corresponding to the acceleration in the Z-axis direction based thereupon, there are found the following expressions.

$$Ax=(-\Delta\theta g+\Delta\theta x+\Delta\theta z)-(-\Delta\theta g-\Delta\theta x+\Delta\theta z)=+2\Delta\theta x$$

$$Az=(-\Delta\theta g+\Delta\theta x+\Delta\theta z)+(-\Delta\theta g-\Delta\theta x+\Delta\theta z)=-2\Delta\theta g+2\Delta\theta z$$

As described above, when accelerated in the X-axis direction, the free ends of the pair of cantilevers 11 and 12 deflect in the opposite direction from each other. Meanwhile, when accelerated in the Z-axis direction, the free ends deflect in the same direction, respectively. Thus, through specifying combinations of the respective deflection directions of the cantilevers 11, 12 by detecting the directions of the magnetic field in the X-axis direction of each of the magnets 21, 22, the accelerations in the directions of the two axes, i.e. the X-axis direction and Z-axis direction, can be measured.

Figure 6A:
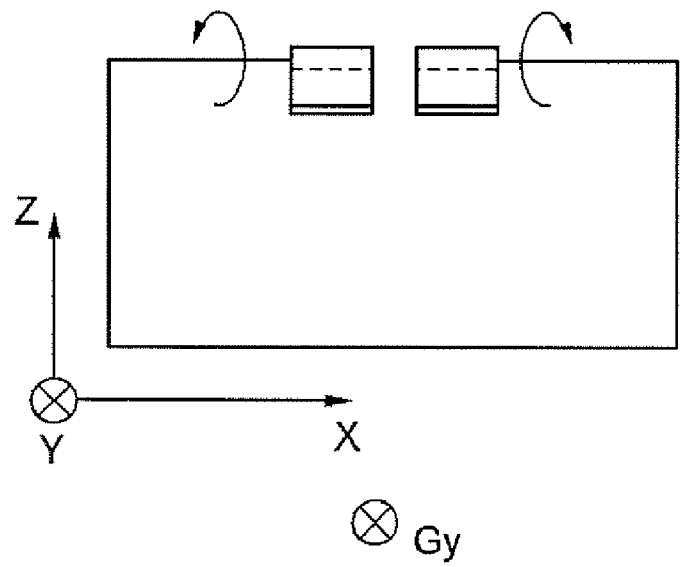
FIGS. 6A and 6B are illustrations for describing the principle of measuring the acceleration.
Figure 6B:
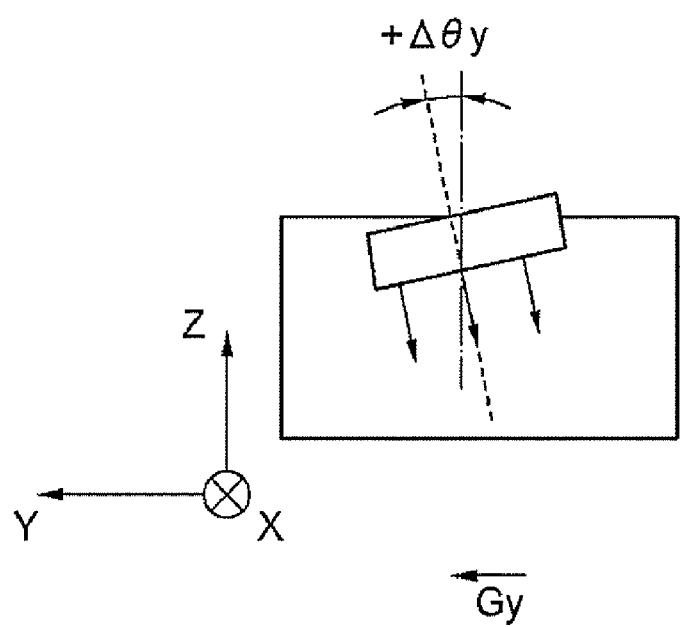

Further, FIG. 6 shows the case of accelerating in the Y-axis direction. When accelerated in the Y-axis direction, both cantilevers 11 and 12 are twisted in the same revolving direction. Thus, as shown in FIG. 6A, both the magnets 21 and 22 are rotated in the same direction. With this, the magnets 21 and 22 come to incline for "$+\Delta\theta y$" with respect to the vertical direction as shown in FIG. 6B. Therefore, the angle of inclination "$+\Delta\theta y$" can be used as the angle Ay that corresponds to the acceleration in the Y-axis direction.

Next, specific detecting method of the acceleration in the directions of each axis and the structure thereof will be described by referring to FIG. 7-FIG. 9. First, as shown in FIG. 9A, pairs of magnetic field sensor chips ((41x, 42x) (41y, 42y), (41z, 42z)) are provided for each axis. In order to detect the inclination of each of the magnets 21, 22 in the X-axis direction and Y-axis direction by those respective magnetic field sensor chips 41, 42, bridge circuits are constituted as shown in FIG. 9B using the MR resistance values detected by each of the chips 41, 42. That is, there are formed the bridge circuits Sx, Sy, Sz for each axis, and differential voltage sensor devices are provided for detecting the respective differential voltages Vx, Vy, Vz. Then, changes in the resistance values of each GMR elements are detected based on the outputted differential voltages.

The differential voltage sensor devices are arithmetic units, for example, which calculate the respective differential voltages Vx, Vy, Vz based on the following operational expressions. In the following expressions, the resistance values of the GMR elements of each of the magnetic field sensor chips are expressed as Rx1, Rx2, Ry1, Ry2, Rz1, Rz2 as shown in FIG. 9B, and the change amounts thereof are expressed by adding "d" thereto (e.g. "dRx1").

The expressions are as follows.

$$Vx=((Rx1+dRx1)/(Rx1+dRx1+Rx2-dRx2)-\tfrac{1}{2})\times Vcc$$

$$Vz=((Rz1+dRz1)/(Rz1+dRz1+Rz2-dRz2)-\tfrac{1}{2})\times Vcc$$

$$Vy=((Ry1+dRy1)/(Ry1+dRy1+Ry2-dRy2)-\tfrac{1}{2})\times Vcc$$

Both of the GMR elements for the X-axis direction and Z-axis direction are fixedly magnetized in the X-axis direction. Thus, as described above, it is necessary to detect the difference between the combinations of the deflection directions of the pair of cantilevers 11, 12 from the resistance values outputted from the respective GMR elements. For that, layout of the pairs of magnetic field sensor chips for each axis is set as follows.

First, FIG. 7A shows the state of the pair of the cantilevers 11, 12 when there is generated the acceleration in the X-axis direction (in the direction of an arrow facing towards the right side), whereas the FIG. 7B shows the state of the pair of the cantilevers 11, 12 when there is generated the acceleration in the Z-axis direction (in the direction of an arrow facing towards the upper side). FIGS. 7B-7E respectively show the positive/negative relations between the penetration angles of the magnetic field H to the GMR element and the resistance values. In the illustrations, the triangles illustrated within the magnetic filed sensor chips 41x, 42x, 41z, 42z show the positive/negative directions of the outputted resistance values according to the directions of the magnetic field to be measured. It is noted that the positive/negative states of the inclined angles of the magnets 21 and 22 are originally set in the reverse directions from each other (see FIG. 4 or the like), since the free ends of the respective cantilevers 11 and 12 are provided by facing with each other.

First, there is considered the resistance values detected by the GMR elements for the X-axis direction. When the GMR elements are arranged to face in the opposite directions from each other as in the upper part of FIG. 7C, the resistance values dR come to have the positive/negative state that is reversed from each other as in the lower part of FIG. 7C. In the meantime, when the GMR elements are arranged to face in the same direction as in the upper part of FIG. 7E, each of the resistance values dR becomes positive as in the lower part of FIG. 7E. For detecting the differential voltages by the bridge circuits in that state, the differences of the two resistance values can be calculated as follows.

Case of FIG. 7C: $Dx=+dR-(-dR)=+2dR$

Case of FIG. 7E: $Dx=+dR-(+dR)=0$

Based on this, the layout of the pair of magnetic field sensor chips 41x and 42x for the X-axis direction is set to face in the reverse directions from each other as shown in FIG. 7C.

Next, there is considered the resistance values detected by the GMR elements for the Z-axis direction. When the GMR elements are arranged to face in the opposite directions from each other as in the upper part of FIG. 7D, each of the resistance values dR comes to be positive as in the lower part of FIG. 7D. In the meantime, when the GMR elements are arranged to face in the same direction as in the upper part of FIG. 7F, the resistance values dR come to have the positive/negative state that is reversed from each other as in the lower part of FIG. 7F. For detecting the differential voltages by the bridge circuits in that state, the differences of the two resistance values can be calculated as follows.

Case of FIG. 7D: $Dz=+dR-(+dR)=0$

Case of FIG. 7F: $Dx=+dR-(-dR)=+2dR$

Based on this, the layout of the pair of magnetic field sensor chips 41z and 42z for the Z-axis direction is set to face in the same direction as shown in FIG. 7F.

Furthermore, there is considered the resistance values that are detected by the GMR elements for the Y-axis direction by referring to FIG. 8. First, FIG. 8A shows the state of the pair of cantilevers 11, 12 when there is generated the acceleration in the Y-axis direction, while FIG. 8B shows the state of the magnets 21, 22 when the levers are viewed from the left side, in which the positions of the magnets 21 and 22 are shifted. FIG. 8C shows the positive/negative relation between the penetration angles of the magnetic field H for the GMR elements and the resistance values. At this time, the magnets 21 and 22 incline as in the upper part of FIG. 8C. Thus, when the GMR elements are arranged to face in the opposite directions as illustrated in the middle part, the resistance values dR come to have positive/negative state that is reversed from each other as illustrated in the lower part of FIG. 8C. For detecting the differential voltages by the bridge circuits in that state, the differences of the two resistance values can be calculated as follows.

$$Dy=+dR-(-dR)=2+dR$$

Based on this, the layout of the pair of magnetic field sensor chips 41$y$ and 42$y$ for the Y-axis direction is set to face in the opposite directions from each other as shown in FIG. 8C.

Accordingly, as described above, the facing directions of each of the magnetic field sensor chips for each axis are set, respectively, as shown in FIG. 9A. With this, changes in the directions of the magnetic fields generated from the magnets 21 and 22, which are mounted to the free ends of the pair of cantilevers 11 and 12, can be detected as the changes in the resistance values of the GMR elements from the differential voltages through the bridge circuits. The magnitude of the differential voltage corresponds to the magnitude of the resistance value as well as the extent of the change (inclination with respect to the vertical direction) in the direction of the magnetic field. Therefore, inclinations of the magnets 21 and 22 can be detected for each axis, and the accelerations in the directions of each axis can be measured according to the inclinations.

As described above, this can be achieved by the structure that detects changes in the magnetic field generated from the free ends of the pair of the cantilevers 1 provided therein. That is, when there is generated the acceleration in a prescribed direction, a moment is applied to each free end. Thus, each of the cantilevers 11 and 12 deflect, and the directions of the magnetic field generated by the magnets 21 and 22 mounted to the respective free ends change as well. At that time, each of the free ends deflects in the different manners for the accelerations in the X-axis direction and in the Z-axis direction. For example, the pair of cantilevers deflect in the direction opposite from each other for the acceleration in the X-axis direction. In the mean time, the pair of cantilevers deflect in the same direction for the acceleration in the Z-axis direction. By detecting the different deflection state of the pair of the cantilevers by the GMR elements as the changes in the direction of the magnetic field, accelerations in the X-axis direction and the Z-axis direction can be detected. Furthermore, by mounting the GMR elements for detecting the acceleration in the Y-axis direction, it becomes possible to measure the accelerations in the directions of three axes with a simple structure. Therefore, it is possible to constitute the small-size and low-cost acceleration sensor.

In the above, there has been described by referring to the case where the changes in the resistance values of each GMR element are detected by forming the bridge circuits, and the inclinations of the magnets 21 and 22 provided to each of the cantilevers 11 and 12 are detected based thereupon to measure the accelerations in the directions of each axis finally. However, it is not intended to limit the measurement to be conducted with such structure. There may also employ the structure and method, which detect the resistance values of each GMR element without using the bridge circuits.

Further, other structure and method may be employed to measure the accelerations in the X-axis direction and the Z-axis direction by detecting the difference in the deflection directions of each of the cantilevers 11, 12 along the Z-axis direction without using the bridge circuits. In such a case, the GMR elements of the pair of magnetic field sensor chips 41$z$, 42$z$ for the Z-axis direction may be arranged to face the opposite directions from each other (the layout shown in FIG. 7D). At this time, it is possible to use the GMR elements in common for the X-axis and Z-axis by directly detecting the resistance values of each GMR element while discriminating the positive/negative state of the change amount, for example. With this, the structure can be more simplified.

Furthermore, although the pair of cantilevers 11 and 12 are arranged on the same straight line in the above, they may not be arranged on the same straight line but may be arranged almost in parallel. With this, it is also possible to achieve the same effect as that of the above-described case for the accelerations in the X-axis direction and Z-axis direction. Moreover, the free ends equipped with the magnets 21, 22 are arranged to face each other in the above. However, as will be described in the latter embodiments, they may be arranged on the opposite sides from each other.

Further, in the above, there has been described the structure where the levers 11 and 12 are arranged along the X-axis. However, they may be arranged to face in any directions. For example, the levers 11 and 12 may be arranged along the Y-axis direction and the deflection direction thereof becomes the Z-axis direction.

Furthermore, the shape of the magnets 21 and 22 provided to the free ends of the pair of cantilevers 11 and 12 is not limited to the above-described one. For example, as shown in the perspective view of the first structural body A' viewed from the bottom in FIG. 10, they may be in the shape divided at the engaged part between the levers 11, 12 (see reference numerals 21$a$, 21$b$, 22$a$, 22$b$) or may be in still another shape. With this, the magnets 21 and 22 can be provided by isolating the magnetic field generating face thereof, so that it is unnecessary for the magnetic field sensors placed by opposing the magnets 21, 22 to be arranged densely. Further, it enables suppression of the increases in the weight of the magnets 21, 22 and the cost.

Second Embodiment

Figure 11A:
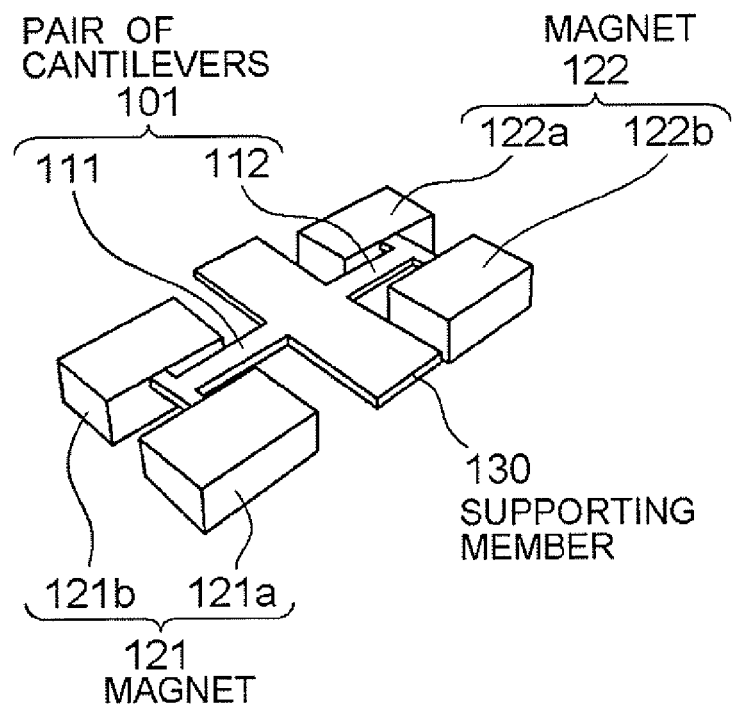
FIG. 11A is a perspective view from the top and FIG. 11B is a perspective view from the bottom.
Figure 11B:
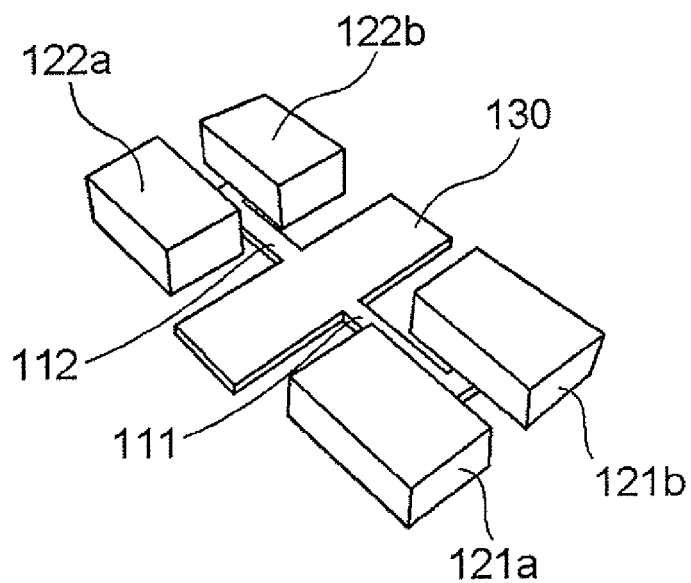

A second embodiment of the present invention will be described by referring to FIG. 11 and FIG. 12. FIG. 11 is an illustration for showing the first structural body according to the second embodiment, including a pair of cantilevers and magnets, in which FIG. 11A is a top perspective view and FIG. 11B is a perspective view viewed from the back face side. FIG. 12 is an illustration for showing the layout of the magnetic field sensor chips in that state.

As shown in FIG. 11, a pair of cantilevers 101 according to this embodiment are arranged almost on a same straight line, and the fixed ends of each of the levers 111, 112 are arranged to oppose each other. The levers are fixed to a single plate-type supporting member 130 at each of the fixed ends. Thus, the free ends of each of the levers 111 and 112 are positioned on the opposite side from each other. With this, each of the magnets 121, 122 mounted at each free end can be arranged with a distance therebetween. Furthermore, each of the magnets 121, 122 is provided by being further divided into two. For this, there are provided short auxiliary members that extend from the free end parts of each of the levers 111, 112 to the levers 111, 112 vertically, and each of the divided magnets (121a, 121b and 122a, 122b) is provided on both end parts thereof.

Figure 12A:
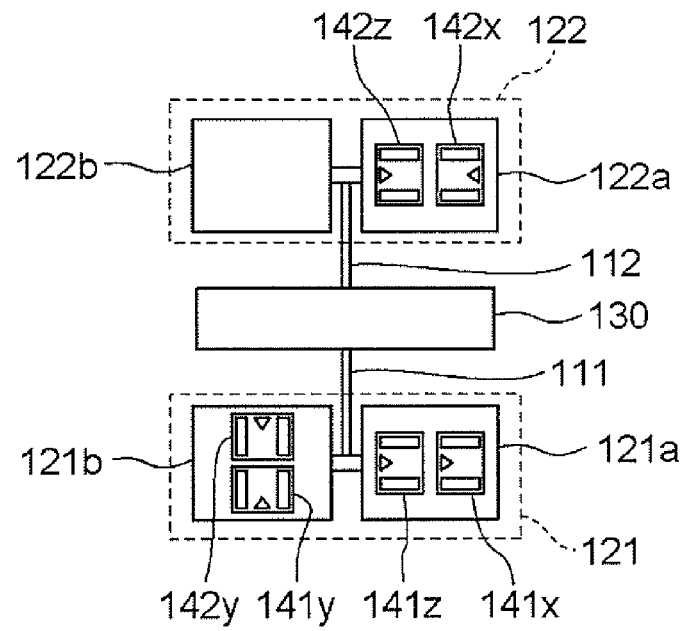
FIGS. 12A and 12B are illustrations for respectively showing the layout of the sensors for directions of each axis with respect to the cantilevers according to the second embodiment.
Figure 12B:
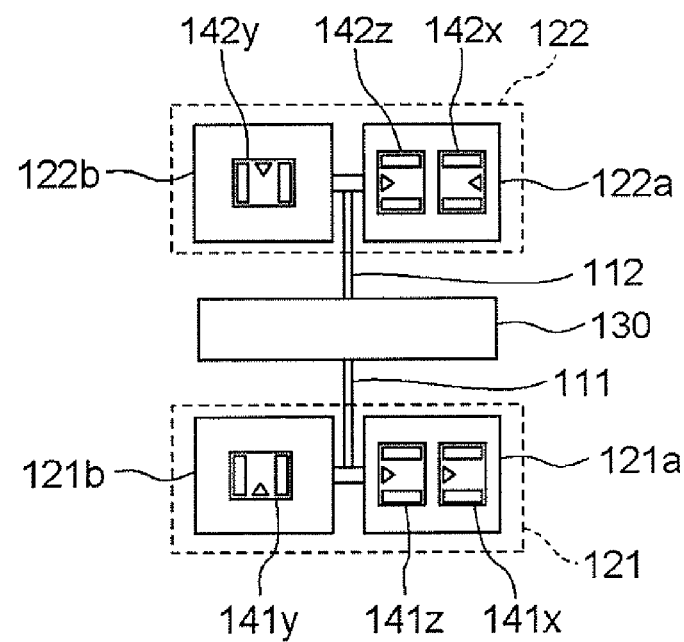

In accordance with this, pairs of magnetic field sensor chips for each axis are arranged beneath each of the magnets 121, 122 like the above-described embodiment. At that time, each of the magnetic field sensor chips are arranged to correspond to the divided magnets 121, 122. Specifically, as shown in FIG. 12A, one of the chips for the X-axis, 141x, and one of the chips for the Z-axis, 141z, are arranged beneath the magnet indicated by reference numeral of 121a. Furthermore, beneath the magnet indicated by the reference numeral 121b, a pair of chips 141y and 142y are arranged. Beneath the magnet indicated by the reference numeral 122a, the other chip for the X-axis, 142x, and the other chip for the Z-axis, 142z, are provided. As shown in FIG. 12B, each of the pair of chips 141y, 142y for the Y-axis may be arranged beneath the pair of magnets 121b, 122b, respectively.

With this, it is possible to arrange the pair of magnets 121 and 122 with a distance therebetween, thereby allowing suppression of influences caused by other magnet at the time of detecting the direction of the magnetic field by the chips. Thereby, precision of the measurement can be improved. Furthermore, since it is unnecessary to arrange the chips densely, design and manufacture become easy. Moreover, since the use of the frame 3 shown in FIG. 1 can be avoided and the pair of cantilevers 101 are supported by the supporting member 130 arranged at the center, it is possible to save the space of the sensor itself and to lower the cost.

Third Embodiment

Figure 13A:
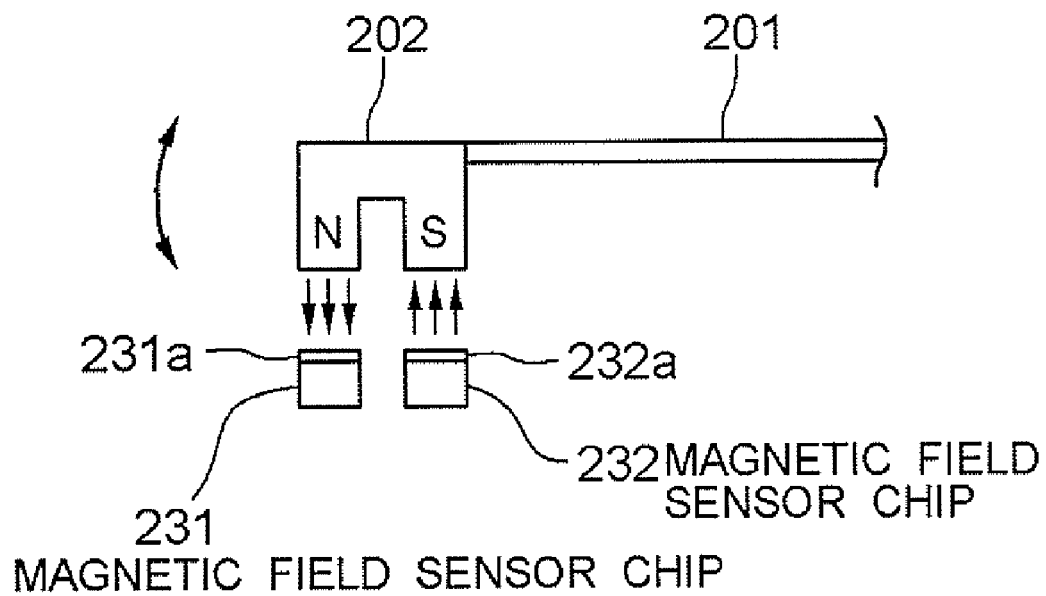
FIGS. 13A and 13B are illustrations for describing the principle of measuring the acceleration according to a third embodiment, illustrating the case of using U-shaped magnet for the magnet.
Figure 13B:
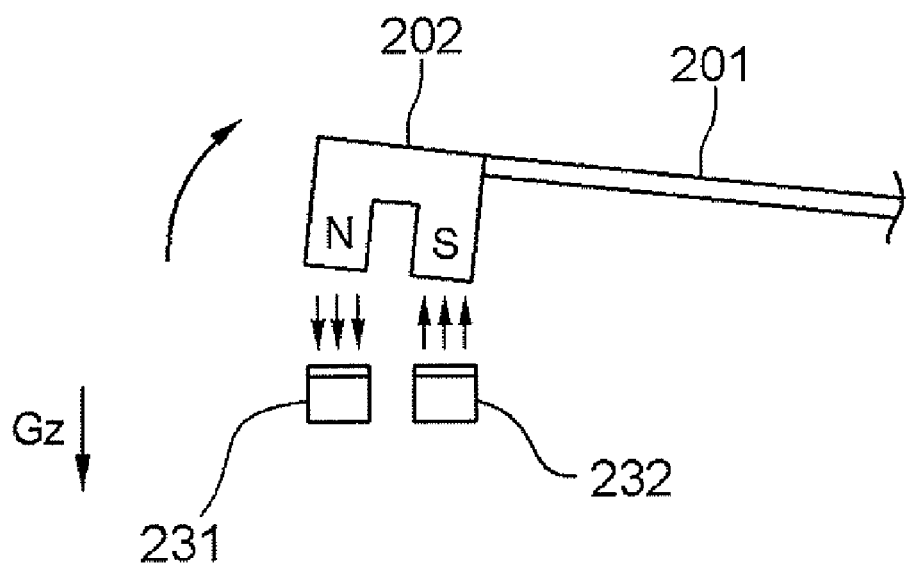
Figure 15A:
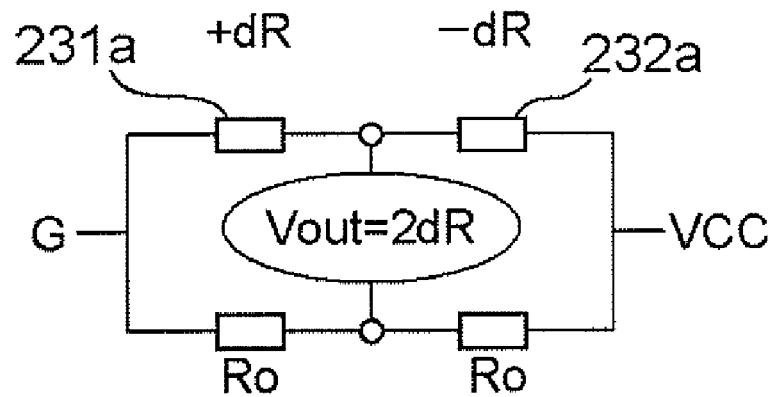
FIGS. 15A and 15B are illustrations for showing the state where the bridge circuit is constituted with the GMR element of the third embodiment.
Figure 15B:
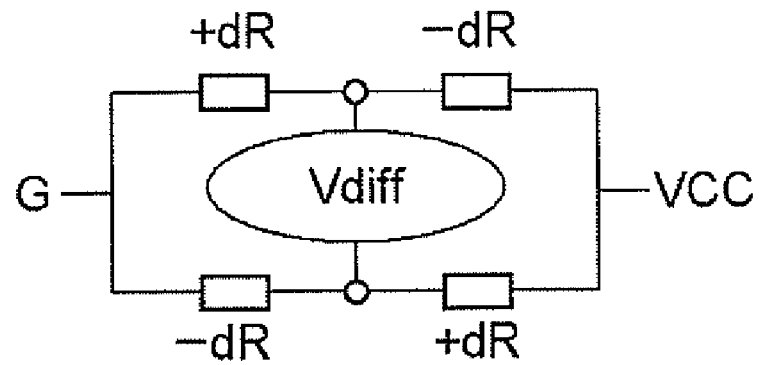
Figure 16:
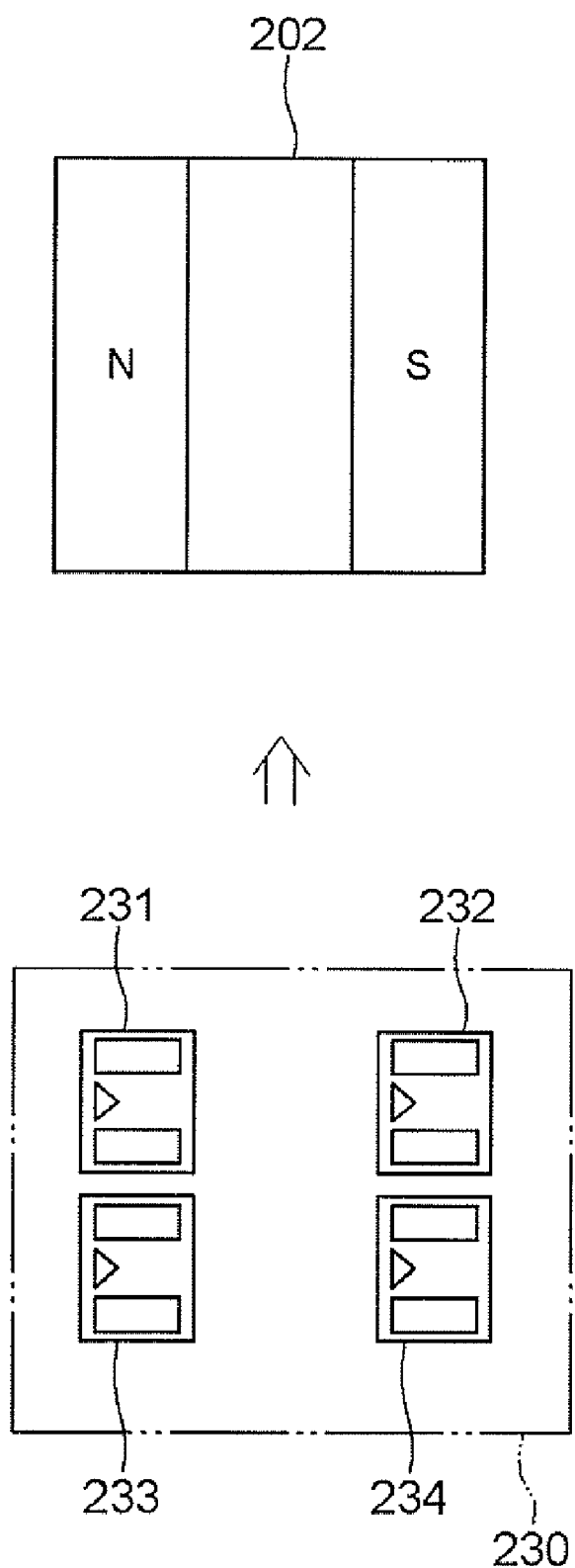
FIG. 16 is an illustration for showing the structure of a magnetic field sensor chip according to the third embodiment as well as the layout of the magnetic field sensor chips with respect to the U-shaped magnet.

A third embodiment of the present invention will be described by referring to FIG. 13-FIG. 18. FIG. 13-FIG. 15 are illustrations for describing the measurement principle of the acceleration sensor of the third embodiment. FIG. 16-FIG. 18 are a schematic diagrams for showing a part of the structure of the acceleration sensor.

Particularly, the embodiment is distinctive in respect that: U-shaped magnets are used for the above-described magnets; the directions of the magnetic fields of the N-pole face and S-pole face are detected as the reference values; and the acceleration is obtained from the difference thereof to improve the sensitivity. In the followings, there will be described the principle for measuring the acceleration and the structure of the acceleration according to the embodiment.

First, as in the above-described first and second embodiments, the fundamental measurement principle of the acceleration sensor according to the embodiment is achieved by detecting, through using the acceleration sensor chips, the direction of the magnetic field that is generated by a magnet 202, which is supported by a cantilever 201 and the position and posture thereof change when there is generated the acceleration.

The embodiment uses the U-shaped magnet 202 as shown in FIG. 13 in order to improve the precision of the measurement further. The U-shaped magnet 202 is mounted at the free end of the cantilever 201 in such a manner that the N-pole face and the S-pole face are directed towards the bottom. By using the U-shaped magnet 202 in this manner, the magnetic field from each pole face does not leak to the periphery and the magnetic field is better directed to the vertical direction with respect to each pole face, thus providing directivity. Therefore, it becomes possible to detect the inclination of the magnet 202, i.e. the acceleration, with high precision. The magnet may not have to be U-shaped magnet as long as it is the magnet having the N-pole face and the S-pole face integrally formed to face the same direction.

Furthermore, in order to suppress leakage of the magnetic fields by directing the direction of the magnetic fields of the N-pole face and the S-pole face of the U-shaped magnet 202 more towards GMR elements 231a, 231b of magnetic field sensor chips 231, 232, it is preferable to cover the part of the U-shaped magnet 202, which is opposite-side part from the surfaces where the N-pole and S-pole are formed, with a ferromagnetic substance (iron, permalloy, ferrite, etc.) That is, the U-magnet may be constituted with the N-pole part and the S-pole part formed on a plate of the ferromagnetic substance, which is formed into a cap shape. With a combination of the U-shaped magnet and the ferromagnetic substance (iron, permalloy, ferrite, etc.), leakage of the magnetic fields of the N-pole face and the S-pole face can be suppressed dramatically, and interference between the adjacent magnets can be eliminated.

The N-pole face and the S-pole face come to face towards the bottom due to the use of the U-shape magnet 202. As shown in FIG. 3A, the magnetic field sensor chips 231, 232 comprising the GMR elements are arranged to oppose each of the pole faces. With this, when there is acceleration generated to fall downward as shown in FIG. 3B (see an arrow Gz), for example, the N-pole face and the S-pole face as the magnetic-field generating faces of the magnet 202 come to incline form the state of FIG. 3A. At this time, the U-shaped magnet 202 is formed integrally so that the N-pole face and the S-pole face incline for the same angle, facing almost in the same direction. The principle for detecting the direction of the magnetic field in this state will be described by referring to FIG. 14 and FIG. 15.

Figure 14A:
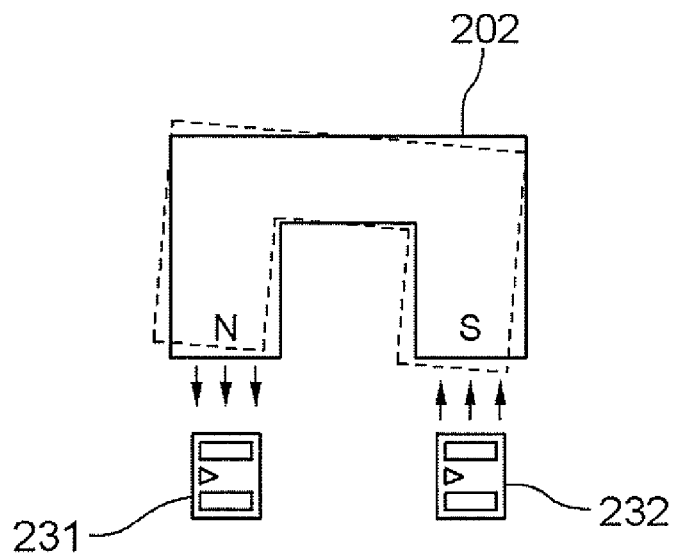
FIGS. 14A and 14B are illustrations for describing the principle of measuring the acceleration according to the third embodiment, illustrating the relation between the direction of the magnetic field and the resistance value of a GMR element when using U-shaped magnet for the magnet.
Figure 14B:
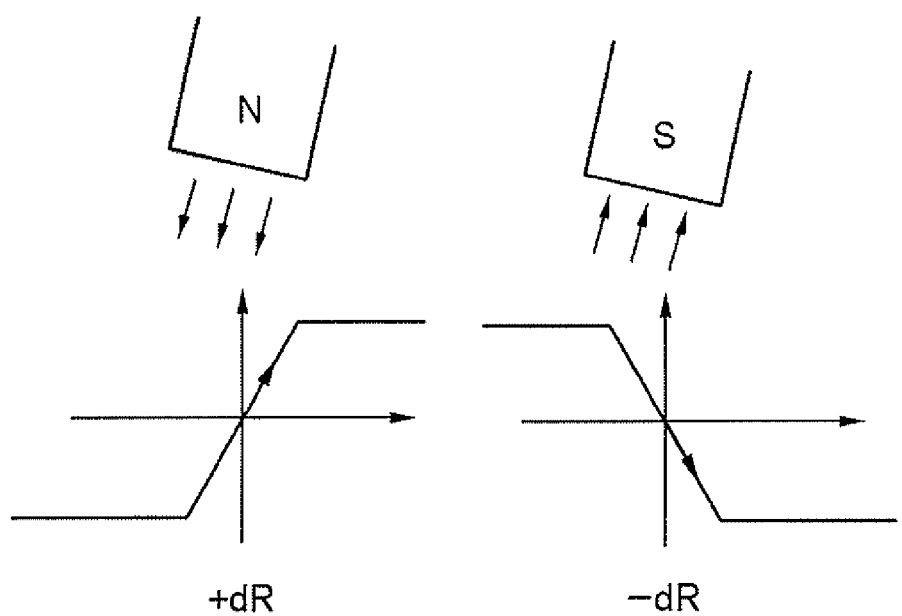

FIG. 14A schematically illustrates the U-shaped magnet 202 and the magnetic field sensor chips 231, 232 arranged to face the magnet 202. At this time, the GMR elements of each of the magnetic field sensor chips 231, 232 are fixedly magnetized in the same directions, respectively, which are constituted to be capable of detecting the direction of the magnetic fields facing in the same direction. Thus, as described above, when the U-shaped magnet 202 inclines as illustrated with a dotted line, the resistance values outputted from the GMR elements become as those shown in FIG. 14B due to the changes in the directions of the respective magnetic fields of the N-pole face and the P-pole face. That is, "+dR" is outputted from the magnetic field sensor chip 231 that opposes the N-pole face and "−dR" is outputted form the field sensor chip 232 that opposes the P-pole face. The acceleration is measured from those resistance values as will be described later.

For measuring the acceleration, first, there is obtained the difference between the resistance values outputted respectively from the magnetic field sensor chips 231 and 232 as described above. With this, the value becomes larger than the case of detecting it by a single chip. Thus, the detection sensitivity is improved. Specifically, as shown in FIG. 15A, the bridge circuit is constituted by using the GMR elements 231a, 232a of the respective magnetic field sensor chips 231, 232, and the differential voltage (Vout) between the GMR elements 231a and 232a is obtained. The differential voltage becomes "2dR", thus allowing detection of inclination of the magnet with twice the sensitivity compared to the case of detecting it by a single GMR element 231a. This is due to the fact that the GMR elements 231a, 232a are arranged with the magnetization directions fixed in the same direction as shown in FIG. 14A.

In order to improve the sensitivity still more, the resistance values that are detected according to the inclination of the U-shaped magnet 202 are used for all the four resistance values that constitute the bridge circuit as shown in FIG. 15. That is, two each of the magnetic field sensor chips 233, 234 (the GMR elements 2331, 234a) are arranged to oppose the N-pole face and the S-pole face of the U-shaped magnet 202, respectively, for detecting the resistance values according to the direction of the magnetic field by using the four GMR elements 31a, 32a, 33a, 34a. FIG. 16 shows that state.

FIG. 16 shows the U-shaped magnet 202 and a pair of magnetic field sensor chips 230. As shown in this illustration, two each of the magnetic field sensor chips 231-234 are arranged to oppose the N-pole face and the S-pole face of the U-shaped magnet 202, respectively, and as a whole, the pair of magnetic field sensor chips 230 having the four GMR elements are arranged on the magnetic field generating face of a single U-shaped magnet 202. At this time, the pair of the magnetic field sensor chip 230 are arranged with the directions of the magnetization all fixed in the same direction. This will be described in detail later.

Figure 17A:
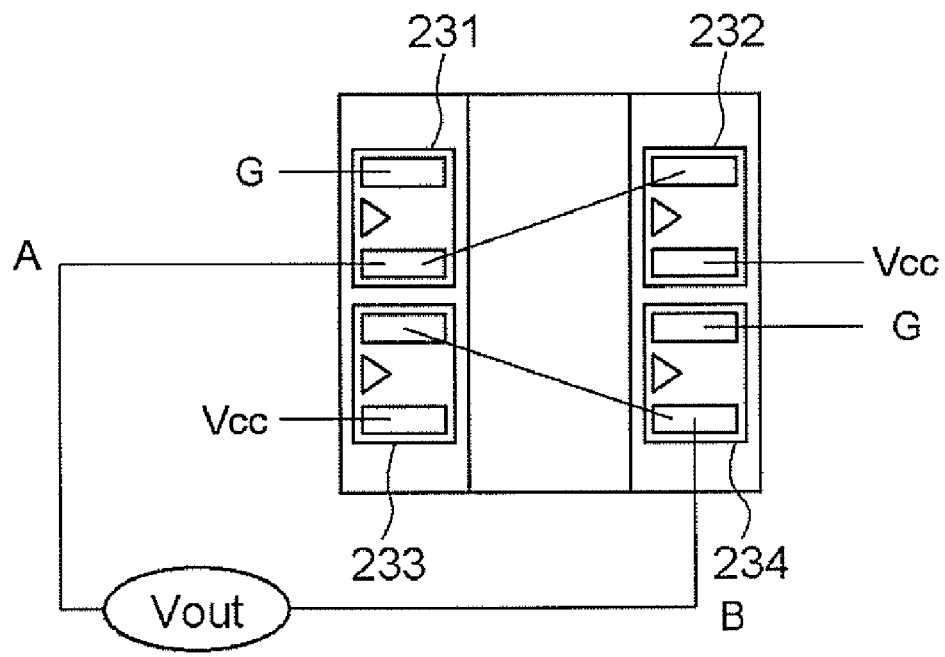
FIGS. 17A and 17B are illustrations for showing the bridge circuit constituted with the magnetic field sensor chips.
Figure 17B:
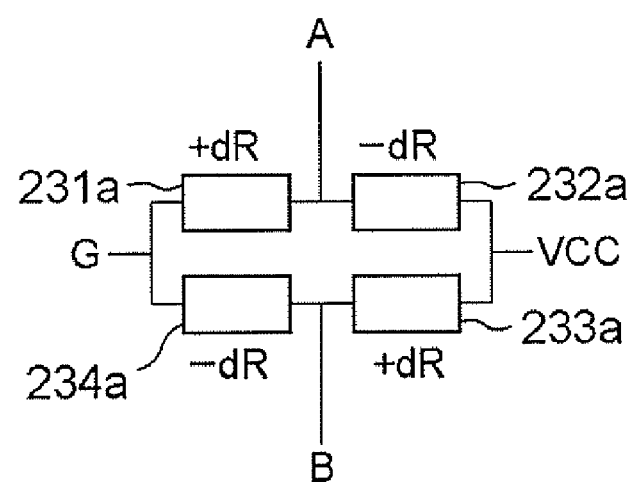

When the bridge circuit is formed with the above-described four magnetic field sensor chips 231-234, the terminals of the chips 231-234 are connected to each other as shown in FIG. 17A. As shown in FIG. 17B, the resistance value "+dR" is detected from the GMR elements 231a, 233a of the magnetic field sensor chips 231, 233 that oppose the N-pole face, and the resistance value "−dR" is detected from the GMR elements 232a, 234a of the magnetic field sensor chips 232, 234 that oppose the P-pole face. By measuring the differential voltage of the areas indicated by reference codes A, B through the bridge circuit constituted in this manner, the inclination can be detected with still higher sensitivity.

Figure 18A:
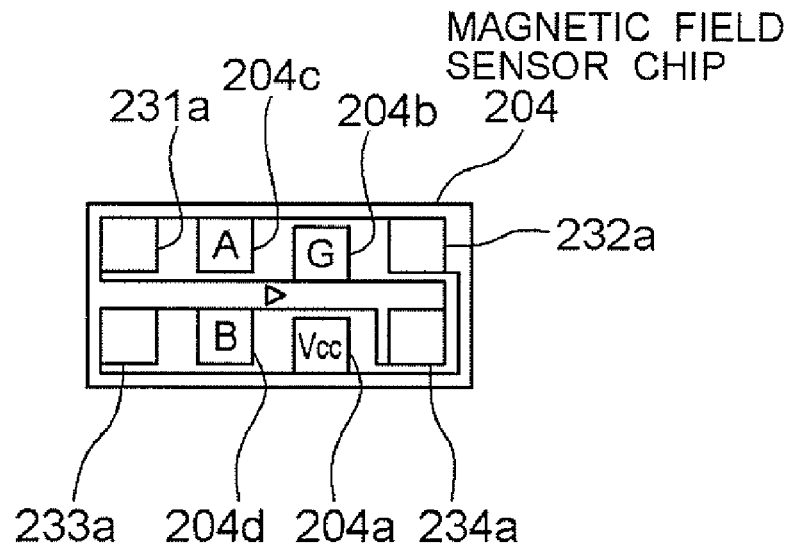
FIG. 18A is a schematic diagram for showing the structure of the magnetic field sensor chip according to the third embodiment.

FIG. 18 shows the case where the pair of magnetic field sensor chips 230 constituted with the four magnetic field sensor chips 231-234 as shown in FIG. 17A is formed as a single magnetic field sensor chip 204, while constituting the bridge circuit including each connection wiring. It is possible to make them into a single chip like this since the four GMR elements 231a-234a are fixedly magnetized in the same direction so that the four GMR elements can be easily formed simultaneously by a wafer process for manufacturing the chips. The magnetic field sensor chip 204 that is made into a single chip will be described in detail. As shown in FIG. 18A, the four GMR elements 231a-234a are formed on the single magnetic filed sensor chip 204, and there are formed the wirings for connecting between those, and each of terminals (voltage applying terminals 204a, 204b (Vcc, G), differential-voltage terminals 204c, 204d (A, B)). The respective terminals and GMR elements 231a-234a are connected to each other within the chip.

Figure 18B:
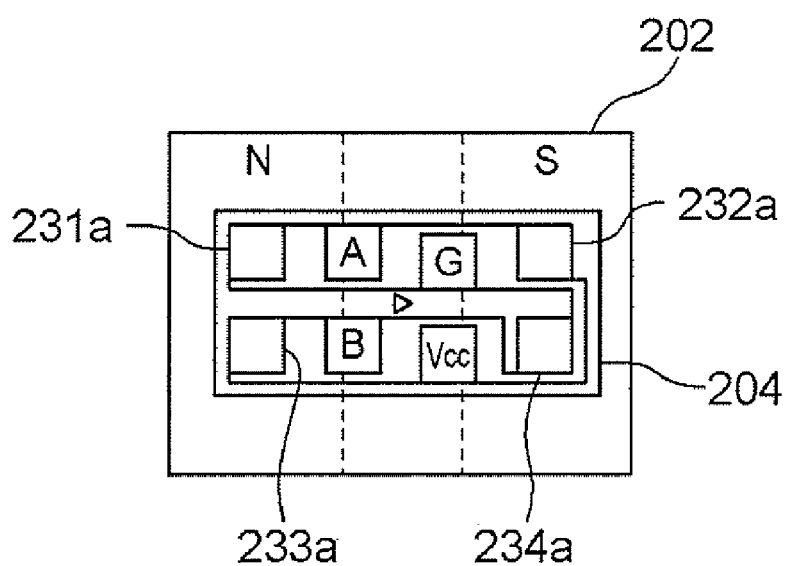
FIG. 18B is an illustration for showing the layout of the magnetic field sensor chips with respect to the U-shaped magnets.

As shown in FIG. 18B, the above-described magnetic field sensor chip 204 is arranged in such a manner that each of the GMR elements 231a-234a oppose the N-pole face and S-pole face of the U-shaped magnet 202, respectively. Detection of the differential-voltage terminals 204c and 204d (A and B) in that state allows measurement of the acceleration in accordance with the inclination of the magnet 202.

Thus, it is possible with the above-described acceleration sensor to measure the acceleration in the direction of one axis (for example, in the vertical direction (Z-axis direction)). In addition, for measuring the acceleration in the directions of two more axes, measurement of the accelerations in the directions of three axes (directions of X, Y, Z axes) can be achieved by providing, for each of the axes, the acceleration sensor constituted with the cantilever 201, the magnet 202, and the magnetic field sensor chip 204 described above.

As has been described above, by mounting the U-shaped magnet 202 to the cantilever 201 (the spring member), providing the GMR elements to oppose the N-pole face and S-pole face of the magnet, and detecting the resistance values by the bridge circuit, it is possible to measure the acceleration with high sensitivity. Particularly, a plurality of GMR elements can be arranged with the magnetizations thereof fixed in the same direction, so that they can be formed within a single chip. Therefore, size of the acceleration sensor can be reduced.

Fourth Embodiment

Figure 25:
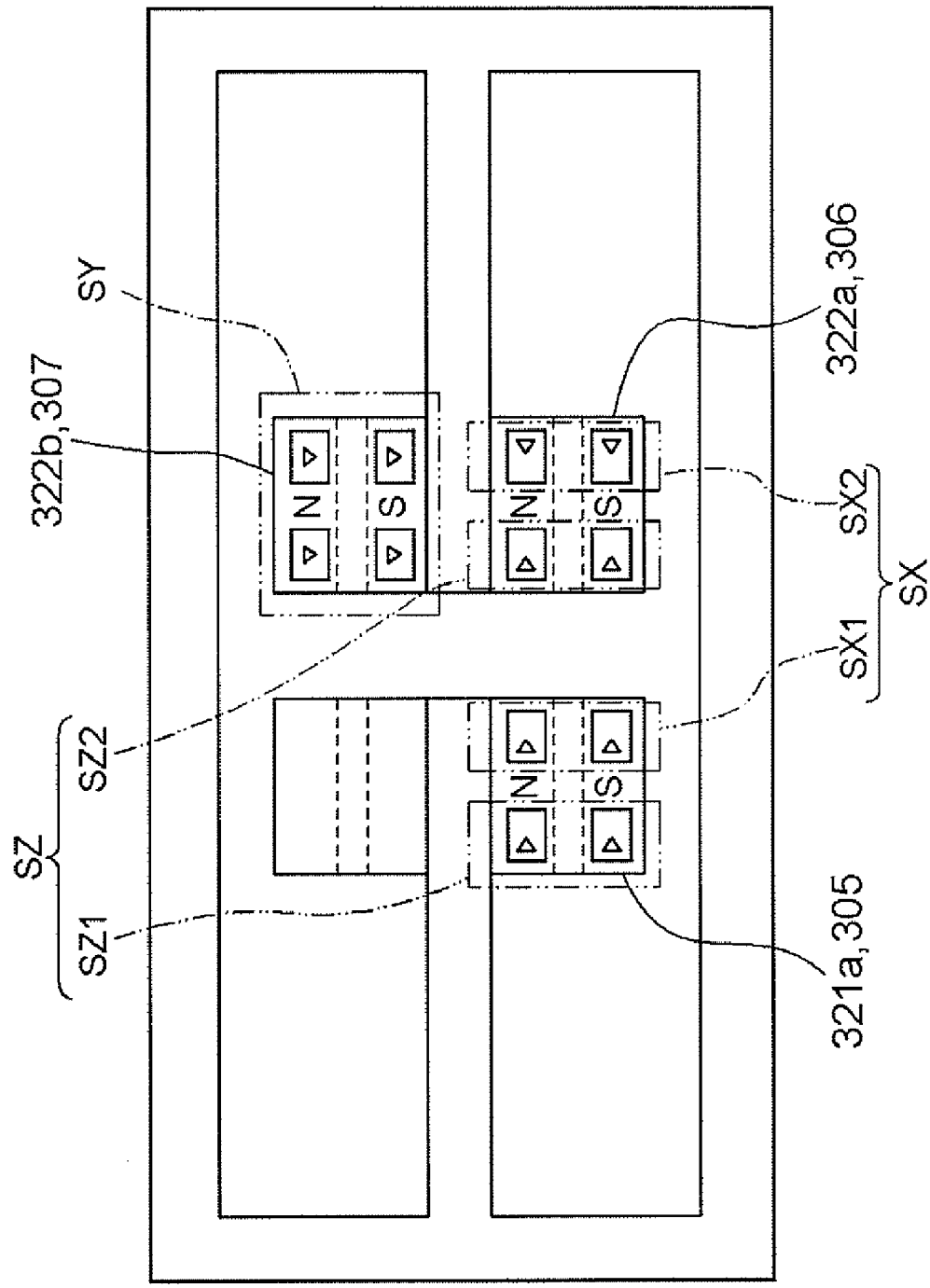
FIG. 25 is an illustration for describing the layout of the magnetic field sensor chips with respect to the U-shaped magnets according to the fourth embodiment.
Figure 26:
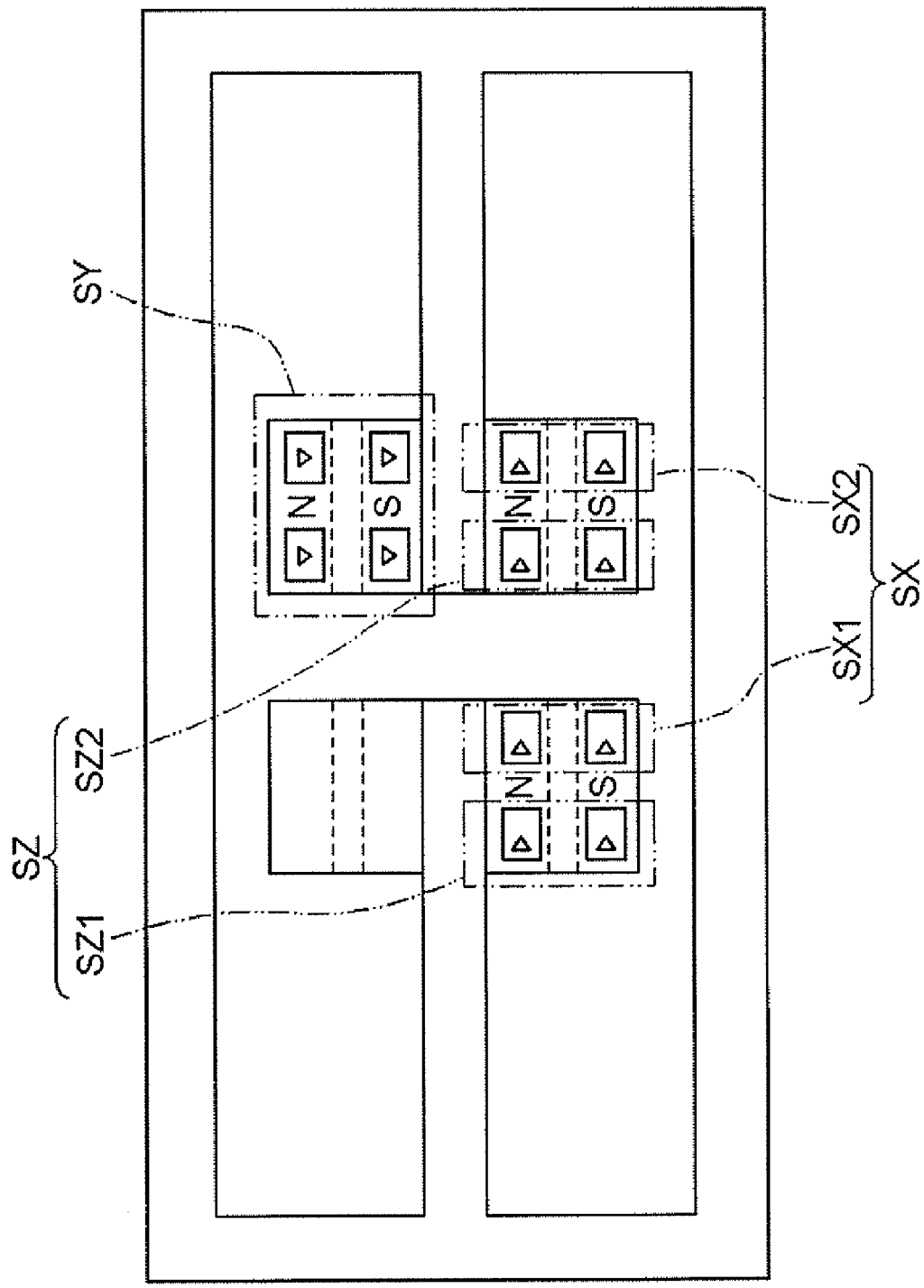
FIG. 26 is an illustration for describing a modification example of the layout of the magnetic field sensor chips with respect to the U-shaped magnets according to the fourth embodiment.
Figure 27:
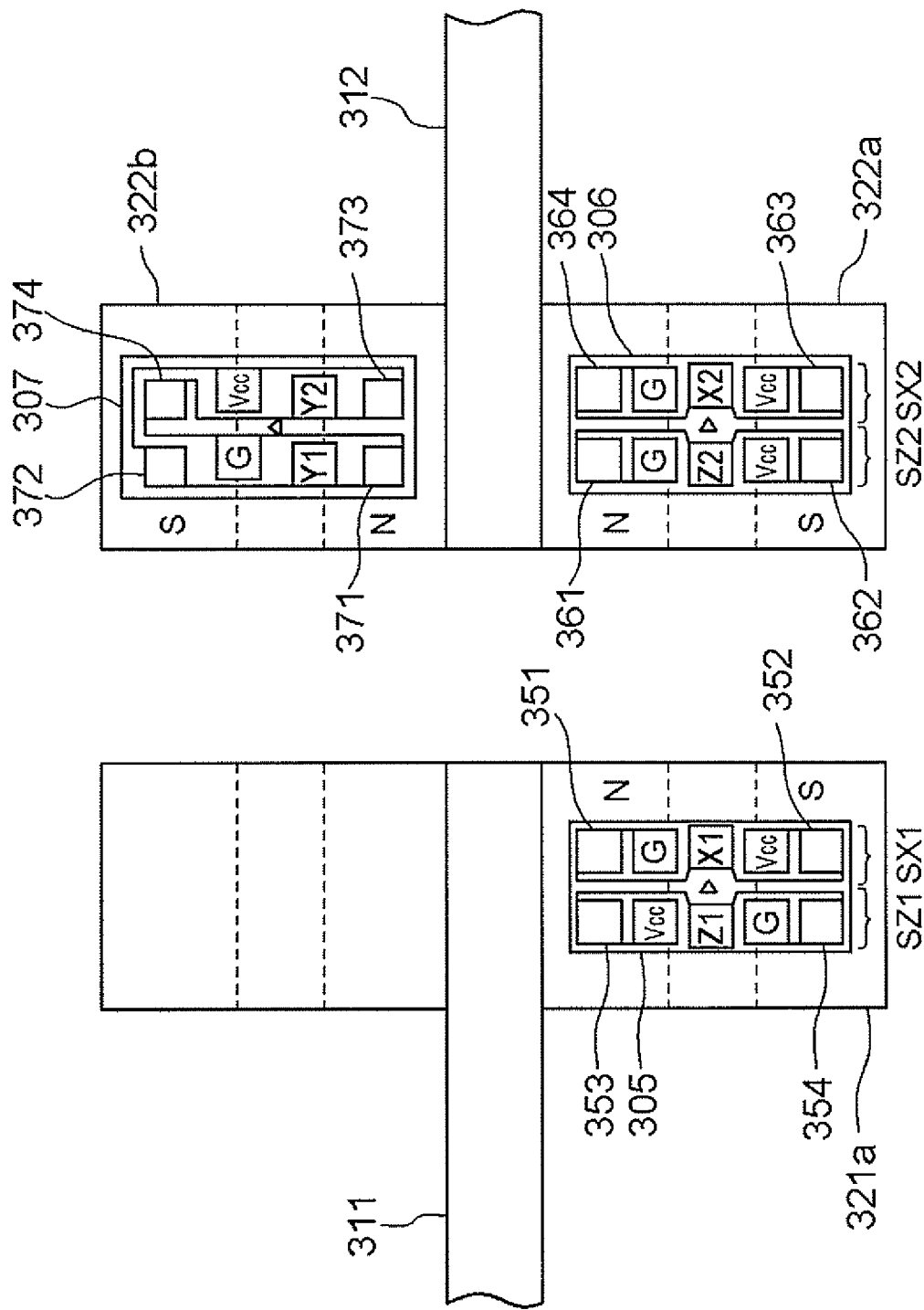
FIG. 27 is an illustration for showing the structure of each magnetic field sensor chip according to the fourth embodiment as well as the layout of the magnetic field sensor chips with respect to the U-shaped magnets.
Figure 28:
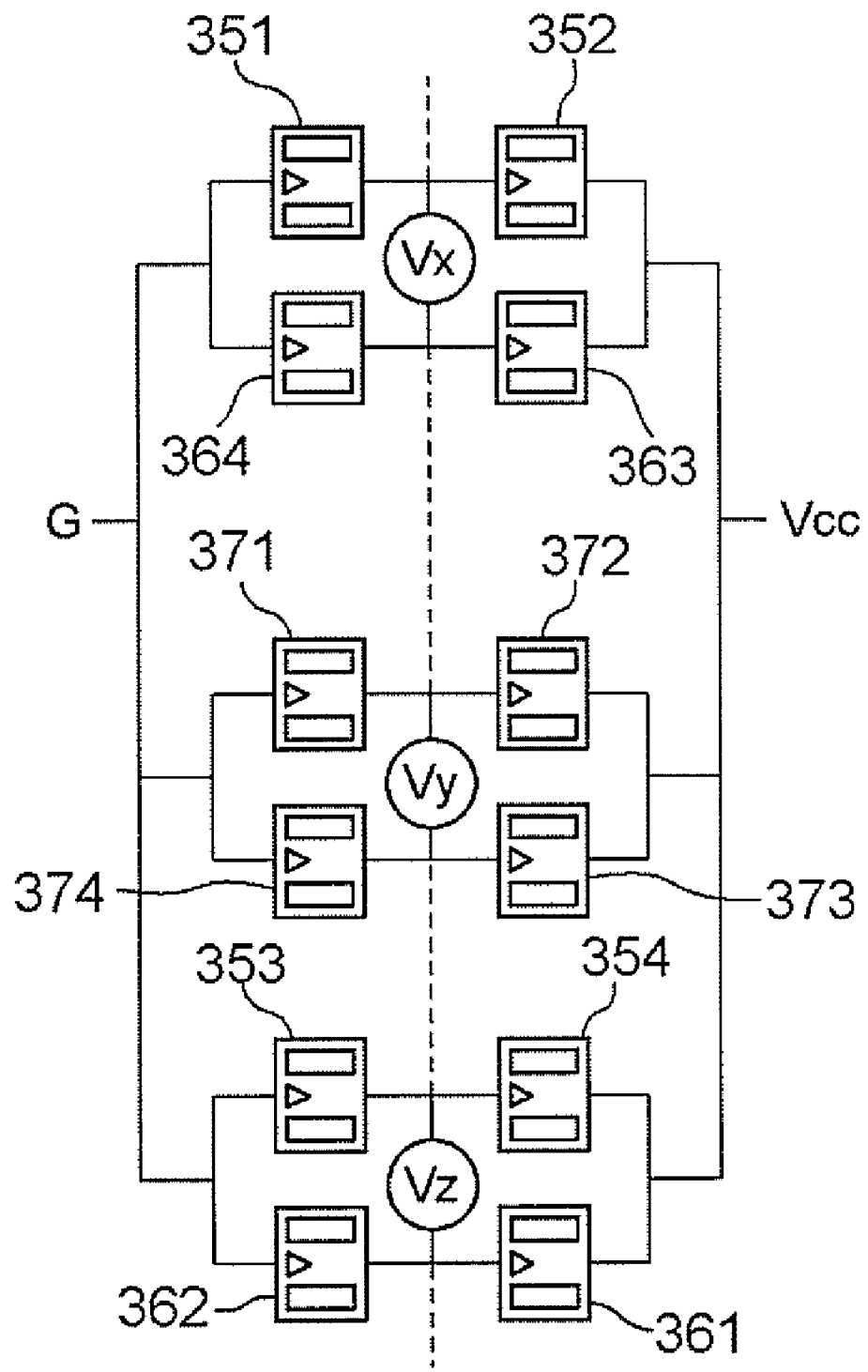
FIG. 28 is an illustration for showing the bridge circuit constituted with each of the magnetic field sensor chips according to the fourth embodiment.

Next, a fourth embodiment of the present invention will be described by referring to FIG. 19-FIG. 32. FIG. 19 and FIG. 20 are illustrations for showing the structure of the acceleration sensor. FIG. 21-FIG. 26 are illustrations for describing principle and method for measuring the acceleration. FIG. 27 and FIG. 28 are schematic diagrams for showing the structure of the acceleration sensor. FIG. 29-FIG. 32 are illustrations for showing a modification example of the structure of the acceleration sensor.

[Structure]

Figure 19A:
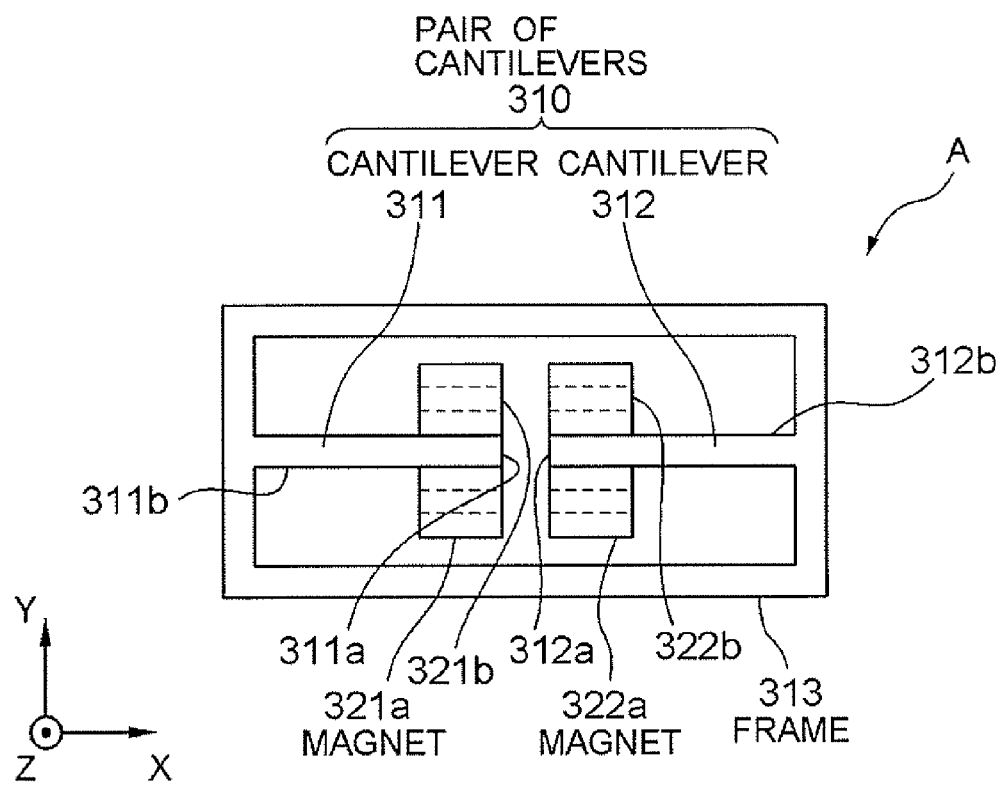
FIG. 19A is a top plan view and FIG. 19B is a perspective view from the bottom.
Figure 19B:
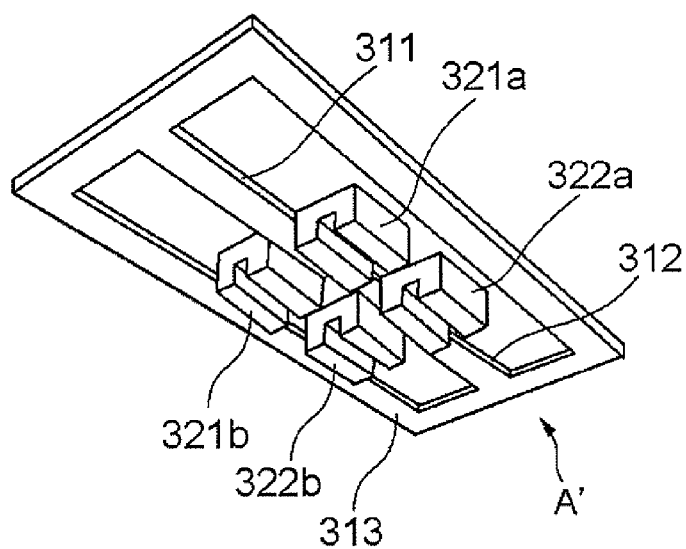
Figure 20A:
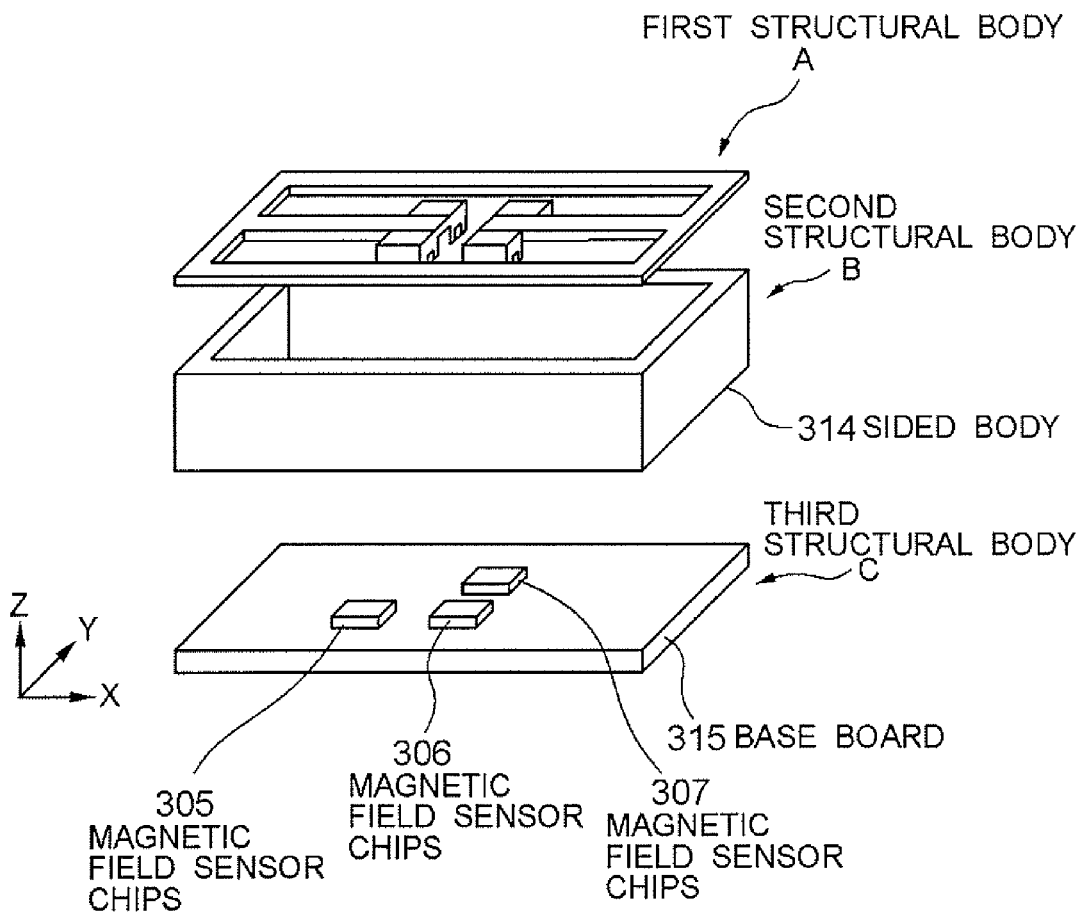
FIG. 20A is an illustration showing the disassembled state of the acceleration sensor and FIG. 20B is a simplified illustration viewed from the side.

First, there will be described the structure of the acceleration sensor according to the fourth embodiment by referring to FIG. 19 and FIG. 20. As shown in FIG. 20A, the acceleration sensor of this embodiment is constituted roughly with three structural bodies (A, B, C) like the first embodiment. First, the first structural body A arranged at the upper part of the acceleration sensor will be described by referring to FIG. 19. FIG. 19A is a top plan view thereof and FIG. 19B is a perspective view from the bottom.

As shown in FIG. 19, the first structural body A comprises a roughly-rectangular frame 313 with a prescribed thickness, and fixed ends 311b, 312b of a pair of cantilevers 310 (a cantilever 311 and a cantilever 312), each extending towards the center, are mounted integrally at the centers of each short side. The pair of cantilevers 310 are formed in such a manner that each of the levers 311, 312 is positioned on the same straight line, and each of the free ends 11a, 12a is arranged to oppose each other. That is, the two levers 311 and 312 are arranged in such a manner that the fixed end and the free end face towards the opposite directions from each other.

Further, each of the levers 311 and 312 is formed roughly in a plate form substantially in parallel to a plane formed by the frame 313, and is provided with a degree of freedom to be able to deflect towards the vertical direction with respect to the plane. Specifically, having the connection points of each of the levers 11, 12 between the frame 313 as the fulcrums, the free ends 311a and 312a deflect by generating an arc locus (deflection locus) on a plane that is vertical to the plane formed by the frame 313. Furthermore, each of the levers 311 and 312 has a degree of freedom also in a twisting direction. Each of the levers 311 and 312 is formed almost in the same length that is shorter than half the length of the long side of the frame 313. With this, the free ends 311a and 312a come to oppose each other almost at the center of the frame 313.

Furthermore, magnets 321a, 321b, 322a, 322b (magnetic field generating devices) are mounted respectively on the left and right of the opposing free ends 311a, 312a of each of the levers 311, 312. In the above, there are two magnets mounted for each of the levers 311 and 312. However, there may be one magnet provided for each of the levers 311 and 312 or may be a pair of magnets provided by corresponding to the pair of cantilevers 310.

Each of the magnets 321a, 321b, 322a, and 322b is a U-shaped magnet having the thickness in the longitudinal direction of the levers 311 and 312. These U-shaped magnets 321a, 321b, 322a, and 322b are mounted with the N-pole faces and S-pole faces facing downward, respectively (see FIG. 21A to be described later). Specifically, in the state with no acceleration applied, the directions of the magnetic fields by the U-shaped magnets 321a, 321b, 322a, and 322b are almost vertical with respect to the plate face of the plate-type cantilevers 311 and 312. That is, it faces in the direction orthogonal to the longitudinal direction of the cantilevers 311, 312 along the plane where the locus is generated when the cantilevers 311 and 312 deflect. The N-pole faces downward so that the magnetic field is outputted therefrom and the S-pole face faces upward so that the magnetic field enters therein. The U-shaped magnets 321a, 321b, 322a, and 322b are permanent magnets.

At this time, as described above, it is possible to suppress leakage of the magnetic field of the N-pole face and the S-pole face dramatically by forming each of the U-magnet constituted with the N-pole part and the S-pole part on a plate of the ferromagnetic substance, and forming it into a cap shape. Thus, it is possible to suppress interferences such as repulsion and attraction even though the magnets are arranged adjacent to each other as shown in the illustration.

As shown in FIG. 19A and FIG. 20A, the above-described first structural body A is arranged in such a manner that the plane formed by the frame 313 becomes in parallel to a surface (for example, a flat face) of an electronic device (for example, a hard disk drive) to be mounted, in which the long sides of the frame 313 face in the direction along the X-axis and the short sides along the Y-axis. Thus, each of the levers 311 and 312 is arranged along the X-axis, and arranged to deflect with a degree of freedom in the Z-axis direction. The directions of the magnetic field of the above-described magnets 321a, 321b, 322a, 322b is set to face in the Z-axis direction that is orthogonal to the horizontal direction when the device (for example, a hard disk drive) to which the acceleration sensor is mounted is placed horizontally. However, the above-described placing direction of the acceleration sensor is merely an example, and the placing direction thereof can be set arbitrarily when mounted on a prescribed electronic device.

Figure 20B:
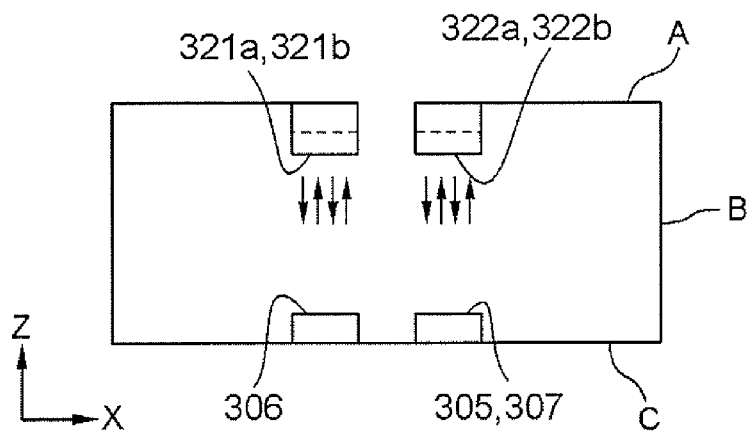

Next, the second structural body B and the third structural body C that are mounted beneath the first structural body will be described by referring to FIG. 20. FIG. 20A is an illustration for showing the disassembled state of the general structure of the acceleration sensor, and FIG. 20B is a side sectional view for showing the simplified general structure of the acceleration sensor.

First, the third structural body C comprises a base board 315 that is a roughly-rectangular plate member substantially in the same shape as that of the frame 313. Further, the second structural body B is constituted with a sided body 314 having a prescribed height to surround the periphery of the third structural body C. The sided body 314 is arranged between the third structural body C and the first structural body A so that there is a space formed between those structural bodies A and C. That is, there is formed a space which allows the pair of cantilevers 310 of the structural body A to deflect in the Z-axis direction.

Now, the third structural body C will be described in detail. Magnetic field sensor chips 305, 306, and 307 (magnetic field sensor devices) for respectively detecting the directions of the magnetic fields are arranged on the base board 315 by corresponding respectively to three magnets among the magnets 312a, 312b, 322a, 322b mounted to the frame 313. As shown in FIG. 20B, the chips are arranged at the positions right beneath each of the magnets 321a, 322a, 322b when the acceleration sensor is mounted. The chips are used for detecting the directions (see arrows) of the magnetic fields from the N-pole faces and S-pole faces of the respective magnets 321, 322a, and 322b.

The magnetic field sensor chips 305, 306, and 307 have almost the same structure as that of the magnetic field sensor chip 204 that comprises the four GMR elements formed therein as described in the third embodiment. The magnetic field sensor chip indicated by the reference numeral 307 is for detecting the acceleration in the Y-axis direction, and the two magnetic field sensor chips indicated by the reference numerals 305 and 306 are for detecting the accelerations in the X-axis direction and Y-axis direction. That is, the two magnetic field sensor chips 305 and 306 are arranged as a pair by corresponding to the pair of cantilevers 311 and 312.

The four GMR elements (magnetoresistive elements) formed respectively on the top faces of the laminated faces of each of the magnetic field sensor chips 305, 306, and 307 output the MR resistance values that correspond to the directions of the inputted magnetic fields. For detecting the magnetic field of a prescribed direction exclusively, magnetizations of these GMR elements are fixed in the specific directions. For example, for the GMR elements formed in the magnetic field sensor chips that are indicated by the reference numerals 305, 306 used for the X-axis direction and Z-axis direction, there are a plurality of those formed on a straight line that extends in the direction (Y-axis direction) vertical to the X-axis direction. The GMR elements are connected to each other in series and the magnetizations thereof are fixed in the X-axis direction for detecting the acceleration in the X-axis direction. The principle for measuring the accelerations in the X-axis direction and Z-axis direction using those will be described later. Further, for the GMR elements formed in the magnetic field sensor chip indicated by the reference numerals 307, there are a plurality of those formed on a straight line that extends in the direction (X-axis direction) vertical to the Y-axis direction. The GMR elements are connected to each other in series and the magnetizations thereof are fixed in the Y-axis direction for detecting the acceleration in the Y-axis direction.

Furthermore, on each of the magnetic field sensor chips 305, 306 and 307, there are formed the wirings for connecting each of the above-described GMR elements, as well as the connecting terminal (voltage terminals, ground terminals, differential-voltage detecting terminals, etc.) connected to those GMR elements.

Next, specifically described is the principle for detecting the accelerations in the directions of each axis. First, referring to FIG. 21-FIG. 23, there will be described the principle when detecting the accelerations in the X-axis direction and Z-axis direction. As described above, for the magnetic field sensor chips, a pair of chips 305, 306 for the X-axis and Z-axis are provided, in which the magnetization of each GMR element is fixed in the same direction as the X-axis direction. As will be described later, among the four GMR elements formed on a single magnetic field sensor chip, two GMR elements are used for the X-axis and the remaining two elements are used for the Z-axis. Thus, the bridge circuit is formed by using the total of four GMR elements, i.e. two each from the pair of magnetic field sensor chips 305 and 306, for measuring the accelerations in the directions of two axes. In the followings, the measurement principle will be described in more detail.

Figure 21A:
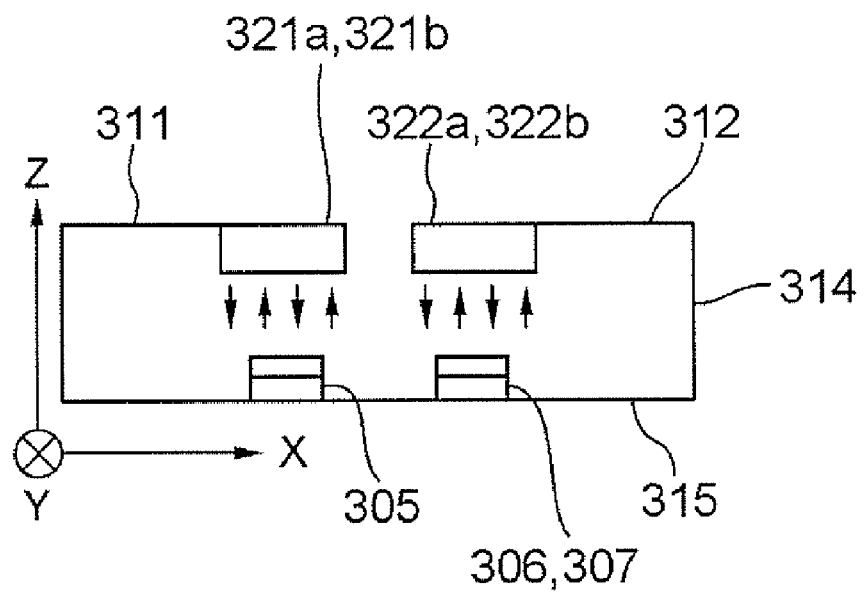
FIGS. 21A and 21B are illustrations for describing the principle of measuring the acceleration according to the fourth embodiment.
Figure 21B:
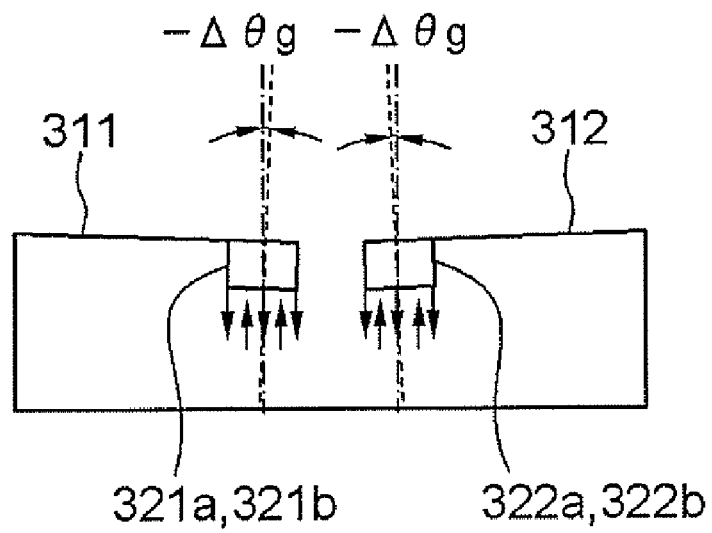

As shown in FIG. 21A, normally, the directions of the magnetic fields H from the magnets 321a, 321b, 322a, and 322b are set to be almost vertical to the laminated plane of the magnetic field sensor chips 305, 306, and 307. However, as shown in FIG. 21B, the free ends 311a, 312a of the levers 311, 312 are always deflected towards the bottom side due to the weight of the levers 311, 312 themselves and the mass of the magnets 321a, 321b, 322a, 322b. In such a case, each of the free ends is inclined by "−Δθg" with respect to the vertical direction, so that the directions of the magnetic fields with respect to the GMR elements also become inclined by "−Δθg" with respect to the vertical direction. The levers 311 and 312 are provided facing towards the opposite directions from each other, so that the directions of the angles in terms of positive and negative state are also reversed. This illustration shows the state where there is the acceleration g being applied. The acceleration in the X-axis direction and the acceleration in the Z-axis direction can be expressed by the change amount in the directions of the magnetic fields, i.e. by the angle calculated by finding the sum and difference of the inclined angles of the magnets 321a, 321b, 322a, and 322b. Specifically, the angle Ax corresponding to the acceleration in the X-axis direction can be obtained by finding the difference of the penetration angles, and the angle Az corresponding to the acceleration in the Z-axis direction can be obtained by finding the sum of the penetration angles as in the followings expressions.

$$Ax = -\Delta\theta g - (-\Delta\theta g) = 0$$

$$Az = -\Delta\theta g + (-\Delta\theta g) = -2\Delta\theta g$$

Figure 22A:
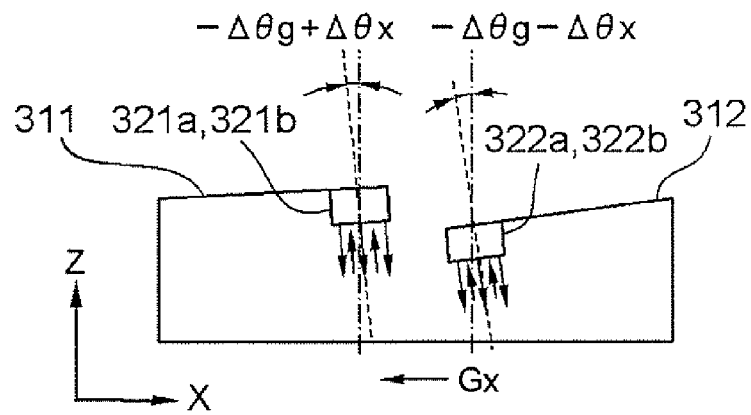
FIGS. 22A-22C are illustrations for describing the principle of measuring the acceleration according to the fourth embodiment.

Next, there will be described the case of accelerating in the X-axis direction by referring to FIG. 22A. As shown in this illustration, when it is accelerated in a direction of an arrow Gx, the free end (magnet 21) of one of the levers, 311, deflects in the positive direction of the Z-axis. Thus, the magnet 321a comes to incline for "−Δθg+Δθx" with respect to the vertical direction. Meanwhile, the free end (magnet 322a) of the other lever 312 deflects in the negative direction of the Z-axis. Thus, the magnet 322a comes to incline for "−Δθg−Δθx" with respect to the vertical direction. For obtaining the angle Ax corresponding to the acceleration in the X-axis direction and the angle Az corresponding to the acceleration in the Z-axis direction based thereupon, there are found the following expressions.

$$Ax = (-\Delta\theta g + \Delta\theta x) - (-\Delta\theta g - \Delta\theta x) = +2\Delta\theta x$$

$$Az = (-\Delta\theta g + \Delta\theta x) + (-\Delta\theta g - \Delta\theta x) = -2\Delta\theta g$$

Figure 22B:
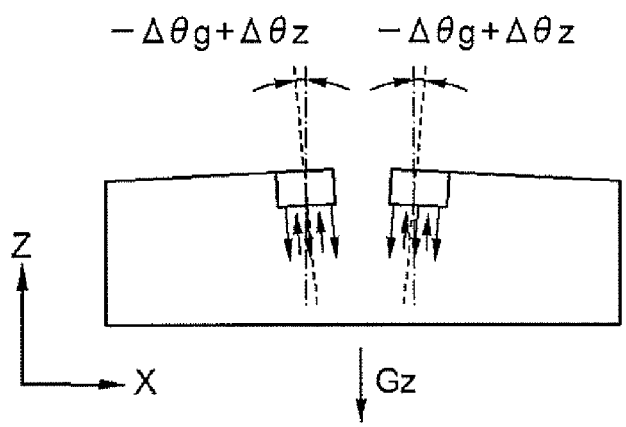

Similarly, FIG. 22B shows the case of accelerating in the Z-axis direction. As shown in this illustration, when it is accelerated in a direction of an arrow Gz, both free ends (magnets 321a, 322a) of the pair of levers 311 and 312 deflect in the positive direction of the Z-axis. Thus, the magnets 321a and 322a come to incline for "−Δθg+Δθz" with respect to the vertical direction. For obtaining the angle Ax corresponding to the acceleration in the X-axis direction and the angle Az corresponding to the acceleration in the Z-axis direction based thereupon, there are found the following expressions.

$$Ax = (-\Delta\theta g + \Delta\theta z) - (-\Delta\theta g + \Delta\theta z) = 0$$

$$Az = (-\Delta\theta g + \Delta\theta x) + (-\Delta\theta g + \Delta\theta z) = -2\Delta\theta g + 2\Delta\theta z$$

Figure 22C:
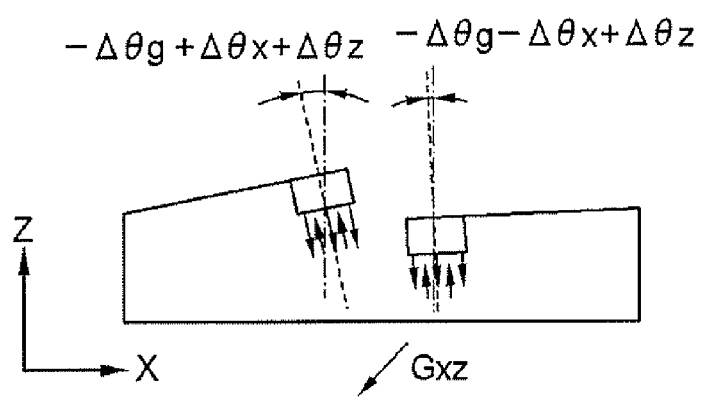

Similarly, FIG. 22C shows the case of accelerating in the X-axis direction and Z-axis direction along the X-Z plane. As shown in this illustration, when it is accelerated in a direction of an arrow Gxz, the free ends (magnets 321a, 322a) of the pair of levers 311 and 312 deflect in the different directions from each other along the Z-axis direction since there is included the acceleration in the X-axis direction. Thus, one of the magnets, 321a, comes to incline for "−Δθg+Δθx+Δθz" with respect to the vertical direction while the other magnet 322a comes to incline for "−Δθg−Δθx+Δθz" with respect to the vertical direction. For obtaining the angle Ax correspond-ing to the acceleration in the X-axis direction and the angle Az corresponding to the acceleration in the Z-axis direction based thereupon, there are found the following expressions.

$$Ax = (-\Delta\theta g + \Delta\theta x + \Delta\theta z) - (-\Delta\theta g + \Delta\theta x + \Delta\theta z) = +2\Delta\theta x$$

$$Az = (-\Delta\theta g + \Delta\theta x + \Delta\theta z) + (-\Delta\theta g - \Delta\theta x + \Delta\theta z) = -2\Delta\theta g + 2\Delta\theta z$$

As described above, when accelerated in the X-axis direction, the free ends of the pair of cantilevers 311 and 312 deflect in the opposite direction from each other. Meanwhile, when accelerated in the Z-axis direction, each of the free ends deflects in the same direction. Thus, through specifying combinations of the respective deflection directions of the cantilevers 311, 312 by detecting the directions of the magnetic fields in the X-axis direction of each of the magnets 321a, 322a, the accelerations in the directions of the two axes, i.e. the X-axis direction and Z-axis direction, can be measured.

Figure 23A:
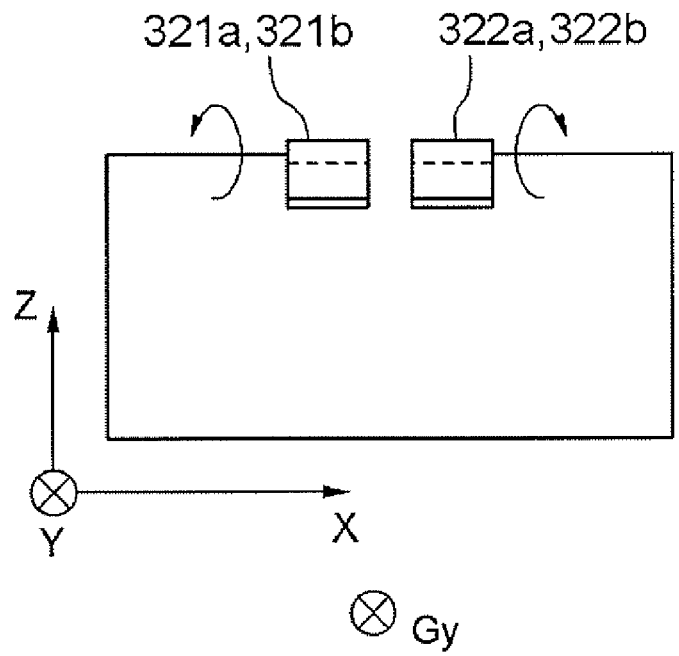
FIGS. 23A and 23B are illustrations for describing the principle of measuring the acceleration according to the fourth embodiment.
Figure 23B:
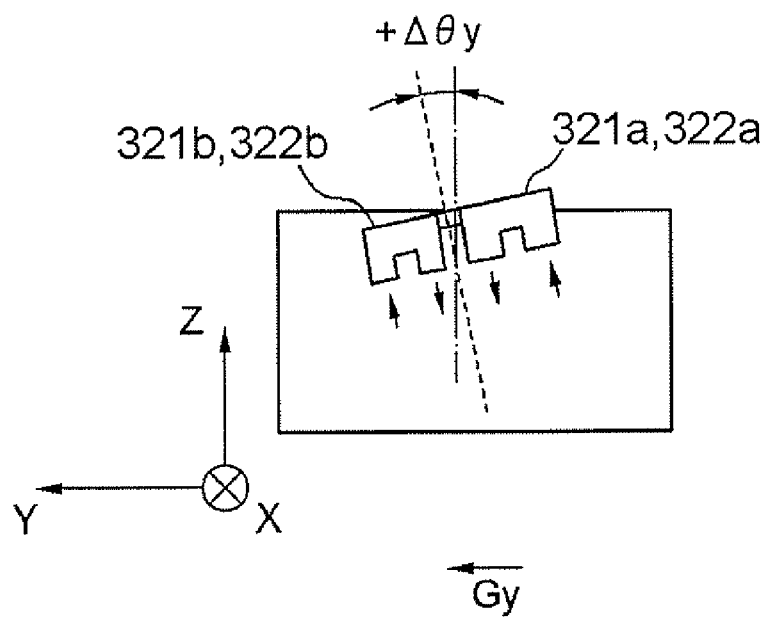

Further, FIG. 23 shows the case of accelerating in the Y-axis direction. When accelerated in the Y-axis direction, both cantilevers 311 and 312 are twisted in the same revolving direction. Thus, the magnets 321a, 321b, 322a, and 322b are all rotated in the same direction. With this, the magnets 321a, 321b, 322a, and 322b come to incline for "+Δθy" with respect to the vertical direction. Therefore, the angle of inclination "+Δθy" can be used as the angle Ay that corresponds to the acceleration in the Y-axis direction.

Both of the GMR elements for the X-axis direction and Z-axis direction are fixedly magnetized in the X-axis direction. Thus, as described above, it is necessary to detect the difference between the combinations of the deflection directions of the pair of cantilevers 311, 312 from the resistance values outputted from the respective GMR elements. For that, layout of the GMR elements within the pair of magnetic field sensor chips 305 and 306 for each axis is set as follows.

Figure 24A:
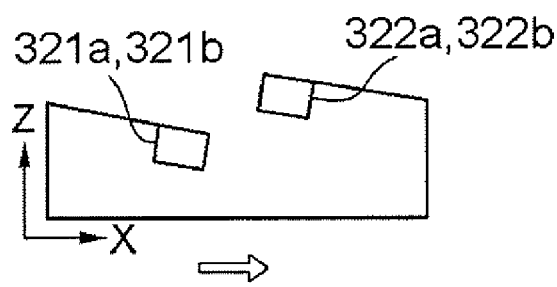
FIGS. 24A-24D are illustrations for describing proper layout of the sensor chips.

First, FIG. 24A shows the state of the pair of the cantilevers 311, 312 where there is generated the acceleration in the X-axis direction (in the direction of an arrow facing towards the right side), whereas the FIG. 248 shows the state of the pair of the cantilevers 311, 312 where there is generated the acceleration in the Z-axis direction (in the direction of an arrow facing towards the upper side). Corresponding to FIGS. 24A and 24B mentioned above, FIGS. 24C and 24D respectively show the positive/negative relations between the penetration angles of the magnetic field H to the GMR element and the resistance values. In the illustrations, the triangles illustrated within the magnetic filed sensor chips 305 and 306 show the positive/negative directions of the outputted resistance values according to the directions of the magnetic field to be measured. It is noted that the positive/negative state of the inclined angles of the magnets 321a and 322a is set originally in the reverse directions from each other (see FIG. 21 or the like), since the free ends of the respective cantilevers 311a and 312a are provided by opposing each other.

First, there is considered the resistance values detected by the GMR elements for the X-axis direction (the case of FIG. 24A). When the GMR elements of the pair of the magnetic field sensor chips 305 and 206 are arranged to face in the opposite directions from each other as in the upper part of FIG. 24C, the resistance values dR come to have the positive/negative state that is reversed from each other as in the lower part of FIG. 24C. Inversely, when the GMR elements are arranged to face in the same direction, each of the resistance values dR becomes positive or negative. For detecting the differential voltages by the bridge circuits in that state, the differences of the two resistance values can be calculated as follows.

Case of Facing Opposite Direction: $Dx=+dR-(-dR)=+2dR$

Case of Facing Same Direction: $Dx=+dR-(+dR)=0$

Figure 24B:
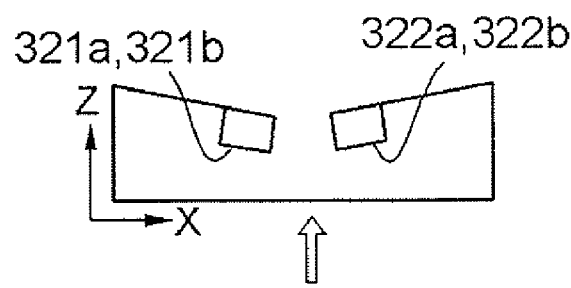
Figure 24C:
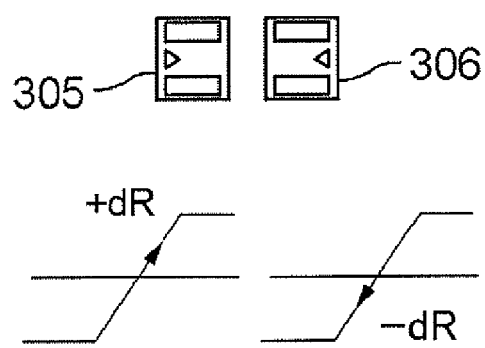

Based on this, it is necessary for the layout of the GMR elements within the pair of magnetic field sensor chips 305, 306 for the X-axis direction to be set to face in the reverse directions from each other as shown in FIG. 24C.

Next, there is considered the resistance values detected by the GMR elements for the Z-axis direction (the case of FIG. 24B). When the GMR elements of the pair of the magnetic field sensor chips 305 and 306 are arranged to face in the same direction as in the upper part of FIG. 24D, the resistance values dR come to have the positive/negative state that is reversed from each other. Inversely, when the GMR elements are arranged to face in the opposite directions from each other, each of the resistance values dR becomes positive. For detecting the differential voltages by the bridge circuits in that state, the differences of the two resistance values can be calculated as follows.

Case of Facing Same Direction: $Dx=+dR-(-dR)=+2dR$

Case of Facing Opposite Direction: $Dz=+dR-(+dR)=0$

Figure 24D:
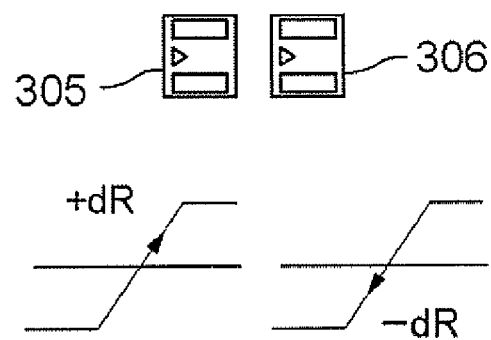

Based on this, the layout of the GMR elements within the pair of magnetic field sensor chips 305, 306 for the Z-axis direction is set to face in the same direction as shown in FIG. 24D.

Furthermore, for the resistance value detected by the GMR elements for the Y-axis direction, it is the same as the case of the above-described third embodiment. Thus, all the GMR elements are to be arranged to face in the same direction.

Furthermore, the layout of the magnetic field sensor chips 305, 306, and 307 will be described in more detail by referring to FIG. 25-FIG. 27. First, as described above, each of the magnets 321a, 322a, and 322b is arranged to oppose the respective chips 305, 306, and 307. In that state, as shown in FIG. 25, two GMR elements within the magnetic field sensor chip 305 opposing the magnet indicated by the reference numeral 321a are used for the X-axis (reference numeral SX1). Similarly, two GMR elements within the magnetic field sensor chip 306 opposing the magnet indicated by the reference numeral 322a are used for the X-axis (reference numeral SX2). Thereby, an acceleration sensor SX for the X-axis is constituted. Likewise, an acceleration sensor SZ for the Z-axis is constituted with the remaining GMR elements (SZ1, SZ2) of the magnetic field sensor chips 305, 306. As described above, the GMR elements constituting the X-axis sensor SX are to be arranged to face in the opposite directions from each other in the magnetic field sensor chips 305 and 306. With that, however, the fixed magnetization directions of all the GMR elements do not face in the same direction in the magnetic field sensor chip indicated by the reference numeral 306, which makes it difficult to manufacture the GMR elements within a single chip. Therefore, it is necessary to set the GMR elements to face in the same directions as marked with the reference numerals SZ2 and SX2 in FIG. 26. Accordingly, the layout of the voltage applying terminals and the like connected to those GMR elements may be set reversed from that of the normal case. This will be described later.

Furthermore, the four GMR elements within the magnetic field sensor chip 307 arranged to oppose the magnet that is indicated by the reference numeral 322b are used as a Y-axis sensor SY. It is arranged at this time to face in the twisting direction of the lever 312.

Subsequently, there will be described the structures and the layout of the actually mounted magnetic field sensor chips 305, 306, and 307 by referring to FIG. 27. First, the magnetic field sensor chip 307 for the Y-axis employs the same structure as that of the third embodiment described by referring to FIG. 18, on which four GMR elements 371, 372, 373, and 374 are formed with the magnetizations fixed in the same direction. Each of the GMR elements 371-374 is arranged to oppose the N-pole face and S-pole face of the magnet 322b. Further, voltage applying terminals (Vcc, G) and differential-voltage detecting terminals (Y1, Y2) are formed on the magnetic field sensor chip 307, thereby forming a bridge circuit. By measuring the differential voltage between the differential-voltage detecting terminals (Y1, Y2) with this, as described above, it becomes possible to detect the inclination of the magnet 322b, i.e. the acceleration in the Y-axis direction, with high sensitivity.

Similarly, the pair of magnetic field sensor chips 305 and 306 used for the X-axis and Y-axis also comprise four GMR elements (351, 352, 353, 354) and four GMR elements (361, 362, 363, 364), respectively, with the magnetizations fixed in the same direction in each chip. Two each from those GMR elements of each of the chips 305 and 306 constitute the X-axis sensors SX1, SX2 (351, 352, 363, 364), and the Z-axis sensors SZ1, SZ2 (353, 354, 361, 362). For the X-axis sensor, the GMR element SX2 of the magnetic field sensor chip indicated by the numeral reference 306 is set to have the reversed output resistance value through inversely connecting the voltage applying terminals, which provides the same effect as that of the case of inverting the SX1. Thus, by detecting the inclinations of each of the magnets 321a, 322a through constituting the bridge circuits in the sensors for each axis and measuring the differential voltage between the differential-voltage detecting terminals (X1, X2) and (Z1, Z2), the accelerations in the X-axis and the Z-axis can be measured as described above. That is, with the above-described structure, the bridge circuit as shown in FIG. 28 is formed in each of the GMR elements of the each of the magnetic field sensor chips 305, 306, and 307. Therefore, by detecting the respective differential voltages Vx, Vy, and Vz by those bridge circuits, changes in the resistance values of each GMR element, i.e. the accelerations in the directions of each axis, can be detected based thereupon.

As shown in FIG. 27, magnetizations of the GMR elements formed in the magnetic field sensor chips 305, 306, and 307 are all fixed in the same direction in each of the chips. Thus, the GMR elements can be easily manufactured within a single chip by a wafer process for manufacturing the chips, which enables reduction in the size of the magnetic field sensor chips. Furthermore, the four GMR elements each are formed into a single chip so that the wiring connection therebetween becomes easy when constituting the bridge circuit. Thus, it can be used easily.

In the above, there has been described the case where the N-pole, S-pole of the U-shaped magnet 321a or the like are mounted in parallel to the longitudinal direction of each of the levers 311, 312, and the GMR elements of the magnetic field sensor chips 305, 306, 307 are arranged by corresponding to those. However, it is not limited to this. As shown in FIG. 29, the N-pole, S-pole of the U-shaped magnet 321a or the like may be mounted by extending vertically with respect to the longitudinal direction of each of the levers 311, 312. In that case, the GMR elements of each of the magnetic field sensor chips 305, 306, and 307 are arranged by corresponding to the N-pole and S-pole.

Furthermore, in the above, there has been described by referring to the case where changes in the resistance values of each of the GMR elements are detected by forming the bridge circuits, and inclinations of each of the magnets 321, 321b, 322a, 322b provided to each of the cantilevers 311, 312 are detected based thereupon to measure the accelerations in the directions of each axis finally. However, it is not limited to conduct the measurement with such structure. There may be employed the structure and method which detect the resistance values of each of the GMR elements without using the bridge circuits.

Further, other structure and method may be employed to measure the accelerations in the X-axis direction and the Z-axis direction by detecting the difference in the deflection directions of each of the cantilevers 311, 312 along the Z-axis direction without using the bridge circuits. At this time, it is possible to use the GMR elements in common for the X-axis and Z-axis by directly detecting the resistance values of each GMR element while discriminating the positive/negative state of the changed amount, for example. Thus, the structure can be more simplified.

Furthermore, although the pair of cantilevers 311 and 312 are arranged on the same straight line in the above, they may not be arranged on the same straight line but may be arranged almost in parallel. With this, it is also possible to achieve the same effect as that described above for the accelerations in the X-axis direction and Z-axis direction. Moreover, the free ends equipped with the magnets are arranged to face each other in the above. However, as will be described later, they may be arranged on the opposite sides from each other.

Further, in the above, there has been described the structure where the levers 311 and 312 are arranged along the X-axis that forms a horizontal face. However, they may be arranged to face in any directions. For example, the levers 311 and 12 may be arranged along the Y-axis direction that forms a plane and the deflection directions thereof are in the Z-axis direction.

Figure 30A:
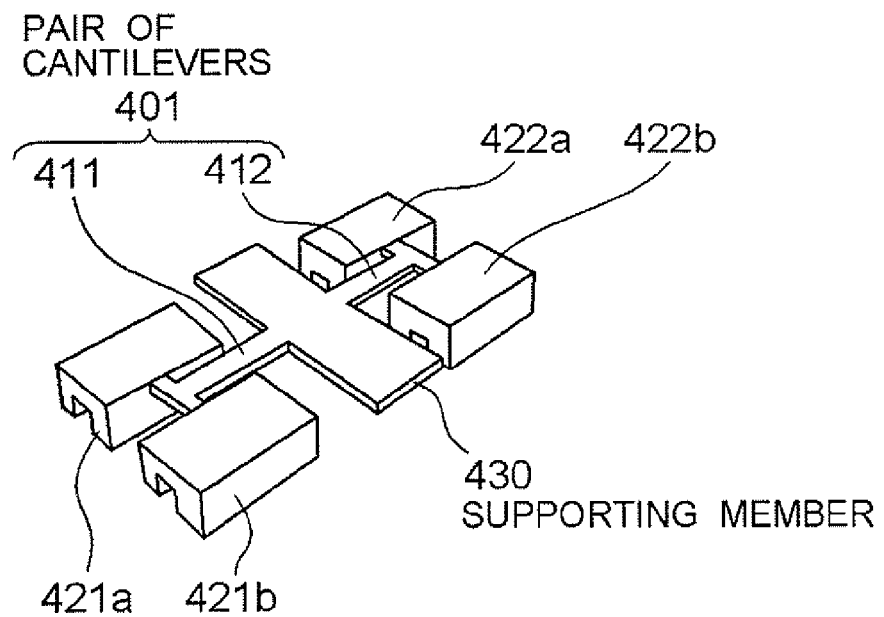
FIG. 30A is a perspective view from the top and FIG. 30B is a perspective view from the bottom.
Figure 30B:
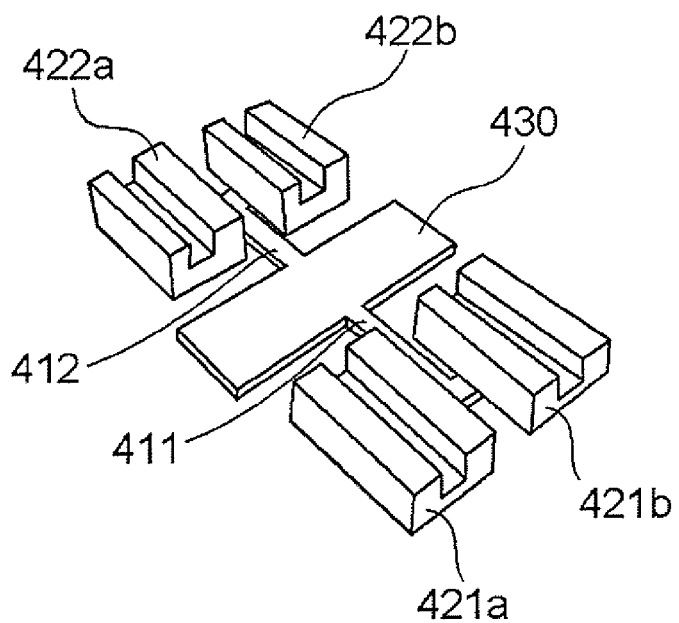

FIG. 30 shows a modification example of the first structural body A of the above-described pair of cantilevers 310. FIG. 30 is an illustration for showing the first structural body including a pair of cantilevers and magnets according to the modification example, in which FIG. 30A is a top perspective view and FIG. 30B is a perspective view from the bottom.

As shown in FIG. 30, a pair of cantilevers 401 according to the modification example are arranged almost on a same straight line, and fixed ends of each of the levers 411, 412 are arranged to oppose each other. The levers are fixed to a single plate-type supporting member 430 at each of the fixed ends. Thus, the free ends of each of the levers 411 and 412 are positioned on the opposite sides from each other. With this, each of the magnets 421 and 422 mounted at each free end can be arranged with a distance therebetween. Furthermore, each of the magnets 421 and 422 is provided by being further divided into two. For this, there are provided short auxiliary members that extend from the free end parts of each of the levers 411, 412 to the levers 411, 412 vertically, and each of the divided magnets (421a, 421b and 422a, 422b) is provided on both end parts thereof.

In accordance with this, magnetic field sensor chips are arranged beneath each of the U-shaped magnets 421a, 421b, 422a, and 422b as described above.

With this, it is possible to arrange the pair of magnets, which are mounted to each of the levers 411, 412, with a distance therebetween, so that influences caused by other magnet can be suppressed at the time of detecting the direction of the magnetic field by the chip. Thereby, precision of the measurement can be improved. Moreover, since the pair of cantilevers 401 are supported by the supporting member 430 arranged at the center, it is possible to save the space of the sensor itself and to lower the cost.

Figure 31A:
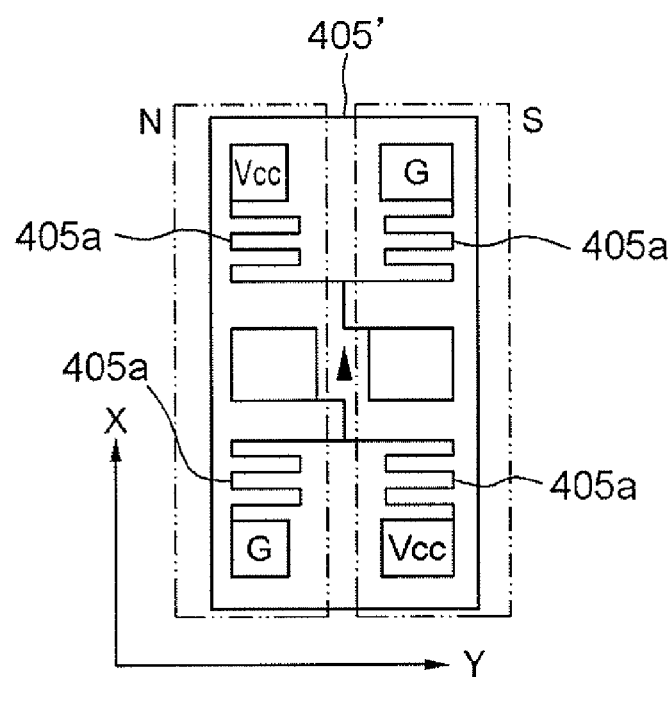
FIGS. 31A and 31B are illustrations for respectively showing modification examples of the structure of the magnetic field sensor chip.
Figure 31B:
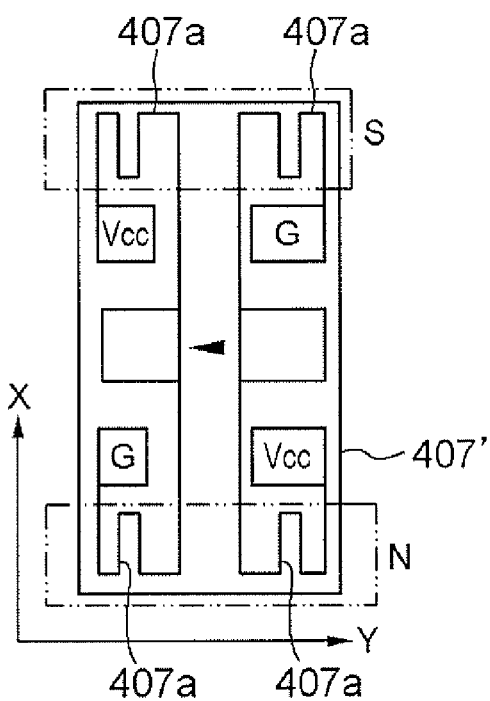

Now, the modification example of the above-described magnetic field sensor chip and the modification example of the layout with respect to the magnets will be described by referring to FIG. 31 and FIG. 32. FIG. 31A shows the structure of magnetic field sensor chips 405' (406') for the X-axis and Z-axis directions. Further, FIG. 31B shows the structure of a magnetic field sensor chip 407' for the Y-axis direction. In those illustrations, the parts indicated by reference numerals 405a (406a) or 407a are the GMR elements. Magnetizations of each of the elements are fixed in the directions pointed by triangles, and the magnetizations within a chip are all fixed in the same direction as described above.

Figure 32A:
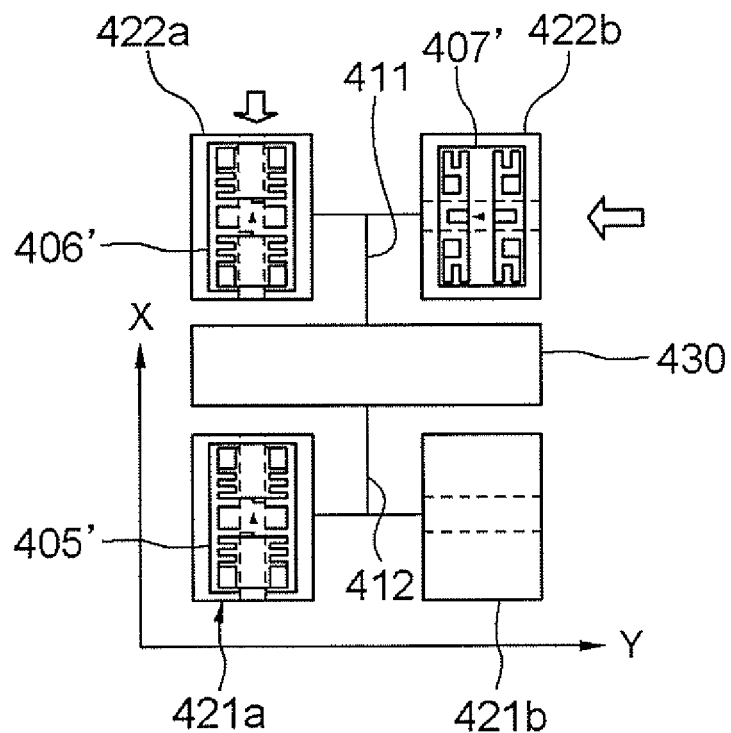
FIGS. 32A and 32B are illustrations for showing the state where the magnetic field sensor chips shown in FIG. 31 are arranged to oppose the magnets.
Figure 32B:
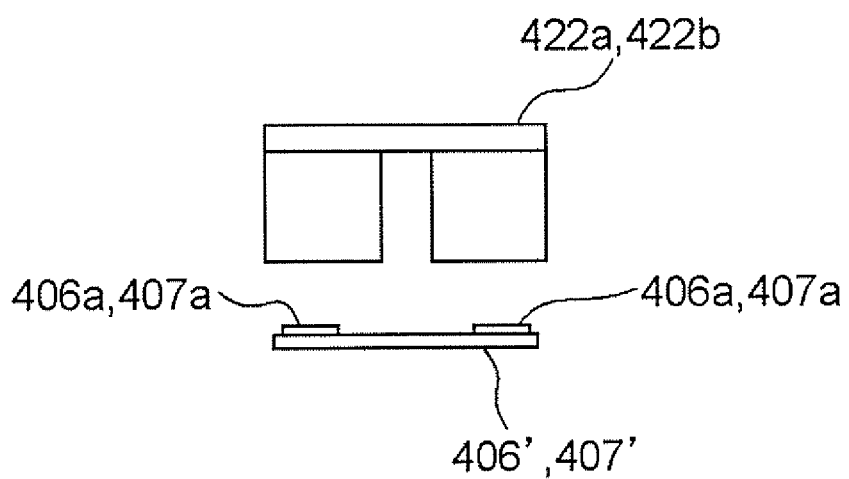

FIG. 32 shows the actual state where the chips are arranged to oppose the magnets, in which FIG. 32A shows the top plan view and FIG. 32B shows the side view thereof viewed from direction of arrows shown in FIG. 32. In those illustrations, the cantilever 401 shown in FIG. 30 comprises each of the U-shaped magnets 421a, 421b, 422a, 422b, in which the magnets indicated by the reference numerals 421b, 422b are rotated by 90° with respect to the magnets indicted by the reference numerals 421a, 422a. Further, the magnetic field sensor chips 405', 406' for the X-axis and Z-axis directions are provided to the magnets indicated by the reference numerals 421a, 422a, and the magnetic field sensor chips 407' for the Y-axis direction is provided to the magnets indicated by the reference numeral 422b. The GMR elements 405a, 406a, and 407a are opposed to each other. The magnet indicated by the reference numeral 421 is mounted to keep the balance of the cantilever although there is no chip provided thereto.

Even in the case where the magnetic field sensor chips are constituted and the U-shaped magnets are arranged in the manner as described above, it is also possible to detect the accelerations in the directions of three axes with a single sensor in the same manner as described above. It is noted that the structure of the magnetic field sensor chip and the layout of the U-shaped magnets described above as well as the positional relation of the magnetic field sensor chips and the U-shaped magnets are merely examples, and it is not intended to be limited to those.

Fifth Embodiment

Next, there will be described an example of mounting the acceleration sensors that are in the structures according to the above-described first—fourth embodiments. For example, the acceleration sensor is mounted within a casing of a hard disk drive.

Figure 33:
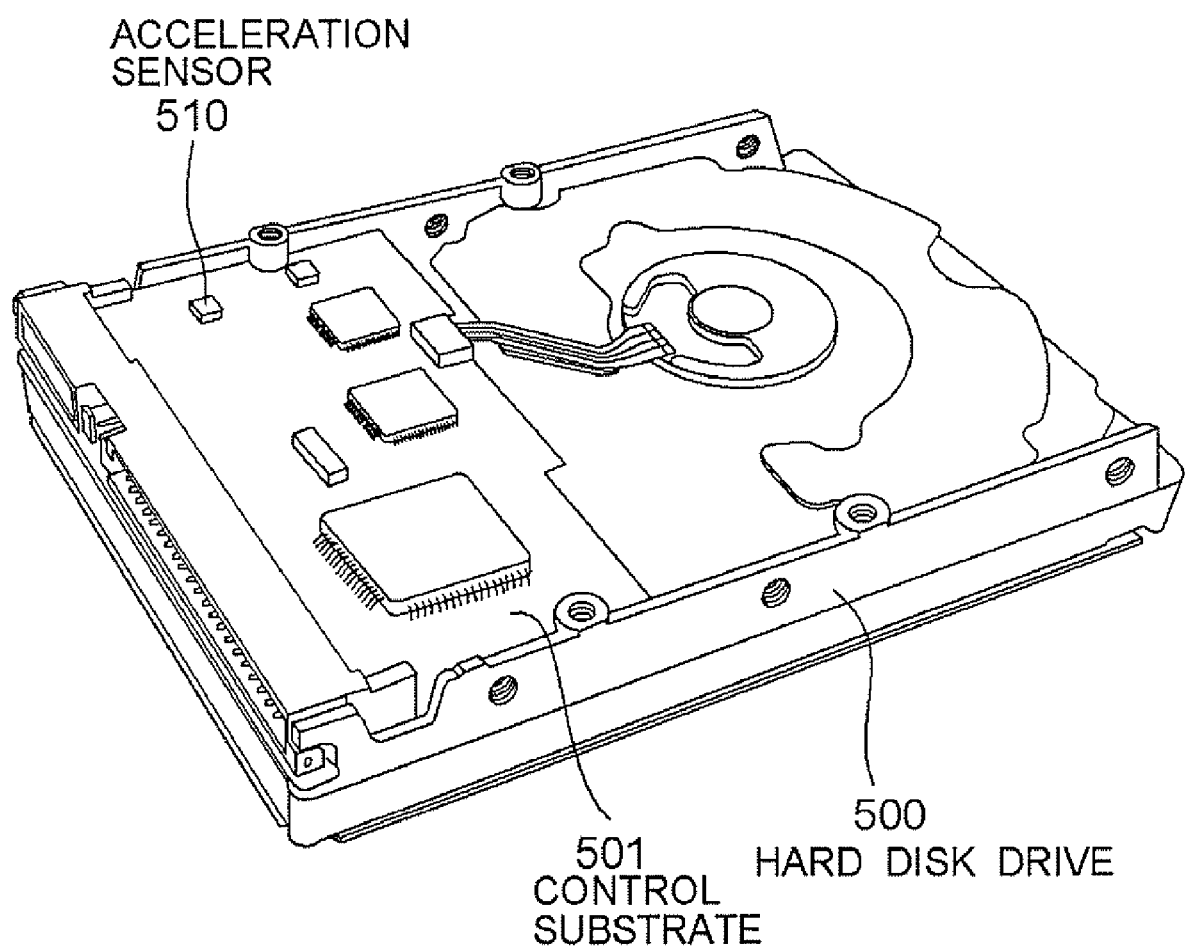
FIG. 33 is an illustration for showing the state where the acceleration sensor of the present invention is mounted to a hard disk drive.

FIG. 33 shows the internal structure of a hard disk drive 500 viewed from the back side. A control substrate 501 for controlling the action of the drive is mounted to the inside of the hard disk drive 500, and an acceleration sensor 510 is mounted on the substrate 501. It is so constituted that signals detected from the sensor 510 are processed by an arithmetic unit (not shown) to detect the acceleration in a prescribed direction. With this, as described above, accelerations in the directions of three axes can be detected regardless of how and in what posture the hard disk drive 500 is placed in a computer or the like. Thus, accelerations in any directions can be detected properly.

Further, it is preferable to provide, to the hard disk drive 500, a mechanism and a control device for retracting the magnetic head from the magnetic disk when there is detected the acceleration of a prescribed value or larger in the directions of each axis, for example. With this, damages to data and writing and reading of data to/from a wrong track can be suppressed, thereby improving the reliability.

In the above, there has been described by referring to the case of mounting the acceleration sensor to the hard disk drive. However, it may be loaded to other electronic devices, and there may provide such a structure that is capable of protecting the electronic device itself from the acceleration by controlling the action of the device when there is detected a prescribed acceleration. Furthermore, it is possible to detect the impact imposed on the electronic device, inclination of the electronic device, etc. through detecting the acceleration by the above-described acceleration sensor. Thus, it becomes possible to apply prescribed processing in accordance with the detected acceleration, i.e. the impact and inclined state. Therefore, a highly-reliable electronic device can be formed and the electronic device can be highly functionalized as well.

For example, it is desirable to provide a sensor that is capable of detecting the range of 1 G-3 G for detecting the free fall and preferable to provide a sensor that is capable of detecting the range of 30 G-50 G for detecting the impact. However, the acceleration sensor of the present invention is capable of detecting the accelerations of about 1 G-50 G, so that the function of detecting the detecting the free fall by the acceleration, the function of detecting the impact by the acceleration, and the function of detecting the angle by the acceleration can be achieved by a single sensor.

Sixth Embodiment

Figure 34:
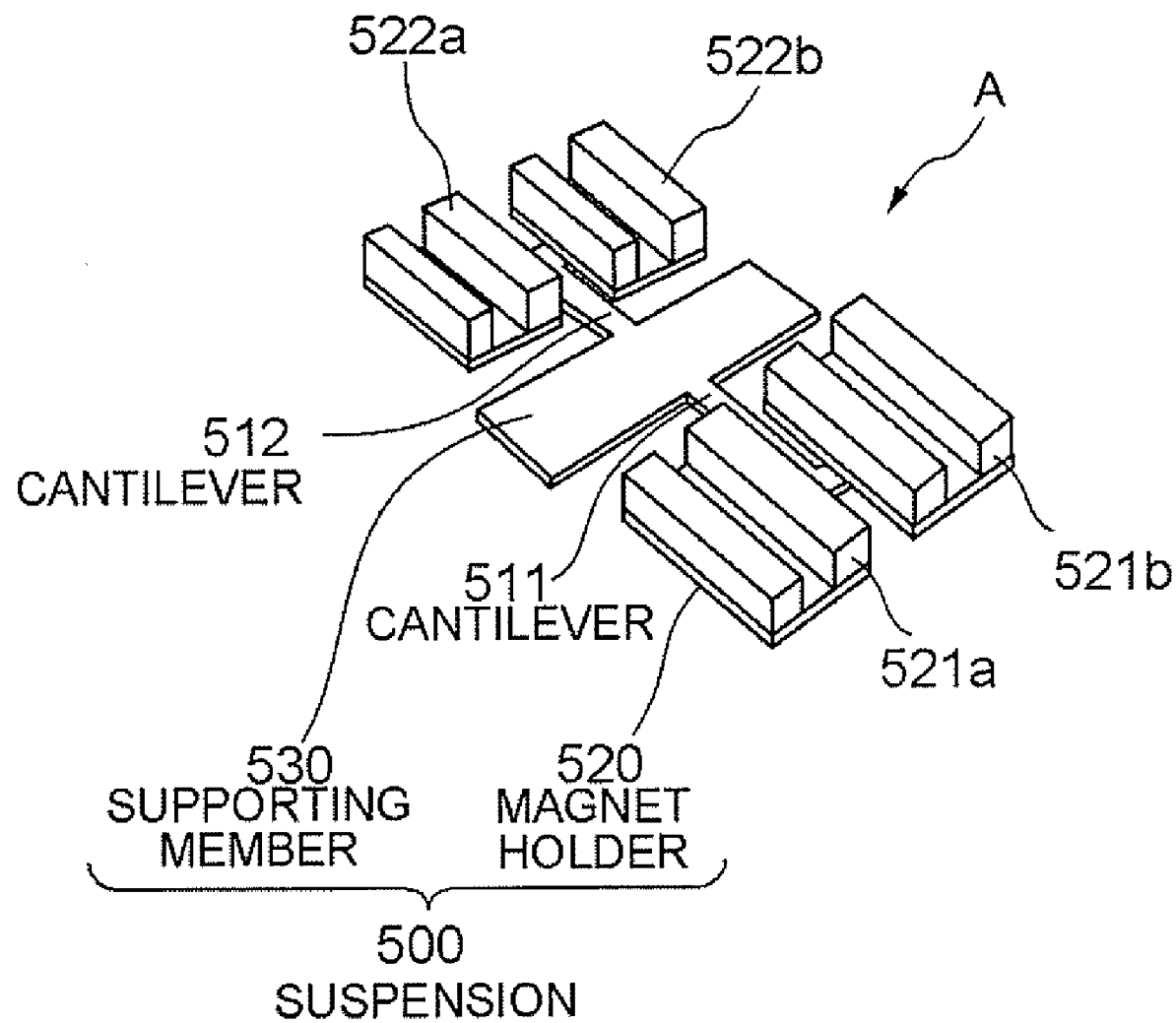
FIG. 34 is an illustration for sowing a part of the structure of an acceleration sensor according to a sixth embodiment.
Figure 35:
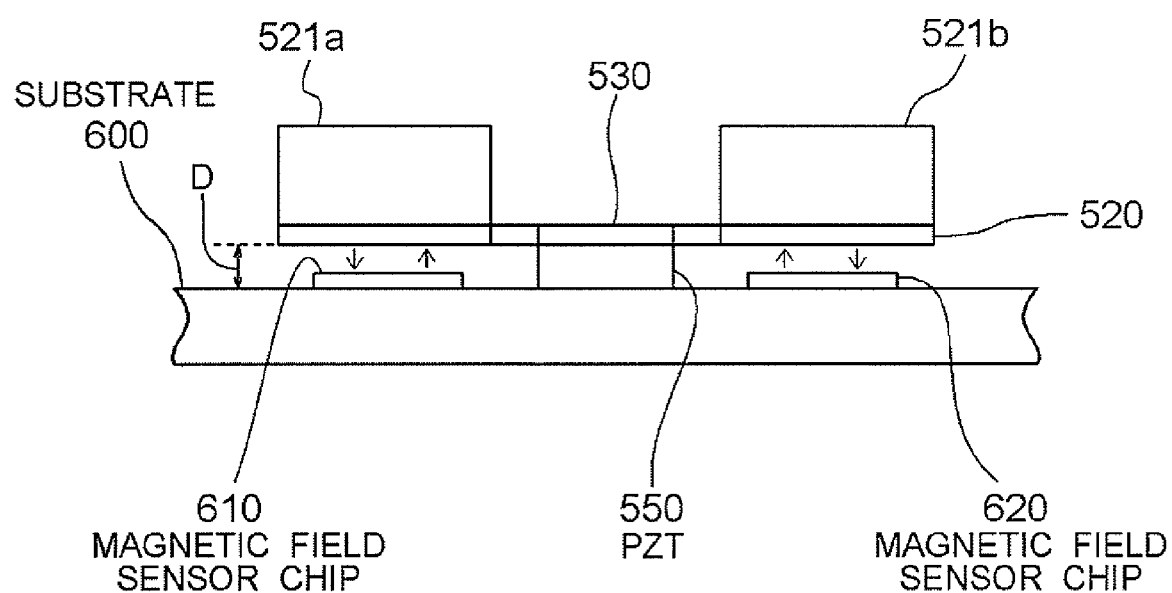
FIG. 35 is an illustration of the acceleration sensor according to the sixth embodiment viewed from the side.
Figure 36:
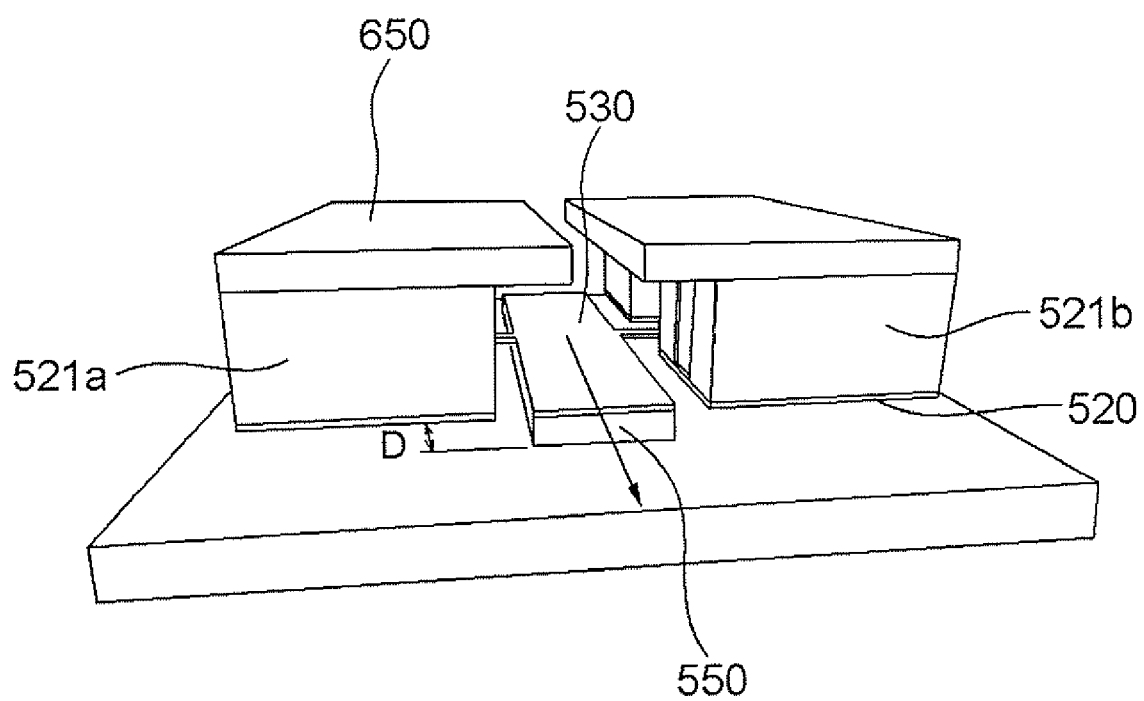
FIG. 36 is an illustration for showing the state where the acceleration sensor according to the sixth embodiment is mounted to a target of acceleration measurement.
Figure 37:
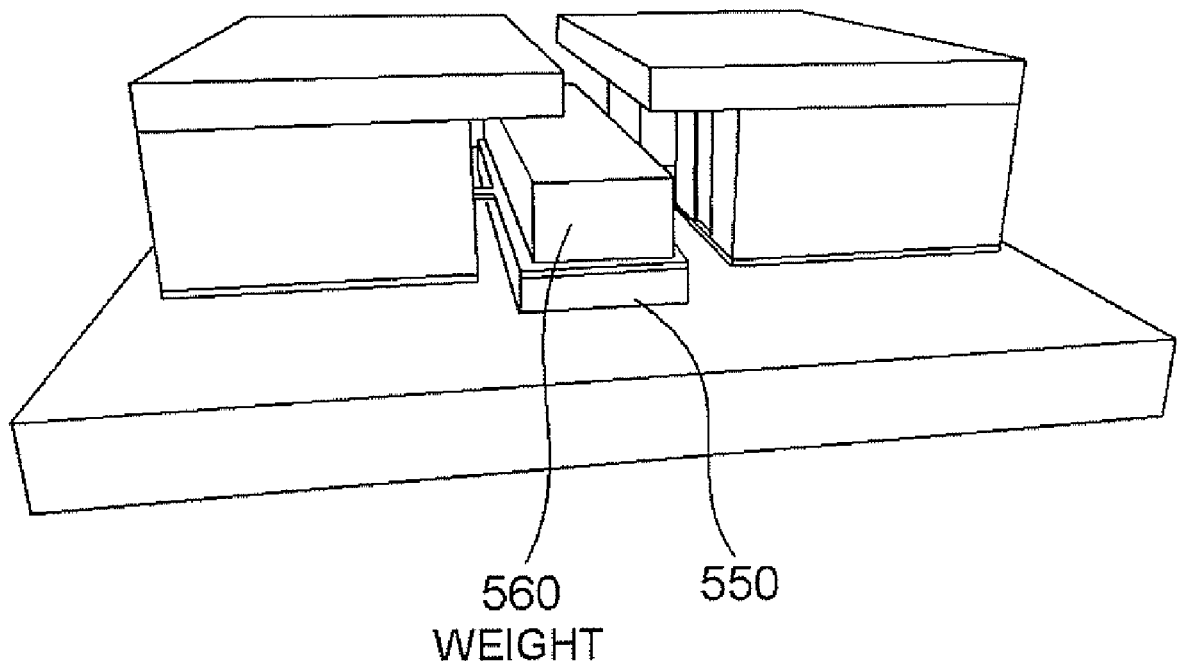
FIG. 37 is an illustration for showing a modification example of the structure of the acceleration sensor according to the sixth embodiment.

Next, a sixth embodiment of the present invention will be described by referring to FIG. 34-FIG. 37. FIG. 34-FIG. 36 are illustrations for showing the structure of the acceleration sensor according to the sixth embodiment, and FIG. 37 show a modification example thereof.

In the embodiment, first, the first structural body A comprising a pair of cantilevers and magnets employs the structure shown in FIG. 34. That is, it is almost the same as the structure shown in FIG. 30B, which is constituted with: a suspension 500 composed of a pair of cantilevers 511, 512, a plate-type supporting member 530 for supporting the fixed ends thereof, and magnet holders 520; and four magnets 521a, 521b, 522a, 522b having the N-pole and S-pole, which are provided on each of the magnet holders 520. It is noted that the magnetic fields from each of the magnets 521a, etc. are directed towards the bottom side of FIG. 34 through the magnet holders 520. Thus, the magnetic field sensor chips comprising the GMR elements are placed beneath the magnet holders 520 shown in FIG. 34.

The above-described first structural body A is loaded as in FIG. 35 with respect to a target of acceleration measurement, e.g. a hard disk drive. That is, there is provided a roughly-cuboid PZT 550 (piezoelectric member) and, through the PZT 550, the supporting member 530 is mounted on a substrate 600 that constitutes the acceleration sensor. The top face and bottom face of the PZT 550 are fixed to the supporting member 530 and the substrate 600, respectively. Further, the substrate 600 is fixed to the target of the acceleration measurement such as a hard disk drive.

Furthermore, in the state shown in FIG. 35 and FIG. 36, the PZT 550 has a prescribed height. Thus, there is a clearance (see reference code D of FIG. 35) formed between the substrate 600 and the suspension 500 (the magnet holder 520) for the extent of the height. Magnetic field sensor chips 610 and 620 comprising the GMR elements loaded thereon are provided in the clearance D, i.e. beneath the magnet holders 520 (that is, the magnets 521a and the like loaded on the magnet holders 520). Thereby, changes in the directions (see arrows in FIG. 35) of the magnetic fields generated by the N-pole and S-pole of the magnets 521a and the like can be detected by the GMR elements. Therefore, as described in the aforementioned embodiments, accelerations in the directions of three axes can be detected.

In this embodiment, the PZT 550 provided between the supporting member 530 and the substrate 600 is set to generate a voltage by the piezoelectric effect when there is a shear stress applied along the longitudinal direction. For detecting electric signals such as the voltage, there are electrodes provided on both ends of the PZT 550 in the longitudinal direction, which are connected to a connection pad formed on the substrate 600 by solder or the like and further connected to a detection circuit. The detection circuit operates to detect generation of the acceleration in the longitudinal direction of the supporting member 530 according to the value of the detected voltage.

When the above-described acceleration sensor is actually loaded to the target of the acceleration measurement such as a hard disk drive as described in the fifth embodiment, the substrate 600 and the like are fixed to the hard disk drive. In that state, as shown in FIG. 36, it is so set that the axis direction (see an arrow) along the longitudinal direction of the supporting member 530 faces in the seek direction of the magnetic head slider. Reference numeral 650 is a magnetic shield.

When there is acceleration generated in the seek direction of the hard disk drive, i.e. in the longitudinal direction of the supporting member 530, the substrate 600 fixed to the hard disk drive moves in the axial direction and the supporting member 530 moves to follow the substrate 600 with a delay from the move of the substrate 600. Thus, there is a relative movement generated between the substrate 600 and the supporting member 530, which generates a shift in the positional relationship. That is, the top face and the bottom face of the PZT 550 are to move relatively so that there is applied the shearing stress along the longitudinal direction of the PZT 550. A voltage is generated by the deformation in the shape of the PZT due to the shear stress. Thus, through detecting the voltage by the detection circuit or the like, acceleration in the longitudinal direction of the supporting member can be detected. The PZT 550 has a high resonance frequency and high sensitivity, so that acceleration in the axial direction along the longitudinal direction of the supporting member 530 can be detected at an extremely high speed.

In order to improve the precision of detecting the acceleration, it is preferable to place a weight 560 of a prescribed mass on the supporting member 530 for increasing the mass of the supporting member 530 as show in FIG. 37. With this, there works a strong inertial force to keep still state of the moving supporting member 530. Therefore, the action to follow the movement of the hard disk drive delays further, so that the acceleration can be detected with still higher sensitivity.

As described above, the embodiment comprises: the first acceleration sensor (acceleration detecting device) which is constituted with the first structural body A having the suspension 500 and the magnets 521a and the like, and a magnetic field sensor chip 610 for detecting the accelerations in the directions of three axes; and the second acceleration sensor (another acceleration detecting device) constituted with the PZT 550 having a higher resonance frequency than the first sensor. Therefore, the accelerations can be detected in all possible directions and the acceleration in the critical direction can be detected at an extremely high speed.

The acceleration sensor according to the present invention can be placed at an apparatus that is vulnerable to impact, e.g. industrial robot, hard disk drive, etc., to conduct safe operation such as stopping the action when detecting a prescribed acceleration, thereby enabling suppression of damages and the like of the device. Thus, it exhibits the industrial applicability.

What is claimed is:

1. An acceleration sensor, comprising:
a pair of cantilevers comprising two cantilevers arranged substantially parallel on a same straight line in such a manner that positions of fixed ends and free ends are arranged to face in opposite directions from each other, and each of said free ends has a degree of freedom to deflect along a same direction as each other;
a pair of magnetic field generating devices with one magnetic field generating device mounted respectively to each of said free ends for generating a magnetic field in more than one direction; and
a pair of magnetic field detecting devices arranged to face each of said magnetic field generating devices, respectively, for detecting directions of said magnetic fields generated by each of said magnetic field generating devices,
wherein said magnetic field generating devices in a pair are provided, respectively, for measuring acceleration in a longitudinal direction of said cantilevers and for measuring acceleration in a direction orthogonal to said longitudinal direction of said cantilevers along a plane where a locus is formed when said cantilevers deflect.

2. The acceleration sensor according to claim 1, wherein said directions of said magnetic fields generated by said magnetic field generating devices are set in a direction orthogonal to said longitudinal direction of said cantilevers along said plane where said locus is formed when said cantilevers deflect.

3. The acceleration sensor according to claim 1, wherein, at each of said free ends, each of said pair of magnetic field generating devices is provided by being divided into a plurality of pieces.

4. The acceleration sensor according to claim 1, wherein: each of said free ends is arranged on an opposite side from each other.

5. The acceleration sensor according to claim 4, wherein each of said fixed ends of said pair of cantilevers is fixed to a same supporting member.

6. The acceleration sensor according to claim 1, wherein said pair of magnetic field detecting devices are magnetoresistive elements whose resistance values change in accordance with a direction of a magnetic field when said magnetic field is inputted.

7. The acceleration sensor according to claim 6, wherein, when there is no acceleration applied in any direction, said magnetoresistive elements are arranged substantially perpendicular to said direction of said magnetic field.

8. The acceleration sensor according to claim 6, comprising:
a bridge circuit that uses said magnetoresistive elements, and
a differential-voltage detecting device for detecting a differential voltage outputted from said bridge circuit.

9. An electronic device having at least one component that moves and accelerates, comprising said acceleration sensor according to claim 1.

10. A hard disk drive, comprising said acceleration sensor according to claim 1.

11. The electronic device according to claim 9, wherein said pair of cantilevers constituting said acceleration sensor are arranged in such a manner that a longitudinal direction thereof is set along a horizontal face of said electronic device when in use.

12. An acceleration sensor, comprising:
a pair of cantilevers comprising two cantilevers arranged on a same straight line or almost in parallel in such a manner that positions of fixed ends and free ends are arranged to face in opposite directions from each other, and each of said free ends has a degree of freedom to deflect along a same direction as each other;
a pair of magnetic field generating devices for generating a magnetic field in more than one direction mounted to each of said free ends of said pair of cantilevers, each of which is formed integrally with N-pole face and S-pole face facing in a same direction; and
magnetic field detecting devices for detecting directions of magnetic fields, at least one each of which is arranged to oppose each of said N-pole face and said S-pole face of said magnetic field generating device, wherein
each of said magnetic field detecting devices is formed by a magnetoresistive element whose resistance value changes in accordance with a direction of a magnetic field, and each of said magnetic field detecting device is arranged in such a manner that detectable magnetic field directions become identical.

13. The acceleration sensor according to claim 12, comprising:
for measuring acceleration in a longitudinal direction of said cantilevers, a group of at least four said magnetoresistive elements which respectively oppose N-pole faces and S-pole faces of both of said magnetic field generating devices; and
for measuring acceleration in a direction orthogonal to said longitudinal direction of said cantilevers along a plane where a locus is formed when said cantilevers deflect, another group of magnetoresistive elements arranged in a same manner as that of said group of at least four said magnetoresistive elements for measuring acceleration.

14. The acceleration sensor according to claim 13, comprising bridge circuits for detecting a differential voltage between each of said magnetoresistive elements, each of which is provided for each said group of at least four said magnetoresistive elements that are provided for measuring accelerations in each of said directions.

15. The acceleration sensor according to claim 14, wherein: said magnetoresistive elements are formed within a single chip for each of said magnetoresistive elements opposed thereto; and a voltage applying terminal and a differential-voltage detecting terminal are formed on each of said chips to be able to form said bridge circuit.

16. The acceleration sensor according to claim 15, wherein directions of each of said magnetoresistive elements formed within said each chip are set in a same direction for each said chip.

17. The acceleration sensor according to claim 13, wherein:
said pair of cantilevers have a degree of freedom in a twisting direction of said levers;
at least one each of another magnetic field detecting device for said twisting direction, which detects a direction of a magnetic field that changes when said cantilevers are twisted, is provided by opposing N-pole face and S-pole face of at least one of said magnetic field generating devices; and each of said magnetic field detecting devices for said twisting direction is formed by a magnetoresistive element whose resistance value changes in accordance with a direction of a magnetic field, and each of said magnetic field detecting device is arranged in such a manner that detectable magnetic field directions become identical.

18. The acceleration sensor according to claim 17, comprising a bridge circuit for detecting a differential voltage between each of said magnetoresistive elements for said twisting direction.

19. The acceleration sensor according to claim 18, wherein said magnetoresistive elements for said twisting direction are provided by opposing said N-pole face and said S-pole face.

20. The acceleration sensor according to claim 19, wherein, said four magnetoresistive elements for said twisting direction are connected in parallel within a single chip to form said bridge circuit, and a voltage applying terminal and a differential-voltage detecting terminal are formed on said chip.

21. The acceleration sensor according to claim 13, wherein said pair of cantilevers are plate-type cantilevers having a plane that is orthogonal to a plane where a locus is formed when said cantilevers deflect.

22. The acceleration sensor according to claim 12, wherein said magnetic field generating devices are U-shaped magnets.

23. The acceleration sensor according to claim 22, comprising a ferromagnetic substance provided to cover a part of said U-shape magnets, which is on an opposite side from faces where N-pole and S-pole are formed.

24. The acceleration sensor according to claim 22, wherein, at each of said free ends, each of said magnetic field generating devices is provided by being divided into a plurality of pieces.

25. An acceleration sensor, comprising:
a pair of cantilevers comprising two cantilevers arranged substantially parallel on a same straight line in such a manner that positions of fixed ends and free ends are arranged to face in opposite directions from each other, and each of said free ends has a degree of freedom to deflect along a same direction as each other;
a pair of magnetic field generating devices with one magnetic field generating device mounted respectively to each of said free ends for generating a magnetic field in more than one direction; and
a pair of magnetic field detecting devices arranged to face each of said magnetic field generating devices, respectively, for detecting directions of said magnetic fields generated by each of said magnetic field generating devices, wherein:
said pair of cantilevers have a degree of freedom in a twisting direction of said cantilevers; and
another magnetic field detecting device, which detects a direction of a magnetic field that changes when said cantilevers are twisted, is provided by opposing at least one of said magnetic field generating devices.

26. The acceleration sensor according to claim 25, wherein said pair of cantilevers are plate-type cantilevers having a plane that is orthogonal to a plane where a locus is formed when said cantilevers deflect.

27. The acceleration sensor according to claim 25, wherein, at each of said free ends, each of said pair of magnetic field generating devices is provided by being divided into a plurality of pieces.

28. The acceleration sensor according to claim 25, wherein:
each of said free ends is arranged on an opposite side from each other.

29. The acceleration sensor according to claim 28, wherein each of said fixed ends of said pair of cantilevers is fixed to a same supporting member.

30. The acceleration sensor according to claim 25, wherein said pair of magnetic field detecting devices are magnetoresistive elements whose resistance values change in accordance with a direction of a magnetic field when said magnetic field is inputted.

31. The acceleration sensor according to claim 30, wherein, when there is no acceleration applied in any direction, said magnetoresistive elements are arranged substantially perpendicular to said direction of said magnetic field.

32. The acceleration sensor according to claim 30, comprising:
a bridge circuit that uses said magnetoresistive elements, and
a differential-voltage detecting device for detecting a differential voltage outputted from said bridge circuit.

33. An electronic device having at least one component that moves and accelerates, comprising said acceleration sensor according to claim 25.

34. A hard disk drive, comprising said acceleration sensor according to claim 25.

35. The electronic device according to claim 33, wherein said pair of cantilevers constituting said acceleration sensor are arranged in such a manner that a longitudinal direction thereof is set along a horizontal face of said electronic device when in use.

* * * * *